US012645102B2

(12) United States Patent
Go et al.

(10) Patent No.: US 12,645,102 B2
(45) Date of Patent: Jun. 2, 2026

(54) OPTICAL PHASE SHIFTER, OPTICAL SWITCH AND 90 DEGREES OPTICAL HYBRID

(71) Applicant: NTT, Inc., Tokyo (JP)

(72) Inventors: Takashi Go, Musashino (JP); Yuichiro Ikuma, Musashino (JP); Kenya Suzuki, Musashino (JP); Keita Yamaguchi, Musashino (JP); Ai Yanagihara, Musashino (JP)

(73) Assignee: NTT, Inc., Tokyo (JP)

( * ) Notice: Subject to any disclaimer, the term of this patent is extended or adjusted under 35 U.S.C. 154(b) by 242 days.

(21) Appl. No.: 18/555,701

(22) PCT Filed: Apr. 28, 2021

(86) PCT No.: PCT/JP2021/017082
§ 371 (c)(1),
(2) Date: Oct. 16, 2023

(87) PCT Pub. No.: WO2022/230145
PCT Pub. Date: Nov. 3, 2022

(65) Prior Publication Data
US 2024/0201521 A1      Jun. 20, 2024

(51) Int. Cl.
*G02F 1/01* (2006.01)
*G02F 1/21* (2006.01)
*G02F 1/225* (2006.01)

(52) U.S. Cl.
CPC ............ *G02F 1/0147* (2013.01); *G02F 1/212* (2021.01); *G02F 1/225* (2013.01); (Continued)

(58) Field of Classification Search
CPC .............................. G02B 6/2935; G02F 1/212
See application file for complete search history.

(56) References Cited

U.S. PATENT DOCUMENTS

2006/0072866 A1      4/2006 Mizuno et al.
2011/0102804 A1*     5/2011 Lipson ............... G02B 6/12007
                                              356/480

FOREIGN PATENT DOCUMENTS

JP      H03-213829 A      9/1991
JP      2000-258808 A     9/2000
                  (Continued)

OTHER PUBLICATIONS

Akira Himeno, et al., *Silica-Based Planar Lightwave Circuits*, IEEE Journal of Selected Topics in Quantum Electronics, vol. 4, No. 6, Nov./Dec. 1998, pp. 913-924.

(Continued)

*Primary Examiner* — Chad H Smith
(74) *Attorney, Agent, or Firm* — Workman Nydegger

(57) ABSTRACT

An optical phase shifter in which a phase shift amount is kept constant in a wide wavelength region is provided. One aspect is the optical phase shifter constituting of two waveguides of a basic width, and configured so that two lights propagating through each waveguide have a phase difference, including a different type waveguide arranged in at least one of the two waveguides and having a waveguide width different from the basic width, and a configuration of the different type waveguide and a parameter of the two waveguides and different type waveguide are optimized.

13 Claims, 40 Drawing Sheets

(52) U.S. Cl.
CPC ...... *G02F 2201/06* (2013.01); *G02F 2203/50*
(2013.01); *G02F 2203/62* (2013.01)

(56) References Cited

FOREIGN PATENT DOCUMENTS

| | | | |
|----|----------------|----|---------|
| JP | 2007-163825 | A  | 6/2007  |
| JP | 2012-252363 | A  | 12/2012 |
| WO | 2005/003852 | A1 | 1/2005  |

OTHER PUBLICATIONS

Takashi Goh, et al., *Low Loss and High Extinction Ratio Strictly Nonblocking 16 × 16 Thermooptic Matrix Switch on 6-in Wafer Using Silica-Based Planar Lightwave Circuit Technology*, IEEE Journal of Lightwave Technology, vol. 19, No. 3, Mar. 2001, pp. 371-379.

Toshio Watanabe, et al., *Compact PLC-based Transponder Aggregator for Colorless and Directionless ROADM*, in Proceedings, Optical Fiber Communication Conference and NFOEC 2011, Mar. 2011, paper OTuD3, pp. 1-3.

Toshio Watanabe, et al., *Silica-based PLC 1×N Switch for All Wavelength Bands*, Optical Society of America, 2014, pp. 1-3.

* cited by examiner

Fig. 1

WAVELENGTH $\lambda$ [μm]

OPTICAL PHASE SHIFTER, OPTICAL SWITCH AND 90 DEGREES OPTICAL HYBRID

TECHNICAL FIELD

The present invention relates to an optical phase shifter using an optical waveguide and operating in a wide wavelength range, and an optical switch and a 90 degrees optical hybrid using the optical phase shifter.

BACKGROUND ART

The optical switch is one of important optical components for switching a communication path in an optical communication system in which flexible operation is required in accordance with a communication demand. There are various means for realizing the optical switch. A waveguide optical type optical switch using a quartz-based optical waveguide formed on a substrate is characterized in that it is smaller in size, superior in integration, and high in long-term stability and reliability as compared with a free-space optical type optical switch for assembling bulk type optical components such as lenses and mirrors. The waveguide optical type optical switch is widely used in a practical system such as an optical communication device (see, for example, NPL 1). For example, as a large-scale optical switch using the quartz-based optical waveguide, an N×N matrix switch in which a large number of Mach-Zehnder interference type switch elements with variable phase shifters are integrated has been put into practical use (see, for example, NPL 2).

Figure 1:
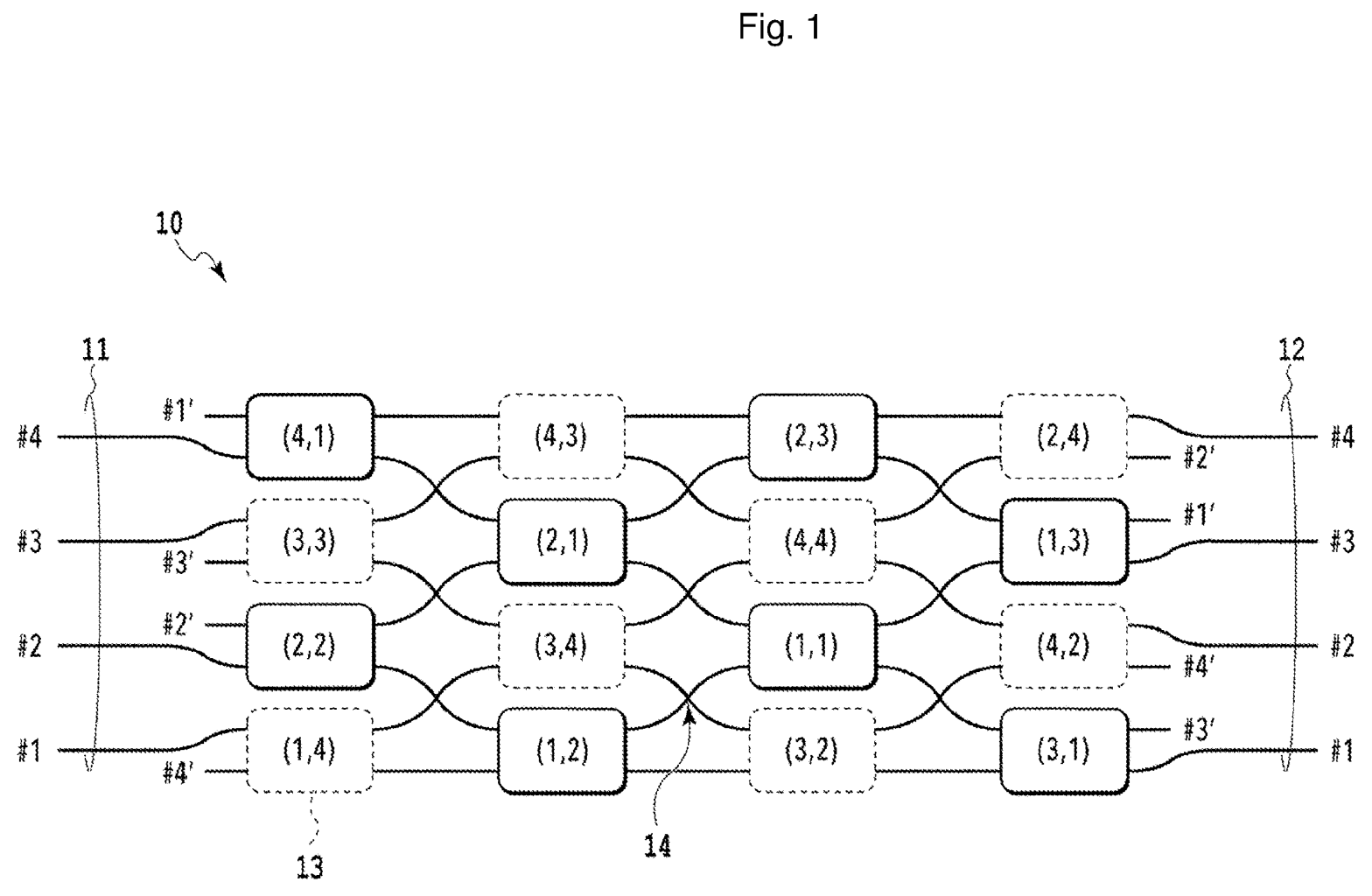

FIG. 1 shows a configuration of a conventional N×N matrix switch. Incidentally, FIG. 1 shows the case where N=4. The 4×4 matrix switch 10 has a configuration in which N² (N=4) switch elements 13 are connected between four input line waveguides 11 and four output line waveguides 12 via a plurality of inter-stage intersections 14. The switch element 13 has a two-input and two-output switch configuration, and light propagates to the cross path in an OFF state where the switch element is not driven, and propagates to the bar path in an ON state where the switch element is driven. When the light inputted to the port number #x (x=1 to 4) of the input line waveguide 11 is outputted to the port number #y (y=1 to 4) of the output line waveguide 12, the switch element 13 of the number (x, y) is driven and turned ON. The switch element 13, for example, (4, 1) indicated by a solid line enclosure and the switch element 13, for example, (3, 3) indicated by a broken line enclosure are provided. Both of them show only the difference in the arrangement direction of the switch elements described later, and are basically the same in structure.

FIG. 2 shows a configuration of a conventional double gate type switch element. In the double gate type switch element 20, a first switch element 21 is arranged in the middle of input line waveguides 23a to 23b, and a second switch element 22 is arranged in the middle of output line waveguides 24a to 24b. The first switch element 21 and the second switch element 22 are cascaded by an intermediate connection waveguide 25. In addition, an input line waveguide 23b connected to the first switch element 21 and an output line waveguide 24a connected to the second switch element 22 intersect at an intra-element intersection 26. The first switch element 21 and the second switch element 22 are two-input and two-output switch elements, and light propagates to a bar path in an OFF state, and light propagates to a cross path in an ON state.

Therefore, the double gate type switch element 20 propagates the light to the cross path (input line waveguide 23a→input line waveguide 23b and output line waveguide 24a→output line waveguide 24b) in the OFF state, in the ON state, the light is propagated to the bar path (input line waveguide 23a→output line waveguide 24b). Here, a path propagating from the output line waveguide 24a to the input line waveguide 23b cannot be made. In the 4×4 matrix switch 10 shown in FIG. 1, since it is not necessary to output the light from the port number #y (y=1 to 4) of the output line waveguide 12 to the port number #x (x=1 to 4) of the input line waveguide 11, this path may be eliminated.

In this way, the double gate type switch element 20 cuts off the propagation light from the input line waveguide 23a to the output line waveguide 24b by two switch elements of the first switch element 21 and the second switch element 22 at the time of OFF. Thus, the characteristics of extremely small crosstalk and high extinction ratio, i.e., the ratio of the transmittance at the time of on to the transmittance at the time of OFF, can be obtained. This double gate type switch element 20 is applied to the switch element 13 of the 4×4 matrix switch 10 shown in FIG. 1. As described above, the double gate type switch element 20 is arranged in the direction shown in the figure in the switch element 13 indicated by the solid line enclosure, and the double gate type switch element 20 is arranged in the direction inverted up and down in the switch element 13 indicated by the broken line enclosure.

FIG. 3 shows a configuration of the conventional switch element. A switch element 30 is constituted of a Mach-Zehnder interferometer in which an optical coupler 33a and an optical coupler 33b are connected by an interference arm 34 and an interference arm 35. The optical couplers 33a and 33b are constituted of directional couplers in which waveguides 31 and 32 are arranged close to each other. Usually, the optical coupling rate K of the optical couplers 33a and 33b is set to 50% at the operation wavelength $\lambda_0$. A thermooptic phase shifter 36 capable of local heating by a thin film heater is arranged on the interference arm 34. The thermooptic phase shifter 36 functions as an electrically driven variable phase shifter.

The waveguide length $L_A$ of the interference arm 35 is longer than the waveguide length $L_B$ of the interference arm 34 by $\Delta L$ (=$L_A$−$L_B$). A so-called optical path length difference n·$\Delta L$ obtained by multiplying $\Delta L$ by the equivalent refractive index n of the waveguide is set to a half wavelength of an operation wavelength Ao.

[Math. 1]

$$\Delta L = \frac{\lambda_0}{2n} \qquad \text{(Expression 1)}$$

Transmittance $T_{cross}$ of cross paths (input port 31a→output port 32b and input port 32a→output port 31b) of this switch element, and transmittance $T_{bar}$ of bar paths (input port 31a→output port 31b and input port 32a→output port 32b) is expressed by the following expression by a known interference principle.

[Math. 2]

$$T_{cross} = 4 \cdot \kappa \cdot (1 - \kappa) \cdot \left\{ \cos \frac{\Delta \phi}{2} \right\}^2 \qquad \text{(Expression 2)}$$

$$T_{bar} = 1 - T_{cross} \qquad \text{(Expression 3)}$$

Here, κ is the optical coupling rate of the optical couplers 33a and 33b, and Δφ is the inter-arm phase difference of the Mach-Zehnder interferometer, that is, the difference between the phase of the light propagating through the interference arm 34 and the phase of the light propagating through the interference arm 35. Since the optical path length of the interference arm 34 is n·$L_B$ and the optical path length of the interference arm 35 is n·$L_A$, when the waveguide length difference is ΔL, the inter-arm phase difference Δφ is expressed by the following expression.

[Math. 3]

$$\Delta\phi = -2\pi\frac{n\cdot L_B - n\cdot L_A}{\lambda} = 2\pi\frac{n\cdot\Delta L}{\lambda} \qquad \text{(Expression 4)}$$

Therefore, at the operation wavelength $\lambda_0$, Δφ=π is satisfied, so that $T_{cross}$=0 is always obtained regardless of the value of κ. The value of K may be deviated due to the deviation of the manufacturing process, but in such a case, the switch element 30 can have a high extinction ratio in the cross path. Note that, in the ON state, the equivalent refractive index n is increased by the thermooptic phase shifter 36 to n' in the following expression.

[Math. 4]

$$n' = \frac{L_A}{L_B}\cdot n \qquad \text{(Expression 5)}$$

Thus, since the optical path length of the interference arm 34 is n'·$L_B$, that is, from Expression 5, n·$L_A$ is established, the difference from the optical path length n·$L_A$ of the interference arm 35 becomes zero, and the inter-arm phase difference Δφ=0 is satisfied. Therefore, when κ=0.5 is satisfied, $T_{cross}$=1 is established, and the path is switched. The switch element 30 is used for the first switch element 21 and the second switch element 22 of the double gate type switch element 20 shown in FIG. 2.

FIG. 4A shows the wavelength dependence of the phase characteristic when the conventional switch element is turned OFF. The inter-arm phase difference Δφ is a function inversely proportional to the wavelength λ, as shown by Expression 4. The wavelength dependence of the inter-arm phase difference Δφ is shown when ΔL=0.5290 μm is used which is set at an operation wavelength $\lambda_0$=1.545 μm. As can be seen from FIG. 4A, Δφ=π is limited to λ=$\lambda_0$, and as the wavelength λ is separated from $\lambda_0$, Δφ is shifted from π.

FIG. 4B shows the wavelength dependence of cross-path transmittance when the conventional switch element is turned OFF. By reflecting the wavelength dependence of the phase characteristic, the transmittance of the cross path at the time of OFF also has the wavelength dependence as shown in FIG. 4B. In this way, in the switch element 30, a wavelength region in which an extinction ratio of 30 dB or more is obtained in a communication wavelength band is limited to about 60 nm.

As an attempt to widen a wavelength range in which the high extinction ratio can be obtained, the configurations disclosed in PTL 1 to 3 are known. In the configuration described in PTL 1, in the double gate type switch element 20, the waveguide wavelength $\lambda_0$ of the first switch element 21 is set to $\lambda_{0A}$, and the operation wavelength $\lambda_0$ of the second switch element 22 is set to $\lambda_{0B}$. By shifting the operation wavelength ($\lambda_{0A}\neq\lambda_{0B}$), the wavelength region in which the high extinction ratio can be obtained is shared by the first switch element 21 and the second switch element 22, thereby widening the band.

FIG. 5 shows a configuration of a conventional wide-band switch element. In a configuration of the wide-band switch element described in PTL 2, the inter-arm phase difference Δφ at the OFF time is set to n in a wide wavelength range by changing the waveguide widths of the two interference arms of the Mach-Zehnder interferometer. The wide-band switch element 40 is constituted of a Mach-Zehnder interferometer in which an optical coupler 43a and an optical coupler 43b are connected by an interference arm 44 and an interference arm 45. The configuration is basically similar to the above-mentioned switch element 30, but the waveguide width of the interference arm 44 and the waveguide width of the interference arm 45 are different from each other. On the other hand, the waveguide length $L_A$ of the interference arm 35 and the waveguide length $L_B$ of the interference arm 34 have the same length, and it is different from the switch element 30 that ΔL=0 is satisfied.

Specifically, when the normal waveguide width is $W_0$, in the interference arm 45, a part of the waveguide is a wide waveguide 47 having a waveguide width $W_{bold}$ (>$W_0$) over the length $L_{bold}$. Although a tapered waveguide is formed at the connecting portion between the normal waveguide portion and the wide waveguide 47 so as not to cause an increase in loss, the tapered waveguide connection is ignored in the following characteristic calculation for simplifying the description.

In such a configuration, the inter-arm phase difference Δφ is expressed by the following expression.

[Math. 5]

$$\Delta\phi = -2\pi\frac{n(W_0) - L_{bold} - n(W_{bold})\cdot L_{bold}}{\lambda} = \qquad \text{(Expression 6)}$$
$$2\pi\frac{\{n(W_{bold}) - n(W_0)\}\cdot L_{bold}}{\lambda} = 2\pi\frac{\Delta n\cdot L_{bold}}{\lambda}$$

Here, n (W) represents an equivalent refractive index of the waveguide in the waveguide width W. In addition, Δn is a difference in equivalent refractive index due to a difference in waveguide width W.

[Math. 6]

$$\Delta n = n(W_{bold}) - n(W_0) \qquad \text{(Expression 7)}$$

FIG. 6A shows the wavelength dependence of the equivalent refractive index of the conventional wide-band switch element. A quartz optical waveguide having a specific refractive index difference Δ of 2% and a core height of 3.4 μm is assumed as a parameter of the waveguide, and the refractive index is obtained by an equivalent refractive index method. The change amount of the equivalent refractive index is about 1.4570 to 1.4674 in a wavelength region of 1.2 to 1.7 μm, for example, in a waveguide width W=5 μm, and it can be seen that the change in equivalent refractive index is about ±0.35% compared to the average equivalent refractive index of 1.4623. Therefore, in Expression 4, the wavelength dependence of the equivalent refractive index can be substantially ignored, and the inter-arm phase difference Δφ in Expression 4 is determined in the form of a function inversely proportional to the wavelength λ. On the other hand, in Expression 6, the difference Δn of the equivalent refractive index due to the difference in the waveguide width W largely influences the wavelength characteristic.

FIG. 6B shows the waveguide width dependence of the equivalent refractive index of the conventional wide-band switch element. As parameters of the waveguide, a quartz-based optical waveguide having a specific refractive index difference $\Delta$ of 2% and a core height of 3.4 µm is assumed.

FIG. 7 shows the wavelength dependence of the difference between the equivalent refractive indices in the waveguide width different from the reference waveguide width. Specifically, the wavelength dependence of the difference $\Delta n$ of the equivalent refractive index in the case of waveguide width $W_{bold}=6$ µm with respect to the equivalent refractive index of reference waveguide width $W_0=5$ µm. That is, the difference between the equivalent refractive indices of the waveguide widths W=5 µm and 6 µm in FIG. 6A is shown. In FIG. 7, the characteristics when the width deviation $W_{err}$ occurs simultaneously in both cases where the waveguide width is the reference waveguide width $W_0$ and the waveguide width is the waveguide width $W_{bold}$ are also shown. In addition, for comparison, a line of $\Delta n(\lambda)=0.607 \cdot \lambda$ is also shown. As can be seen from comparison with this line, the characteristic when there is no width deviation ($W_{err}=0$) is generally proportional to a value obtained by multiplying the wavelength $\lambda$ by the coefficient 0.607. Therefore, since $\Delta n$, which is a numerator of Expression 6, is substantially proportional to $\lambda$, the entire expression is independent of the wavelength $\lambda$, and $\Delta\varphi=r$ can be substantially independent of the wavelength by selecting an appropriate $L_{bold}$.

FIG. 8A shows the wavelength dependence of the phase characteristic when the conventional wide-band switch element is turned OFF, and FIG. 8B shows the wavelength dependence of the cross path transmittance. In the wide-band switch element 40, the wavelength dependence of an inter-arm phase difference $\Delta\varphi$ is shown when $W_0=5$ µm, $W_{bold}=6$ µm, and $L_{bold}=821$ µm are satisfied. The cross path transmittance is the transmittance of the cross path (input port 41a→output port 42b and input port 42a→output port 41b) when the wide-band switch element 40 is turned OFF in these parameters. Here, the operation center wavelength $\lambda_0$ of the optical couplers 43a and 43b is set to 1.545 µm. In FIGS. 8A and 8B, similar to FIG. 7, the characteristics when the width deviation $W_{err}$ occurs are also shown. In addition, the linear approximation of the characteristic of the width deviation $W_{err}=0$ is also shown in FIG. 8A.

As can be seen from FIG. 8A, in the wavelength range 1.2 to 1.7 µm, $\Delta\varphi$ in the case of finishing ($W_{err}=0$) as designed is approximately within the range of +1 to −2% with respect to $\pi$. By reflecting the wavelength dependence of the phase characteristics, the cross path transmittance in the case of finishing as designed in a wavelength region of 1.2 to 1.7 µm is suppressed to −30 dB or less as shown in FIG. 8B. That is, the extinction ratio of 30 dB or more is obtained in the wavelength range of 1.2 to 1.7 µm. In this way, a high extinction ratio can be obtained in a wide wavelength range over 500 nm in the wide-band switch element 40.

In the configuration described in PTL 2, a phase generating optical coupler (PGC) having a special configuration is used as an optical coupler used in a Mach-Zehnder interferometer. In a normal optical coupler, when light inputted from one input port is outputted to two output ports, the phase difference is fixed to $\pi/2$. On the other hand, in the phase generating optical coupler, wavelength dependence can be given to the phase difference by an appropriate design. Thus, the inter-arm phase difference $\Delta\varphi$ in the OFF state is set to $\pi$ in a wide wavelength range.

However, the means for widening the wavelength band in which a high extinction ratio can be obtained, described in the above-mentioned PTL, has the following problems. The means described in PTL 1 shares a wavelength range in which a high extinction ratio can be obtained in each switch element. Since the method is not a method for widening the wavelength region of the single switch element, the wavelength region where a high extinction ratio is obtained is kept at about 140 nm in the double gate type switch element 20 using two switch elements. In order to further widen the band, there is a problem that it is necessary to increase the number of gates.

The means described in PTL 2 has a problem that the inter-arm phase difference $\Delta\varphi$ at the time of OFF is not strictly r but slightly wavelength dependence remains. Further, as a more serious problem, there is a problem that the manufacturing tolerance is small and the extinction ratio characteristic is greatly deteriorated due to a manufacturing error. In the former case, the wavelength dependence $\Delta n(\lambda)$ of the difference in the equivalent refractive index at the different waveguide widths shown in FIG. 7 is not strictly expressed as a function proportional to the wavelength $\lambda$ even if the first-order approximation is performed, but the problem results from being expressed by the linear function in the expression 8.

[Math. 7]

$$\Delta n(\lambda) = a \cdot \lambda + b \qquad \text{(Expression 8)}$$

Here, a and b are coefficients determined by widths $W_1$ and $W_2$ of the two waveguides to be compared, in the example of FIG. 7, $W_1=W_0$ and $W_2=W_{bold}$ are satisfied. Since this b is not zero, the wavelength dependence of the inter-arm phase difference $\Delta\varphi$ shown in FIG. 8A has an inclination even in the linear approximation line. That is, the inter-arm phase difference $\Delta\varphi$ has wavelength dependence.

The deterioration of the extinction ratio characteristic due to the manufacturing error of the latter is caused by a difference in the amount of change in the equivalent refractive index n in the case where the waveguide is deviated when the waveguide width W is different from each other. As can be seen from FIG. 6B, the waveguide width dependence of the equivalent refractive index is a curve, and the differential value dn/dW of the equivalent refractive index n to the waveguide width W becomes smaller as W becomes larger. That is, when the waveguide width is large, the amount of change in the equivalent refractive index n when the waveguide width W is deviated becomes smaller than when the waveguide width is small. In the wide-band switch element 40, since the waveguide width of the interference arm 44 and the waveguide width of the interference arm 45 are different from each other, when the waveguide width is deviated from a design value, the deviation of the equivalent refractive index of the waveguide of the interference arm 44 and the deviation of the equivalent refractive index of the interference arm 45 are different from each other.

That is, the differential value $d\Delta n/dW \neq 0$ is established at the difference $\Delta n$ between the equivalent refractive indices described in Expression 7. As shown in FIG. 7, when the width deviation $W_{err}=\pm0.2$ µm is satisfied, $\Delta n$ is deviated by about $\pm8\times10^{-5}$. Although this deviation appears to be very small, the length $L_{bold}$ of the portions having different widths, i.e., the working length is long as $L_{bold}=821$ µm, resulting in a phase difference variation which cannot be ignored. The inter-arm phase difference $\Delta\varphi$ calculated by using Expression 6 based on the variation amount of the difference $\Delta n$ of the equivalent refractive index is the characteristic line of the width deviation $W_{err}=\pm 0.2$ μm described in FIG. 8A. As can be seen from this, when the waveguide width is finished to be 0.2 μm thick or 0.2 μm thin as a whole due to the manufacturing error, the inter-arm phase difference op is deviated by about ±9% with respect to the designed value n. By reflecting this, the cross path transmittance in the case of the width deviation $W_{err}=\pm 0.2$ μm is increased to −20 dB or more as shown in FIG. 8B. That is, the extinction ratio is 20 dB or less, and it is greatly deteriorated.

In the means described in PTL 3, a phase generating optical coupler having a special configuration is used as the optical coupler, so that the configuration is complicated. Further, similar to the means described in PTL 2, there is a problem that the phase difference of the output light in the phase generating optical coupler varies depending on the manufacturing error, that is, the extinction ratio characteristic may deteriorate.

CITATION LIST

Patent Literature

[PTL 1] Japanese Patent Application Publication No. 2000-258808

[PTL 2] Japanese Patent Application Publication No. 2007-163825

[PTL 3] WO 2005/003852

[PTL 4] Japanese Patent Application Publication No. H03-213829

[PTL 5] Japanese Patent Application Publication No. 2012-252363

Non Patent Literature

[NPL 1] Akira Himeno, et al., "Silica-based planar light-wave circuits," IEEE Journal of Selected Topics in Quantum Electronics, vol. 4, No. 6, pp. 913-924, November/December 1998.

[NPL 2] Takashi Goh, et al., "Low loss and high extinction ratio strictly non-blocking 16×16 thermooptic matrix switch on 6-in wafer using silica-based planar lightwave circuit technology", IEEE Journal of Lightwave Technology, vol. 19, No. 3, pp. 371-379, March 2001.

[NPL 3] Toshio Watanabe, et al., "Compact PLC-based transponder aggregator for colorless and directionless ROADM", in Proceedings, Optical Fiber Communication Conference and NFOEC 2011, paper OTuD3, March 2011.

SUMMARY OF INVENTION

An object of the present invention is to provide an optical phase shifter in which a phase shift amount is kept constant over a wide wavelength range. Especially, the optical phase shifter is provided in which the amount of phase shift does not deviate and operates over a wide-band even if a waveguide width deviates due to the manufacturing error, that is, having a large manufacturing tolerance. Further, the optical switch is provided which uses the optical phase shifter, operates over the wide-band, and has a high extinction characteristic in a wide wavelength range.

In order to achieve such an object, an embodiment of the present invention is an optical phase shifter constituting of two waveguides of a basic width and having a phase difference between two lights propagating through each waveguide and is characterized in that the optical phase shifter is arranged in at least one of the two waveguides, includes a different type waveguide having a waveguide width different from the basic width and the configuration of the different type waveguide, and the parameters of the two waveguides and the different type waveguide are optimized.

BRIEF DESCRIPTION OF DRAWINGS

FIG. 1 is a diagram showing a configuration of a conventional N×N matrix switch.

FIG. 21B is a diagram showing the wavelength dependence of the transmittance of the cross path and the bar path when the wide-band switch element of the example 1 is turned ON.

FIG. 27 is a diagram showing a configuration of an optical complex signal detector according to the example 3 of the present invention.

FIG. 29 is diagram showing a modification example 1 of the 90 degrees optical hybrid of the example 3.

FIG. 31 is a diagram showing a modification example 2 of the 90 degrees optical hybrid of the example 3.

DESCRIPTION OF EMBODIMENTS

Hereinafter, embodiments and examples of the present invention will be described in detail with reference to the accompanying drawings. In the present embodiment and example, an example using a quartz-based optical waveguide is shown, but the present invention does not specify the material of the waveguide. The present invention can be applied not only to a quartz optical waveguide but also to other material waveguides such as a silicon (Si) waveguide, an indium phosphorus (InP) waveguide and a polymer waveguide. Further, as a specific design example of a waveguide, a waveguide having a specific refractive index difference $\Delta$ of 2%, a core height of 3.4 $\mu$m, and a reference waveguide width of 5 $\mu$m will be described. The present invention is not limited to the basic parameters of these waveguides, and the same concept can be applied to other parameters.

Figure 9:
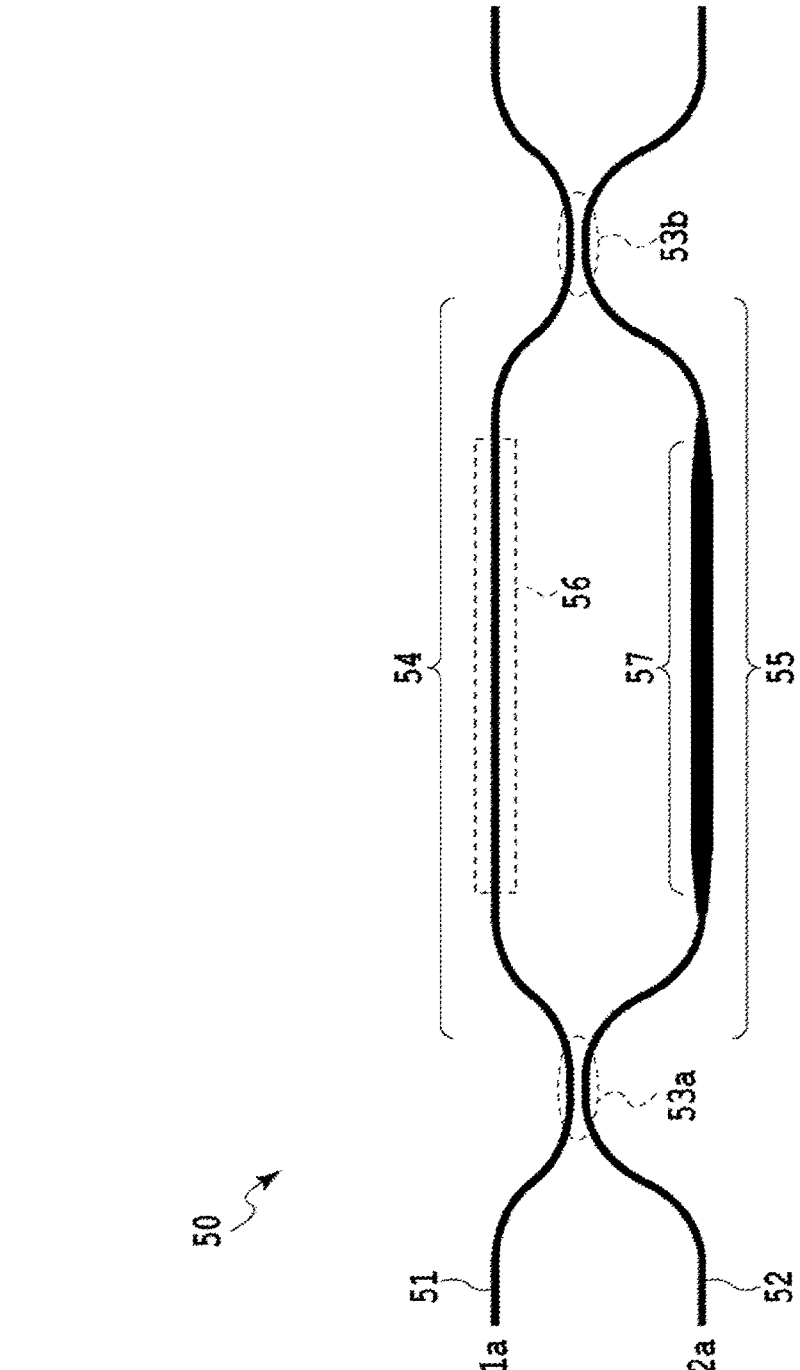
FIG. 9 is a diagram showing a configuration of a wide-band switch element according to an embodiment 1 of the present invention.

Embodiment 1: Wide-Band Switch in which an Inclination of a Linear Approximation Line of $\Delta\varphi(\lambda)$ is Completely Zero FIG. 9 shows a configuration of a wide-band switch element according to an embodiment 1 of the present invention. The wide-band switch element 50 is a Mach-Zehnder interferometer constituting of two waveguides, and an optical coupler 53a and an optical coupler 53b are connected by an interference arm 54 and an interference arm 55. The optical couplers 53a and 53b are constituted of directional couplers in which waveguides 51 and 52 are arranged close to each other. Usually, the optical coupling rate $\kappa$ of the optical couplers 53a and 53b is set to 50% at an operation wavelength $\lambda_0$. The interference arm 54 is provided with a thermooptic phase shifter 56 which can be locally heated by a thin film heater. The thermooptic phase shifter 56 functions as an electrically driven variable phase shifter.

A waveguide length $L_A$ of the interference arm 55 differs from a waveguide length $L_B$ of the interference arm 54 by a difference $\Delta L$ ($=L_A-L_B$). In addition, a waveguide width of the interference arm 54 and a waveguide width of the interference arm 55 are partially different. Specifically, when a reference waveguide width of a normal waveguide is $W^0$ (basic width), a part of the waveguide is a wide waveguide 57 having a waveguide width $W_{bold}$ ($>W_0$) over a length $L_{bold}$ in the interference arm 55. The waveguide of the interference arm 54 is constituted with a constant width $W_0$. Although a tapered waveguide is formed at a connecting portion between the normal waveguide portion and the wide waveguide 57 so as not to cause an increase in loss, the tapered waveguide connection is ignored in the following characteristic calculation for simplifying the description.

Note that the difference between the waveguide width of the interference arm 54 and the waveguide width of the interference arm 55 is a relative difference, and the waveguide width of the interference arm 55 may be a normal waveguide width, and a narrow waveguide having a waveguide width narrower than the basic width $W_0$ may be provided in a part of the interference arm 54. In addition, a narrow waveguide may be provided in a part of the interference arm 54, and a wide waveguide may be provided in the interference arm 55. In this way, the portions having the different waveguide width is called a different type waveguide. The wide-band switch element 50 is different from the switch element 30 in that the waveguide width of the interference arm 54 and the waveguide width of the interference arm 55 are different from each other, and different from the wide-band switch element 40 in that the waveguide length $L_A$ of the interference arm 55 and the waveguide length $L_B$ of the interference arm 54 are different from each other.

In the configuration of the embodiment 1, the phase difference $\Delta\varphi$ between the two interference arms is expressed by the following expression. When the position of the light propagation direction of the wide waveguide 57 is defined as 1, the following expression is established.

[Math. 8]

(Expression 9)

$$\Delta\phi = 2\pi \frac{n(W_0)\cdot L_A - n(W_0)\cdot L_B + \int_0^{L_1}\{n(W_{bold}(l)) - n(W_0)\}\cdot dl}{\lambda} =$$

$$-2\pi\frac{n(W_0)\cdot L_B - n(W_0)\cdot L_A + n(W_0)\cdot L_{bold} - n(W_{bold})\cdot L_{bold}}{\lambda} =$$

$$2\pi\frac{n(W_0)\cdot \Delta L + \Delta n\cdot L_{bold}}{\lambda}$$

Here, n(W) represents an equivalent refractive index of the waveguide in the waveguide width W. In addition, the difference $\Delta n$ between the equivalent refractive indices of the normal waveguide and the wide waveguide is expressed by Expression 7.

$n(W_0)$ can be expressed by a linear function of the wavelength $\lambda$ as shown by the following expression when the first-order approximation is performed.

[Math. 9]

$$n(\lambda) = a'\lambda + b' \quad \text{(Expression 10)}$$

By substituting Expressions 8 and 10 into Expression 9, the following expression is obtained.

[Math. 10]

$$\Delta\phi = 2\pi\frac{(a'\cdot\lambda + b')\cdot \Delta L + (a\cdot\lambda + b)\cdot L_{bold}}{\lambda} = \quad \text{(Expression 11)}$$

$$2\pi\left\{a'\cdot\Delta L + a\cdot L_{bold} + \frac{b'\cdot\Delta L + b\cdot L_{bold}}{\lambda}\right\}$$

Therefore, by selecting $\Delta L$ and $L_{bold}$ satisfying the simultaneous expressions (Expressions 12 and 13), $\Delta\varphi=\pi$ can be satisfied in the first-order approximation.

[Math. 10]

$$a'\cdot\Delta L + a\cdot L_{bold} = 0.5 \quad \text{(Expression 12)}$$

$$b'\cdot\Delta L + b\cdot L_{bold} = 0 \quad \text{(Expression 13)}$$

This means that Expression 14 is minimized in a required wavelength range.

[Math. 11]

$$\int(\Delta\phi - \pi)^2 d\lambda \quad \text{(Expression 14)}$$

Figure 10A:
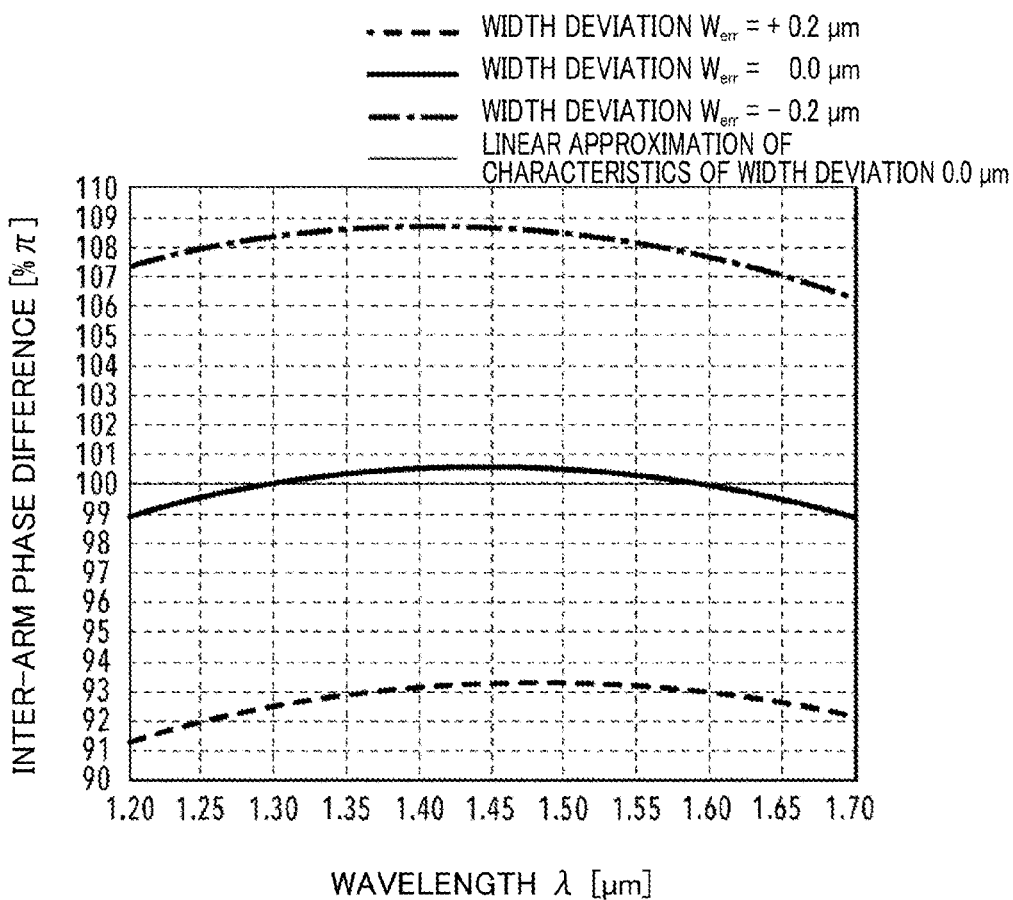
FIG. 10A is a diagram showing the wavelength dependence of the phase characteristics when the wide-band switch element of the embodiment 1 is turned OFF.

FIG. 10A shows the wavelength dependence of the phase characteristic when the wide-band switch element of the

Figure 10B:
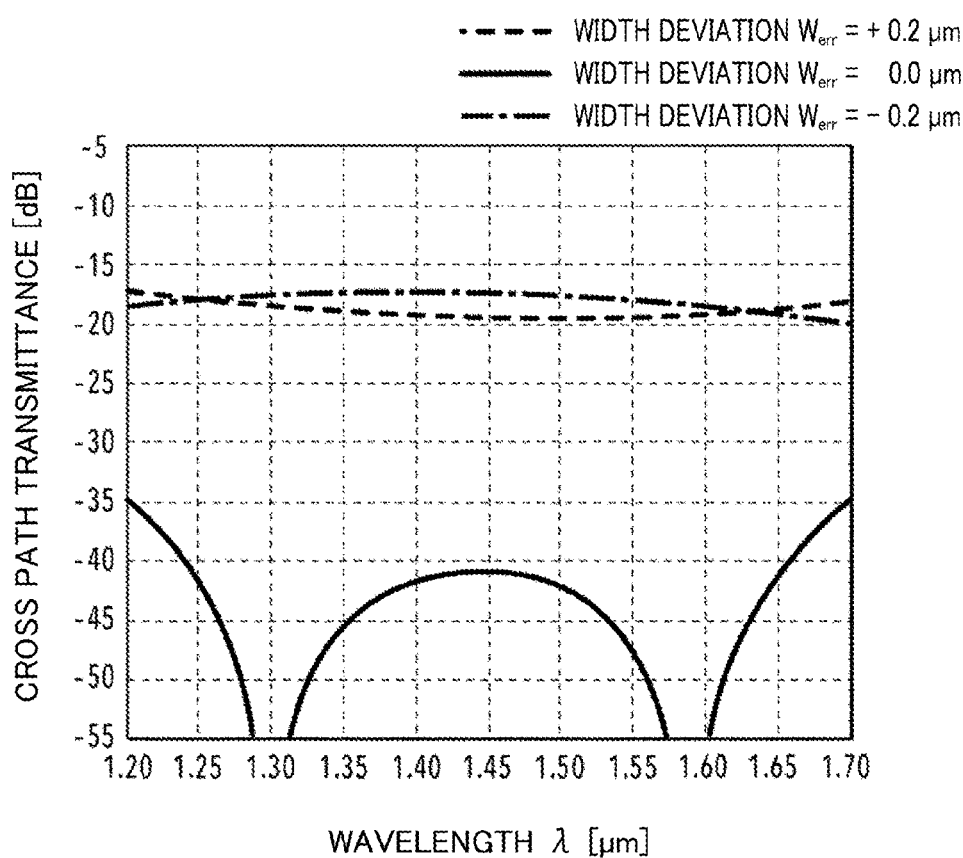
FIG. 10B is a diagram showing the wavelength dependence of the cross path transmittance when the wide-band switch element of embodiment 1 is turned OFF.

12 embodiment 1 is turned OFF, and FIG. 10B shows the wavelength dependence of the cross path transmittance. In the wide-band switch element 50, as design parameters satisfying Expressions 12 and 13, in a case of $W_0$=5 μm, $W_{bold}$=6 μm, $L_{bold}$=791 μm and $\Delta L$=0.0181 μm, the wavelength dependence of the inter-arm phase difference $\Delta\varphi$ is shown. The cross path transmittance is the transmittance of the cross path (input port 51$a$→output port 52$b$ and input port 52$a$→output port 51$b$) when the wide-band switch element 50 is turned OFF in these parameters.

Here, the operation center wavelength $\lambda_0$ of the optical couplers 53$a$ and 53$b$ is 1.545 μm. Both FIGS. 10A and 10B show the characteristics when the width deviation $W_{err}$ occurs. Also, FIG. 10A shows the linear approximation of the characteristic of the width deviation $W_{err}$=0.

As can be seen from the line of linear approximation in FIG. 10A, the inclination is completely zero. That is, the wavelength dependency of the inter-arm phase difference $\Delta\varphi$ is completely eliminated in the first-order approximation. By reflecting this, the cross path transmittance in the case of finishing ($W_{err}$=0) as designed in a wavelength region 1.2 to 1.7 μm is suppressed to −35 dB or less as shown in FIG. 10B, and almost symmetrical characteristics are obtained in this wavelength region.

Thus, in the wide-band switch element 50, the wavelength dependence of the inter-arm phase difference $\Delta\varphi$ at the OFF time can be completely eliminated in the first-order approximation manner, and an extremely high extinction ratio can be obtained in a wide wavelength range over 500 nm. In the conventional wide-band switch element 40, only one parameter which can be set is one of the lengths $L_{bold}$ of the wide waveguide 47. In the wide-band switch element 50 of the embodiment 1, two parameters, i.e., the difference $\Delta L$ between the waveguide lengths of the interference arm 55 and the interference arm 54, can be set in addition to the length $L_{bold}$ of the wide waveguide 57, and the degree of freedom in design is increased.

As can be seen from FIG. 10A, when a $W_{err}$ occurs due to a manufacturing error and the waveguide width is finished to be 0.2 μm thick or 0.2 μm thin as a whole, the inter-arm phase difference $\Delta\varphi$ is deviated by about ±9% with respect to the designed value $\pi$. By reflecting this, the cross path transmittance in the case of width deviation $W_{err}$=0.2 μm is increased to −20 dB or more as shown in FIG. 10B. Therefore, the extinction ratio characteristic is deteriorated due to a manufacturing error for the same reason as that of the conventional wide-band switch element 40 described above.

Embodiment 2: Wide-Band Switch 1 has a Large Manufacturing Tolerance

Figure 11:
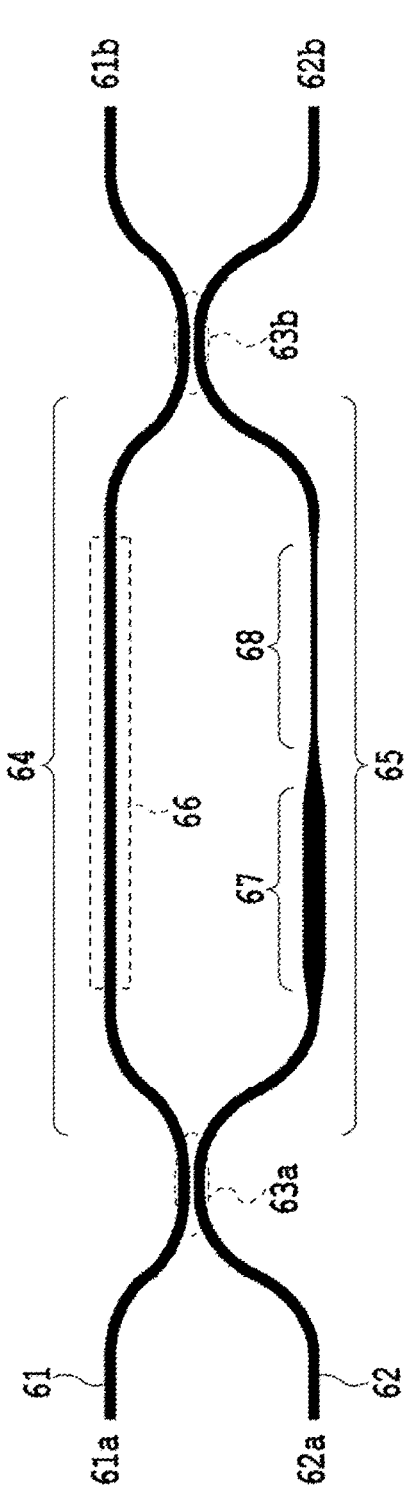
FIG. 11 is a diagram showing a configuration of a wide-band switch element according to an embodiment 2 of the present invention.

FIG. 11 shows a configuration of a wide-band switch element according to an embodiment 2 of the present invention. The wide-band switch element 60 is a Mach-Zehnder interferometer constituting of two waveguides, and an optical coupler 63$a$ and an optical coupler 63$b$ are connected by an interference arm 64 and an interference arm 65. The optical couplers 63$a$ and 63$b$ are constituted of directional couplers in which waveguides 61 and 62 are arranged close to each other. Usually, the optical coupling rate κ of the optical couplers 63$a$ and 63$b$ is set to 50% at the operation wavelength $\lambda_0$. The interference arm 64 is provided with a thermooptic phase shifter 66 capable of local heating using a thin film heater. The thermooptic phase shifter 66 functions as an electrically driven variable phase shifter.

A waveguide length $L_A$ of the interference arm 65 differs from a waveguide length $L_B$ of the interference arm 64 by a difference $\Delta L$ ($=L_A-L_B$). In addition, a waveguide width of the interference arm 64 and a waveguide width of the interference arm 65 are partially different. Specifically, when two different type waveguides are included and the reference waveguide width of a normal waveguide is $W_0$ (basic width), a part of the waveguide becomes a wide waveguide 67 having a waveguide width $W_{bold}$ ($>W_0$) over a length $L_{bold}$ in the interference arm 65. In addition, another part of the waveguide is a narrow waveguide 68 having a waveguide width $W_{narrow}$ ($<W_0$) over a length $L_{narrow}$. The waveguide of the interference arm 64 is constituted with a constant width $W_0$. Although a tapered waveguide is formed at a connecting portion between the normal waveguide portion and the wide waveguide 67 and the narrow waveguide 68 so as not to cause an increase in loss, the tapered waveguide connection is ignored in the following characteristic calculation for simplifying the description.

Note that the difference between the widths $W_0$, $W_{narrow}$, and $W_{bold}$ is a relative difference, and the expression that the basic width $W_0$ is a normal waveguide width is convenient. When the waveguide width $W_0$ of the interference arm 64 is used as a reference, it is sufficient that the waveguide width $W_{bold}$ of the wide waveguide 67 and the waveguide width $W_{narrow}$ of the narrow waveguide 68 which are the different type waveguides satisfies $W_{narrow}<W_0<W_{bold}$. The wideband switch element 60 is a similar configuration to the switch element 50 of the embodiment 1, but is different in that not only the wide waveguide 67 but also the narrow waveguide 68 are provided in the interference arm 65.

In the configuration of the embodiment 2, the phase difference $\Delta q$ between the two interference arms is expressed by the following expression. When the positions of the wide waveguide 67 and the narrow waveguide 68 in the propagation direction of light are defined as 1, the following expression is established.

[Math. 12]

$$
\begin{aligned}
\Delta\phi = 2\pi \cdot \frac{
\begin{aligned}
& n(W_0)\cdot L_A - n(W_0)\cdot L_B + \int_0^{L_1} \\
& \{n(W_{bold}(l)) - n(W_0)\}\cdot dl + \\
& \int_0^{L_2} \{n(W_{narrow}(l)) - n(W_0)\}\cdot dl
\end{aligned}
}{\lambda} \\
= -2\pi \frac{
\begin{aligned}
& n(W_0)\cdot L_B - n(W_0)\cdot L_A + n(W_0\cdot L_{bold} - \\
& n(W_{bold})\cdot L_{bold} + n(W_0)\cdot \\
& L_{narrow} - n(W_{narrow})\cdot L_{narrow}
\end{aligned}
}{\lambda} \\
= 2\pi \frac{n(W_0)\cdot \Delta L + \Delta n_{bold}\cdot L_{bold} + \Delta n_{narrow}\cdot L_{narrow}}{\lambda}
\end{aligned}
$$

(Expression 15)

Here, n(W) represents an equivalent refractive index of the waveguide in the waveguide width W. A difference $\Delta n_{bold}$ between the equivalent refractive indices of the normal waveguide and the wide waveguide, and a difference $\Delta n_{narrow}$ between the equivalent refractive indices of the normal waveguide and the narrow waveguide are used.

[Math. 13]

$$\Delta n_{bold} = n(W_{bold}) - n(W_0) \qquad \text{(Expression 16)}$$

$$\Delta n_{narrow} = n(W_{narro}) - n(W_0) \qquad \text{(Expression 17)}$$

Figure 7:
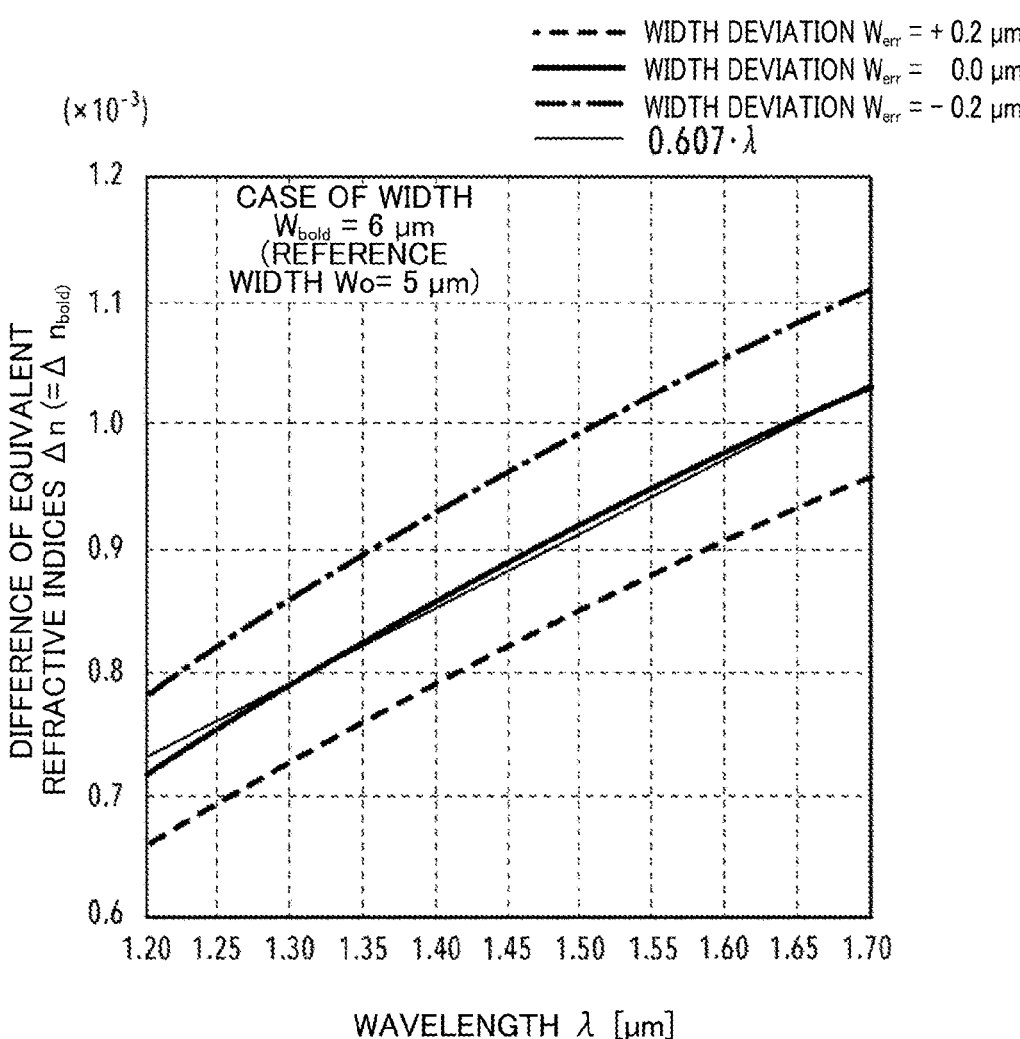
FIG. 7 is a diagram showing the wavelength dependence of a difference of the equivalent refractive index in a waveguide width different from a reference waveguide width.
Figure 8A:
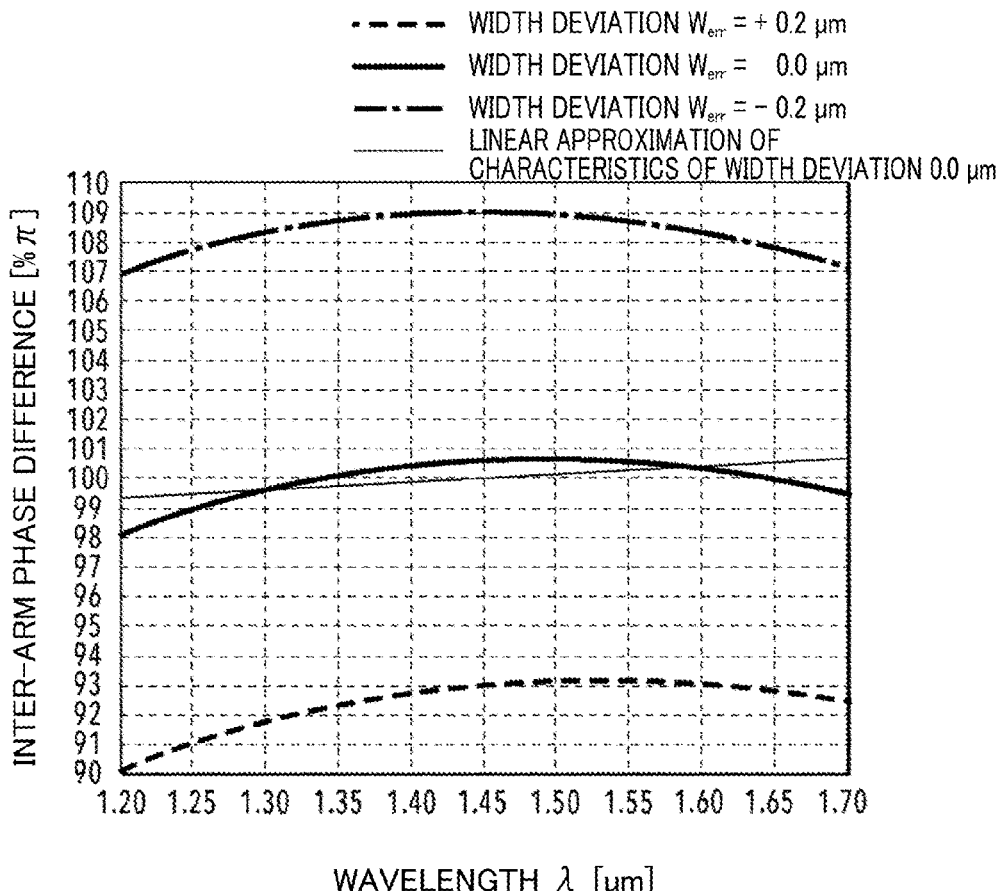
FIG. 8A is a diagram showing the wavelength dependency of the phase characteristics when the conventional wide-band switch element is turned OFF.
Figure 8B:
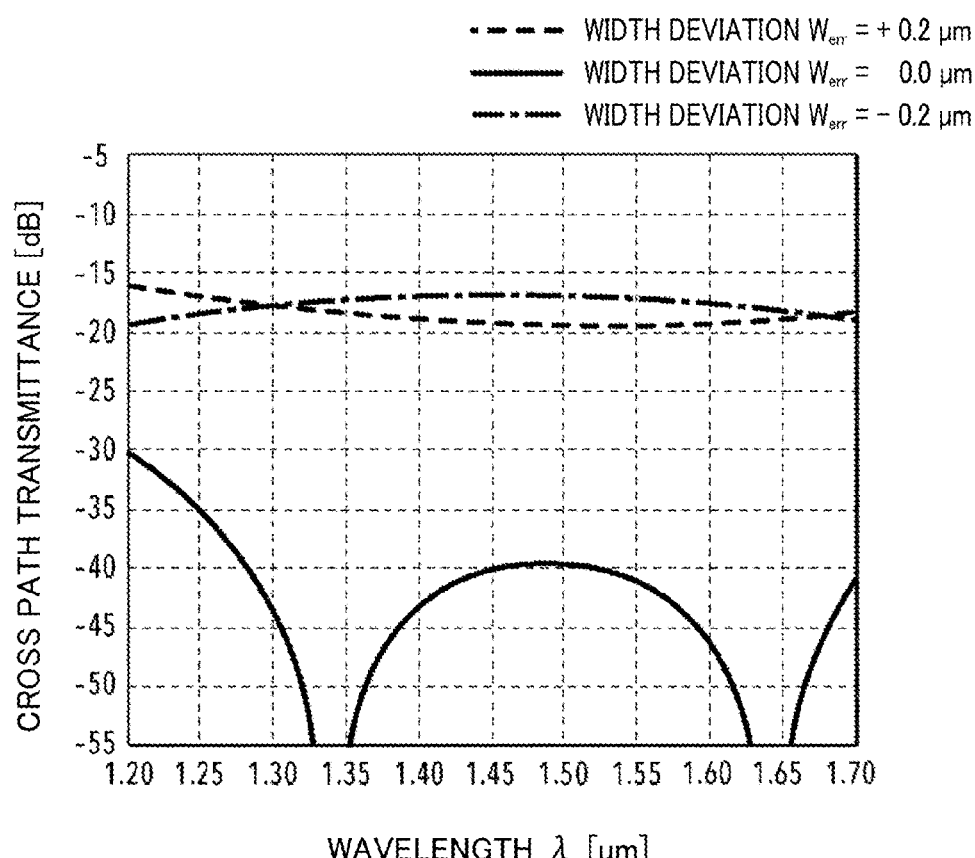
FIG. 8B is a diagram showing the wavelength dependence of the cross path transmittance when the conventional wide-band switch element is turned OFF.

$\Delta n_{bold}$ is the same as $\Delta n$ shown in Expression 7, and when $W_0=5$ μm and $W_{bold}=6$ μm are satisfied, the wavelength dependence of $\Delta n_{bold}$ is the same as that of FIG. 7. As can be seen by comparing the characteristics of the width deviation $W_{err}$ of ±0.2 μm, the differential value $d\Delta n_{bold}/dW$ with respect to the waveguide width W becomes negative at the difference $\Delta n_{bold}$ of the equivalent refractive index. That is, $d\Delta n_{bold}/dW<0$ is established.

Figure 2:
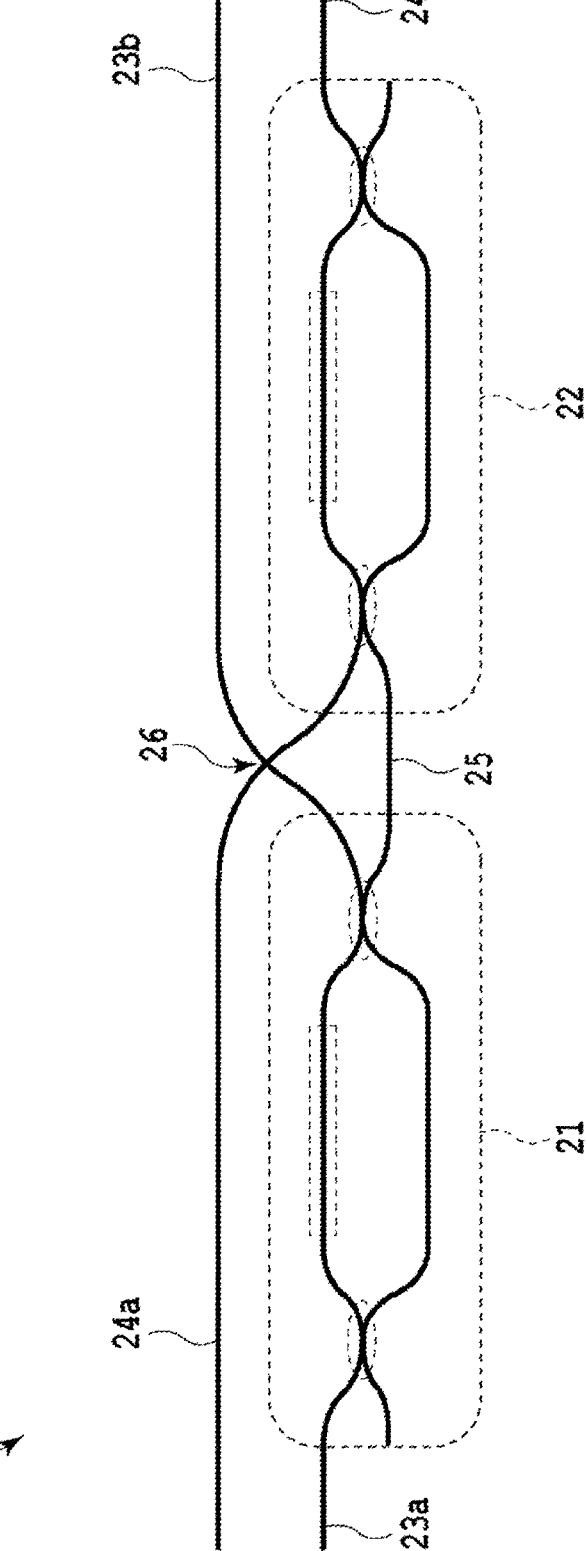
FIG. 2 is a diagram showing a configuration of a conventional double gate type switch element.
Figure 3:
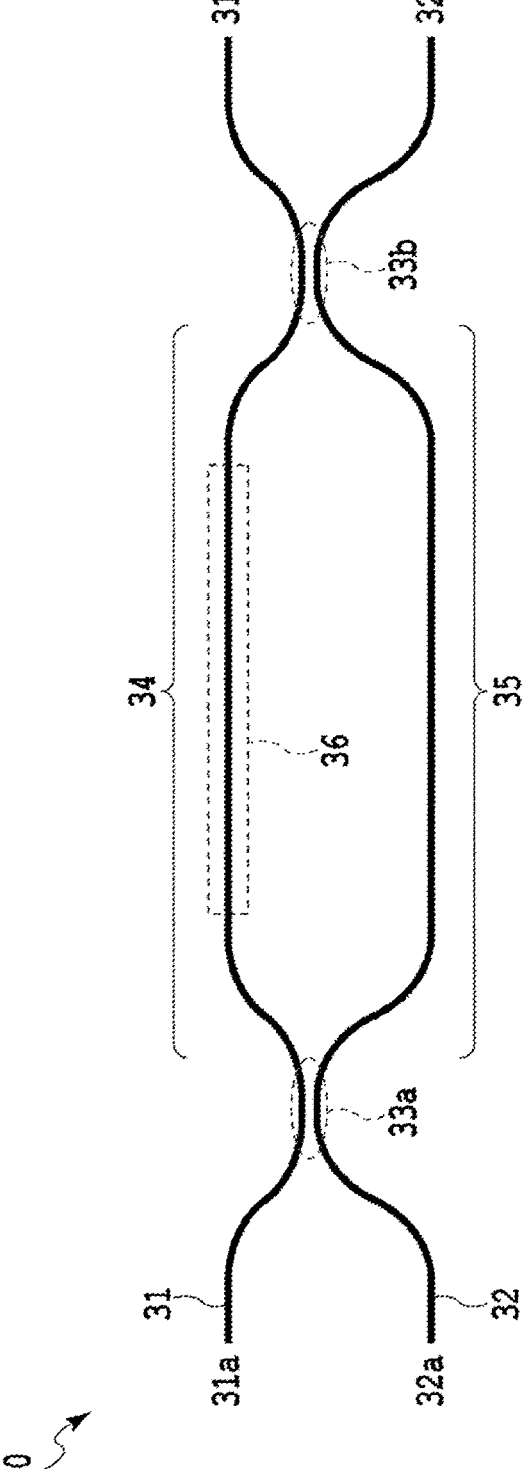
FIG. 3 is a diagram showing a configuration of a conventional switch element.
Figure 4A:
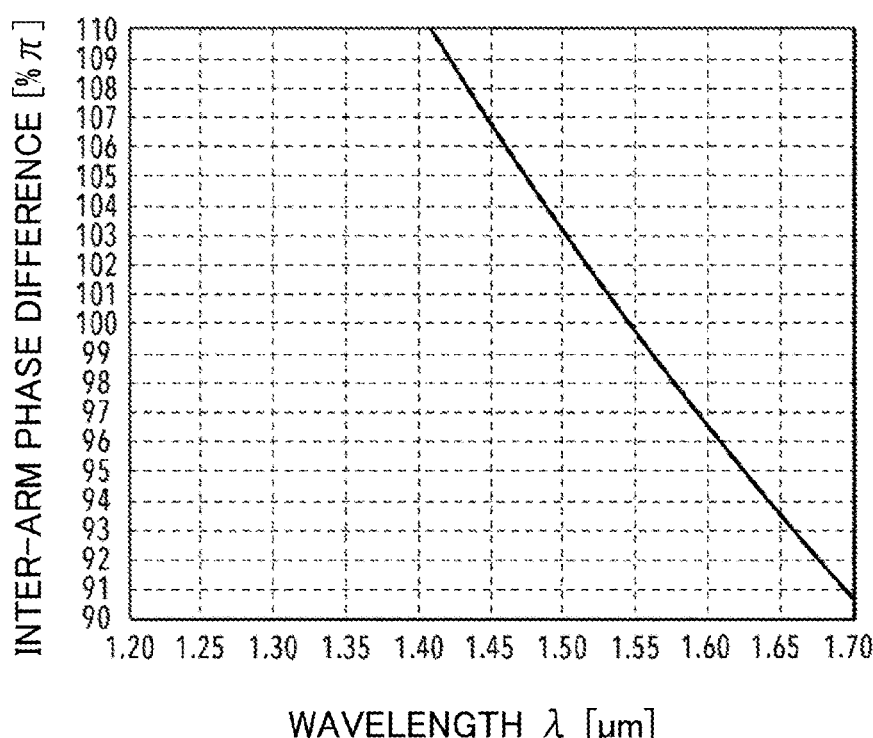
FIG. 4A is a diagram showing a wavelength dependence of a phase characteristics when the conventional switch element is turned OFF.
Figure 4B:
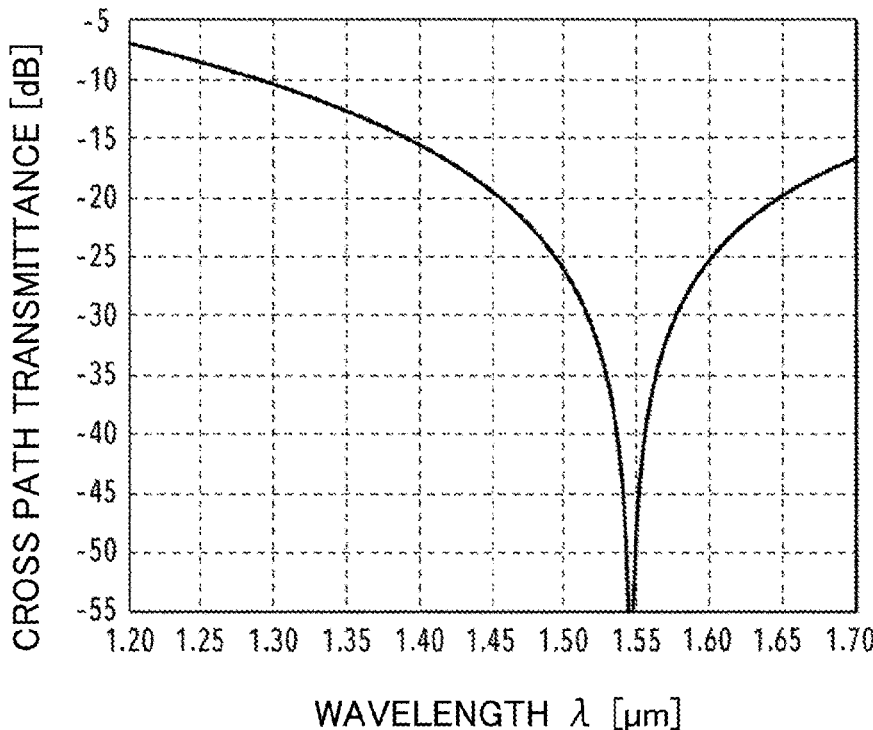
FIG. 4B is a diagram showing the wavelength dependence of a cross path transmittance when the conventional switch element is turned OFF.
Figure 5:
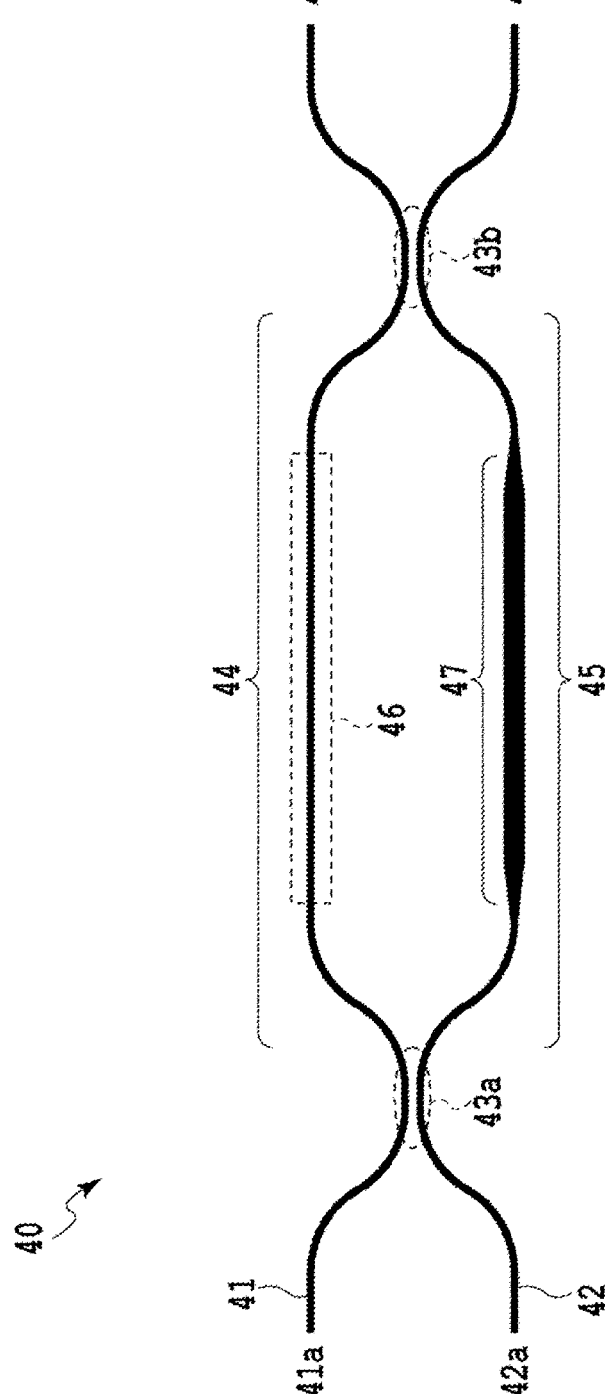
FIG. 5 is a diagram showing a configuration of a conventional wide-band switch element.
Figure 6A:
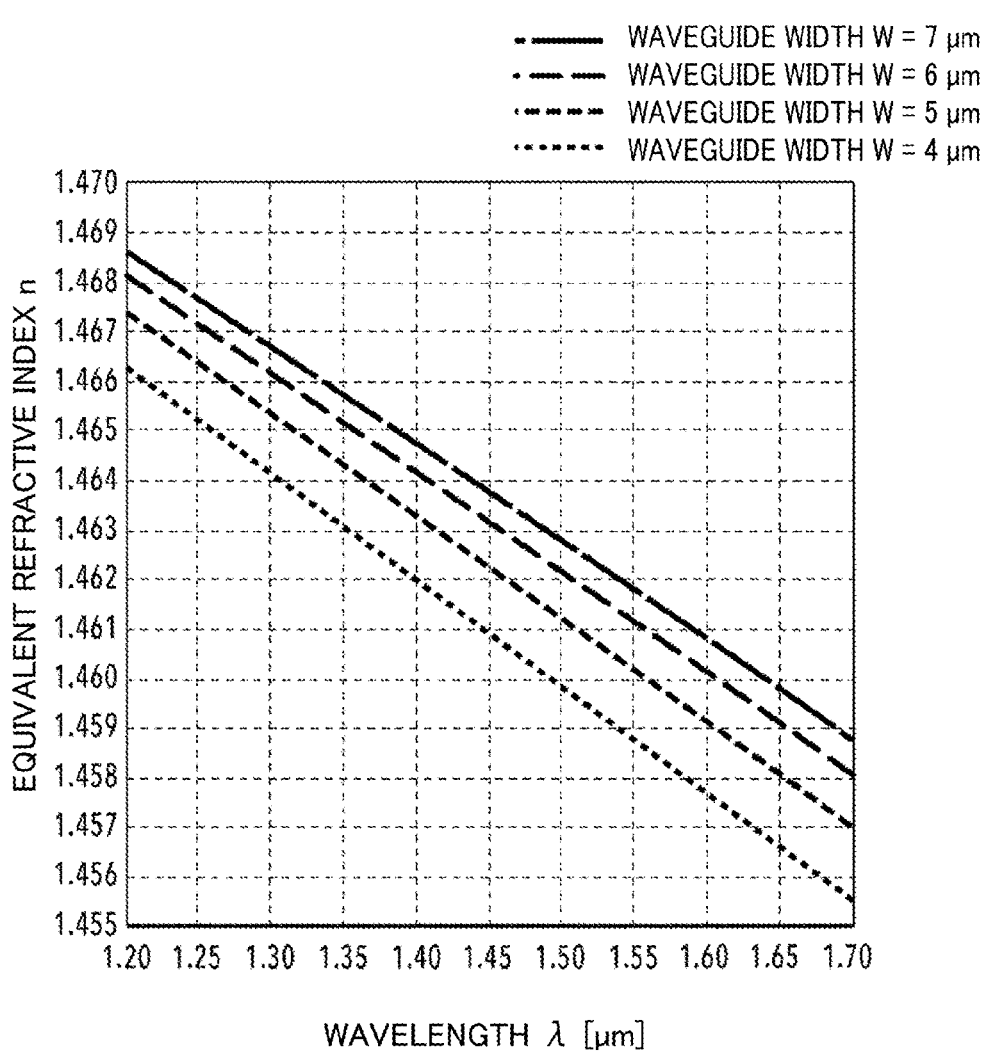
FIG. 6A is a diagram showing the wavelength dependence of an equivalent refractive index of the conventional wide-band switch element.
Figure 6B:
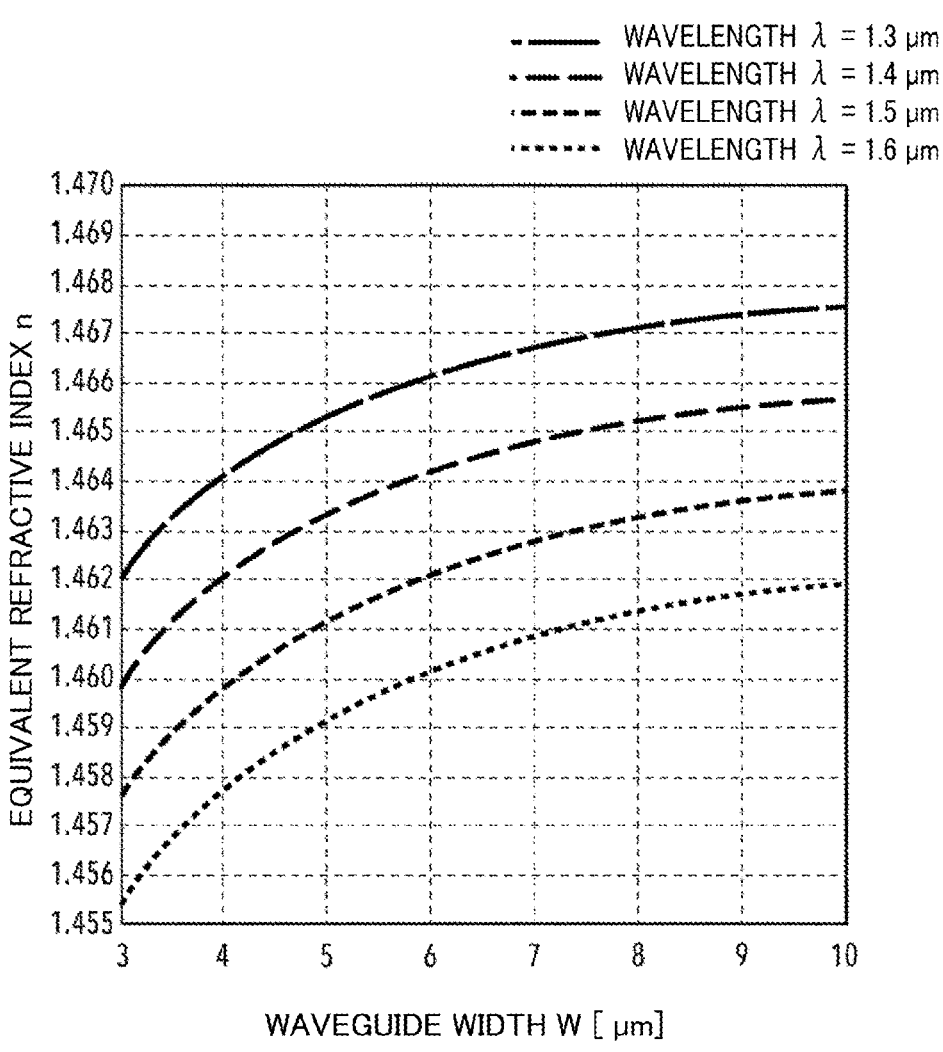
FIG. 6B is a diagram showing the waveguide width dependence of the equivalent refractive index of the conventional wide-band switch element.
Figure 12A:
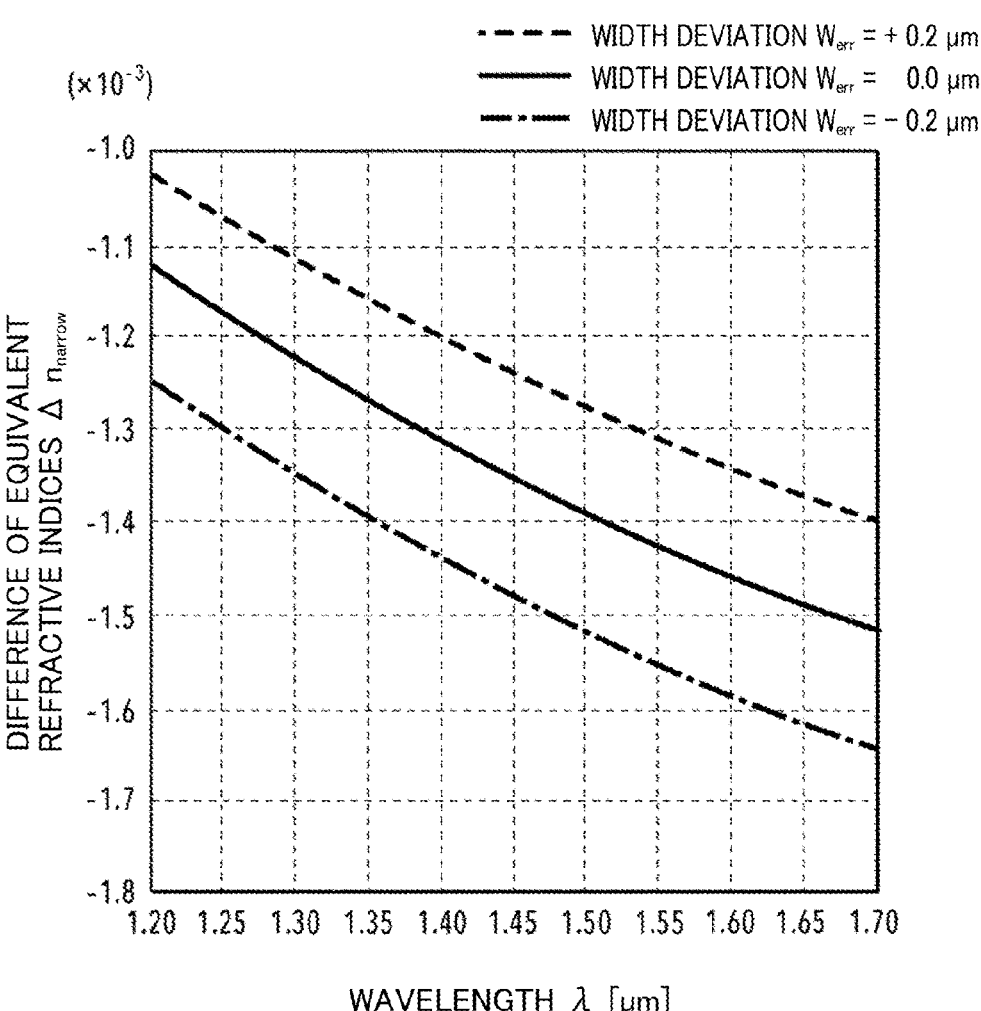
FIG. 12A is a diagram showing the waveguide width dependence of the equivalent refractive index in the waveguide width different from the reference waveguide width.

FIG. 12A shows the waveguide width dependence of the equivalent refractive index in a waveguide width different from the reference waveguide width. The wavelength dependence of the difference $\Delta n_{narrow}$ of the equivalent refractive index is shown in the case of waveguide width $W_{narrow}=4$ μm with respect to the equivalent refractive index of reference waveguide width $W_0=5$ μm. That is, the difference between the equivalent refractive indices of the waveguide widths W=5 μm and 4 μm in FIG. 6A is shown. Note that in FIG. 12A, the characteristics when the width deviation $W_{err}$ occurs simultaneously in both waveguide width of the reference waveguide width $W_0$ and the waveguide width $W_{narrow}$ are also shown. As can be seen by comparing the characteristics of the width deviation $W_{err}$ of +0.2 μm, the differential value $d\Delta n_{narrow}/dW$ with respect to the waveguide width W becomes positive at the difference $\Delta n_{narrow}$ of the equivalent refractive index. That is, $d\Delta n_{narrow}/dW>0$ is established.

When the wide waveguide 67 and the narrow waveguide 68 are combined, the average equivalent refractive index $n_{avg}$ is reflected by the respective lengths as weighting, and is expressed by the following expression.

[Math. 14]

$$n_{avg} = \frac{L_{bold}\cdot n(W_{bold}) + L_{narrow}\cdot n(W_{narrow})}{L_{bold} + L_{narrow}} \qquad \text{(Expression 18)}$$

Therefore, a difference $\Delta n_{avg}$ between the average equivalent refractive index $n_{avg}$ between the wide waveguide 67 and the narrow waveguide 68 with respect to an equivalent refractive index $n(W_0)$ of the waveguide having the reference waveguide width $W_0$ is as follows.

[Math. 15]

$$\Delta n_{avg} = n_{avg} - n(W_0) = \frac{L_{bold}\cdot \Delta n_{bold} + L_{narrow}\cdot \Delta n_{narrow}}{L_{bold} + L_{arrow}} \qquad \text{(Expression 19)}$$

A differential value $d\Delta n_{avg}/dW$ of the waveguide width W of $\Delta n_{avg}$ is as follows.

[Math. 16]

$$\frac{d\Delta n_{avg}}{dW} = \frac{L_{bold}\dfrac{d\Delta n_{bold}}{dW} + L_{narrow}\dfrac{\Delta n_{narrow}}{dW}}{L_{bold} + L_{narrow}} \qquad \text{(Expression 20)}$$

Therefore, by selecting an appropriate ratio of $L_{bold}$ and $L_{narrow}$, $d\Delta n_{avg}/dW=0$ can be obtained. For example, when $W_0=5$ μm, $W_{bold}=9$ μm, and $W_{narrow}=3.5$ μm are satisfied, the ratio of length in which $d\Delta n_{avg}/dW=0$ is established $L_{bold}:L_{narrow}$ is 42:58. Strictly speaking, since Expression 20 has the wavelength dependence, the ratio is calculated by the least square method in the wavelength range of 1.2 to 1.7 μm.

[Math. 17]

$$\int_{1.2}^{1.7} \left( \frac{d\Delta n_{avg}}{dW} \right)^2 d\lambda \qquad \text{(Expression 21)}$$

In other words, the ratio that minimizes expression 21 is calculated.

Figure 12B:
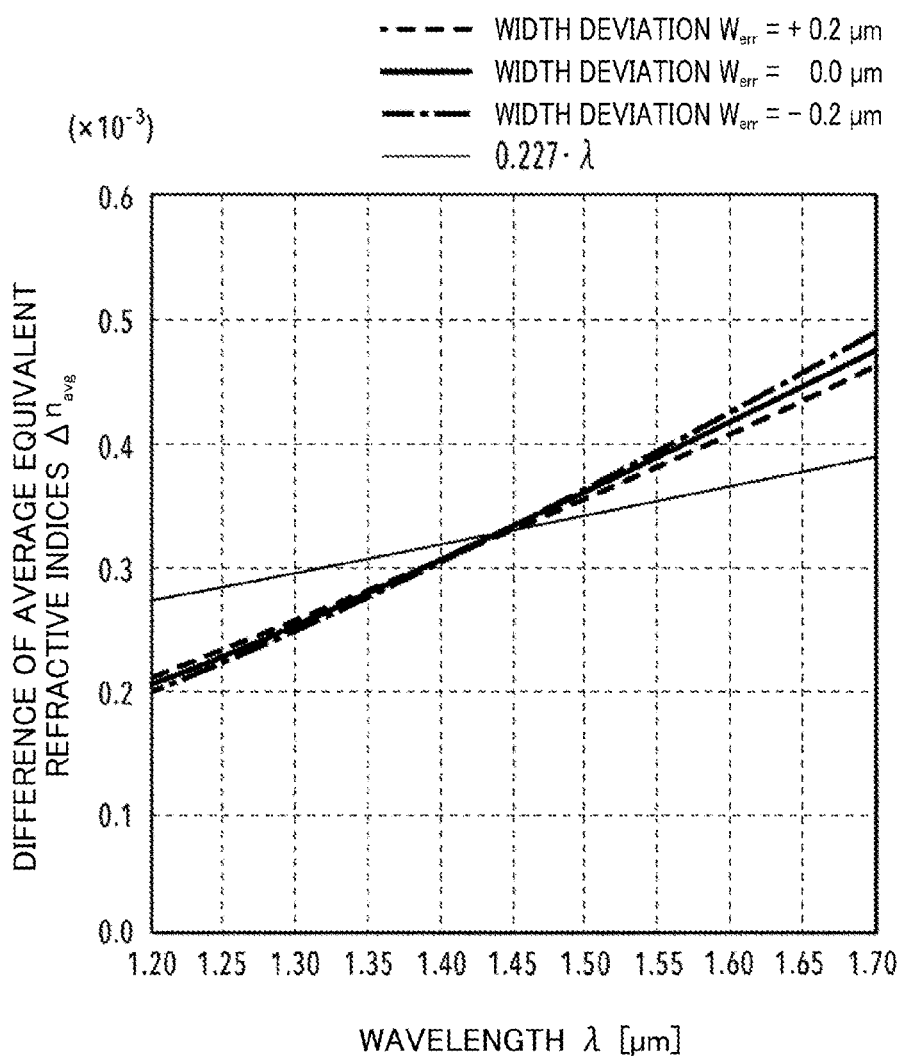
FIG. 12B is a diagram showing the wavelength dependence of the difference in average equivalent refractive index when two types of waveguide widths different from the reference waveguide width are combined.

FIG. 12B shows the wavelength dependence of the difference between the average equivalent refractive indices when two kinds of waveguide widths different from the reference waveguide width are combined. FIG. 12B also shows characteristics when a width deviation $W_{err}$ occurs simultaneously in all of the reference waveguide width $W_0$, the waveguide width $W_{bold}$, and the waveguide width $W_{narrow}$. In addition, for comparison, a line of $\Delta n_{avg}$ ($\lambda$)=0.227·$\lambda$ is also shown. Unlike the difference $\Delta n$ of the equivalent refractive index shown in FIG. 7, it can be seen that the average difference $\Delta n_{avg}$ of the equivalent refractive indices $n_{avg}$ hardly changes its characteristics even if the width deviation $W_{err}$ occurs. On the other hand, as can be seen from the comparison with a line of 0.227·$\lambda$, $\Delta n_{avg}$ is not proportional to the wavelength $\lambda$ but is expressed by a linear function of $\lambda$.

That is, in the expression of Expression 8, b≠0 is clearly established. Therefore, in order to suppress the wavelength dependence of the inter-arm phase difference $\Delta\varphi$ at the OFF time to be flat, it is very important to provide the difference $\Delta L$ between the waveguide lengths of the interference arm 65 and the interference arm 64. That is, although the wavelength independence of $\Delta\varphi$ can be enhanced by providing $\Delta L$ in the wide-band switch element 50 of the embodiment 1, the provision of $\Delta L$ is essential for wavelength independence of $\Delta\varphi$ in the wide-band switch element 60 of the embodiment 2.

Expression 15 can be expressed as Expression 22 by using Expression 19.

[Math. 18]

$$\Delta\phi = 2\pi \frac{n(W_0) \cdot \Delta L + \Delta n_{avg} \cdot (L_{bold} + L_{narrow})}{\lambda} \qquad \text{(Expression 22)}$$

Further, Expression 22 can be modified into Expression 23 by using Expressions 8 and 10.

[Math. 19]

$$\Delta\phi = 2\pi \left\{ \frac{a' \cdot \Delta L + a \cdot (L_{bold} + L_{narrow}) +}{b' \cdot \Delta L + b \cdot (L_{bold} + L_{narrow})} \right\} \qquad \text{(Expression 23)}$$

With the same concept as in the embodiment 1, by selecting $\Delta L$, $L_{bold}$, and $L_{narrow}$ satisfying the simultaneous equations (Expressions 24 and 25), $\Delta\varphi=\pi$ is established in the first-order approximation.

[Math. 20]

$$a' \cdot \Delta L + a \cdot (L_{bold} + L_{narrow}) = 0.5 \qquad \text{(Expression 24)}$$

$$b' \cdot \Delta L + b \cdot (L_{bold} + L_{narrow}) = 0 \qquad \text{(Expression 25)}$$

Of course, $L_{bold}$ and $L_{narrow}$ are the ratio of $d\Delta n_{avg}/dW=0$ in Expression 20.

In Expression 22, strictly speaking, the value of not only $\Delta n_{avg}$ but also n ($W_0$) varies when the width deviation $W_{err}$ occurs. That is, dn/dW≠0 is satisfied, but as describe below normally, $\Delta L$ multiplied to n($W_0$) is extremely small as compared with $L_{bold}+L_{narrow}$ multiplied to $\Delta n_{avg}$, so that the variation caused by dn/dW≠0 can be ignored. Of course, the design may be performed in consideration of this. In this case, for the inter-arm phase difference $\Delta\varphi$ shown by Equation 15 in the required wavelength range, $\Delta L$, $L_{bold}$, and $L_{narrow}$ are calculated so that Expressions 26 and 27 are minimum.

[Math. 21]

$$\int \left( \frac{d\Delta\phi}{dW} \right)^2 d\lambda \qquad \text{(Expression 26)}$$

$$\int (\Delta\phi - \pi)^2 d\lambda \qquad \text{(Expression 27)}$$

Figure 13A:
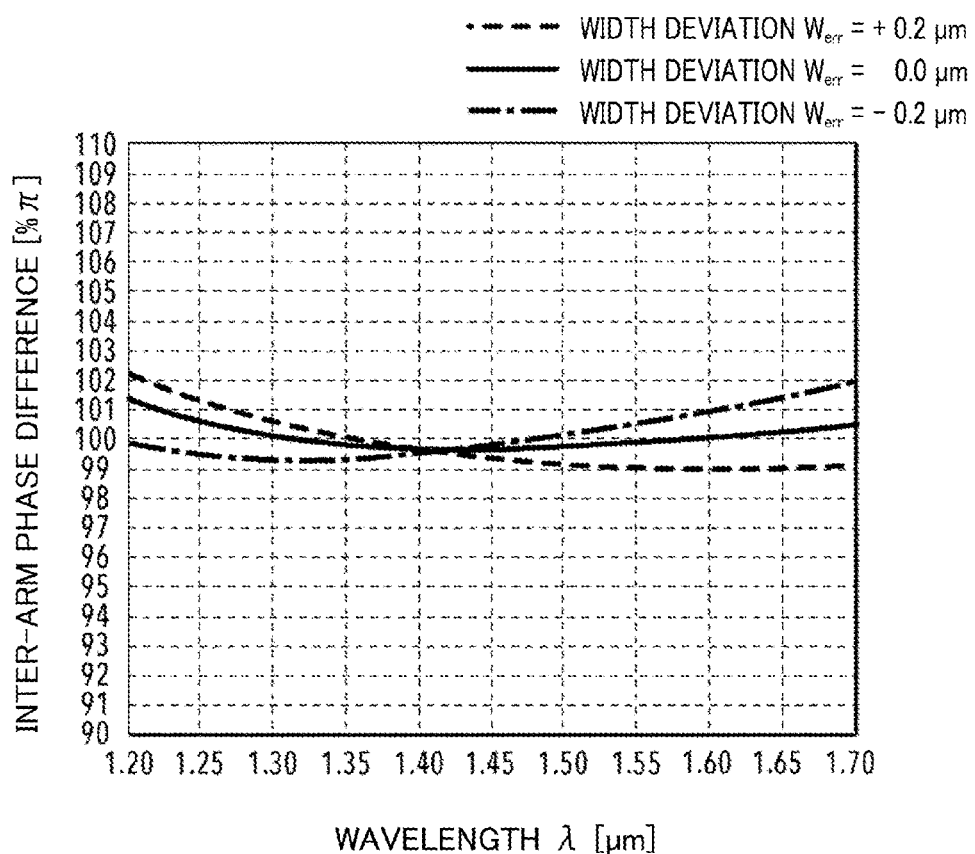
FIG. 13A is a diagram showing the wavelength dependency of the phase characteristics when the wide-band switch element of the embodiment 2 is turned OFF.
Figure 13B:
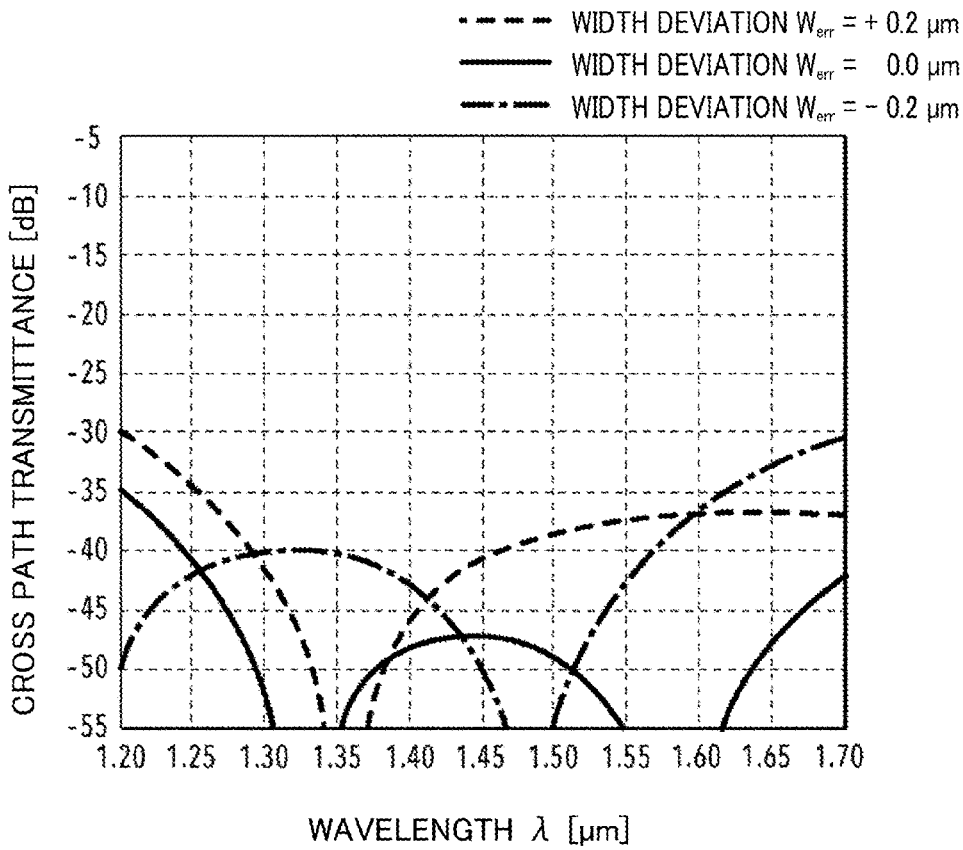
FIG. 13B is a diagram showing the wavelength dependence of the cross path transmittance when the wide-band switch element of the embodiment 2 is turned OFF.

FIG. 13A shows the wavelength dependence of the phase characteristic when the wide-band switch element of the embodiment 2 is turned OFF, and FIG. 13B shows the wavelength dependence of the cross path transmittance. In the case where $W_0$=5 μm, $W_{bold}$=9 μm, and $W_{narrow}$=3.5 μm in the wide band switch element 60 are satisfied, $L_{bold}$=542 μm, $L_{narrow}$=397 μm, and $\Delta L$=0.2836 μm are obtained as design parameters satisfying the above. The cross path transmittance is the transmittance of the cross path (input port 61a→output port 62b and input port 62a→output port 61b) when the wide band switch element 60 is turned OFF in these parameters. Here, the operation center wavelength $\lambda_0$ of the optical couplers 63a and 63b is 1.545 μm. Both FIGS. 13A and 13B also show the characteristics when the width deviation $W_{err}$ is occurs. As can be seen from FIG. 13A, even when the finished width of the waveguide is deviated by ±0.2 μm in the wavelength range of 1.2 to 1.7 μm, the $\Delta\varphi$ is within a range of approximately +2 to −1% with respect to n. By reflecting this, the cross path transmittance is suppressed to −30 dB or less in any finished width in the wavelength range of 1.2 to 1.7 μm as shown in FIG. 13B.

As described above, in the wide band switch element 60, even when the finished width of the waveguide is deviated due to the manufacturing error, the wavelength dependence of the inter-arm phase difference $\Delta\varphi$ at the time of OFF can be almost eliminated. Therefore, an extremely high extinction ratio can be stably obtained in a wide wavelength range over 500 nm. This is because, in the wide-band switch 60, the interference arm 65 is provided with the wide waveguide 67 and the narrow waveguide 68 having different waveguide widths, whereby the dependence of the inter-arm phase difference $\Delta\varphi$ on the finished waveguide width can be greatly suppressed, and the manufacturing tolerance becomes large. In addition, as in the embodiment 1, in addition to the lengths $L_{bold}$ and $L_{narrow}$ of the wide waveguide 67 and the narrow waveguide 68, the difference $\Delta L$ between the waveguide lengths of the interference arm 65 and the interference arm 64 can be set, and there is a sufficient degree of freedom in design. Therefore, the wavelength dependence of the inter-arm phase difference $\Delta\varphi$ can be almost eliminated.

Note that in the embodiment 2, the interference arm 65 has two types of waveguides, i.e., the wide waveguide 67 and the narrow waveguide 68, as waveguides different from the normal waveguide width, but this is only necessary to have two types of waveguides as a minimum necessary degree of freedom, and three or more types of waveguides may be provided.

Embodiment 3: Wide-Band Switch 2 Having a Large Manufacturing Tolerance

Figure 14:
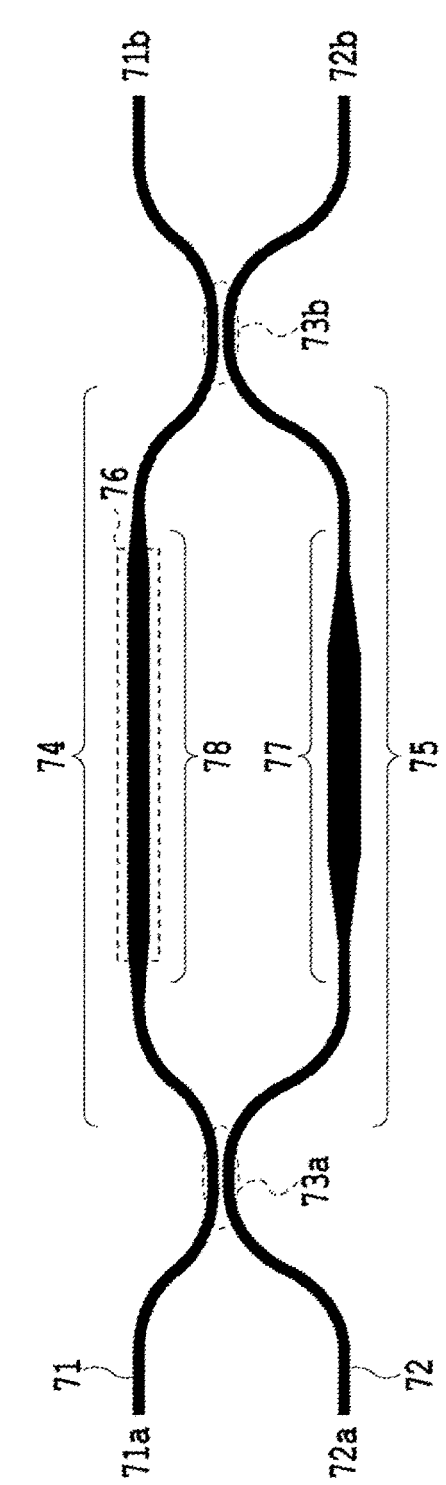
FIG. 14 is a diagram showing a configuration of a wide-band switch element according to an embodiment 3 of the present invention.

FIG. 14 shows a configuration of a wide-band switch element according to an embodiment 3 of the present invention. The wide-band switch element 70 is a Mach-Zehnder interferometer constituting of two waveguides, and an optical coupler 73a and an optical coupler 73b are connected by an interference arm 74 and an interference arm 75. The optical couplers 73a and 73b are constituted of directional couplers in which waveguides 71 and 72 are arranged close to each other. Usually, the optical coupling rate $\kappa$ of the optical couplers 73a and 73b is set to 50% at the operation wavelength $\lambda_0$. The interference arm 74 is provided with a thermooptic phase shifter 76 which can be locally heated by a thin film heater. The thermooptic phase shifter 76 functions as an electrically driven variable phase shifter.

A waveguide length $L_A$ of the interference arm 75 differs from a waveguide length $L_B$ of the interference arm 74 by a difference $\Delta L$ ($=L_A-L_B$). In addition, a waveguide width of the interference arm 74 and a waveguide width of the interference arm 75 are partially different. Specifically, when the reference waveguide width of a normal waveguide is $W_0$(basic width), the interference arm 75 includes a different type waveguide, and a part of the waveguide is a first wide waveguide 77 having a waveguide width $W_1$ ($\neq W_0$) over the length $L_1$. The interference arm 74 also includes a different type waveguide, and a part of the waveguide is a second wide waveguide 78 having a waveguide width $W_2$ ($\neq W_0$ and $< W_1$) over the length $L_2$. Although a tapered waveguide is formed at a connecting portion between the normal waveguide portion and the first wide waveguide 77 and the second waveguide 78 so as not to cause an increase in loss, the tapered waveguide connection is ignored in the following characteristic calculation for simplifying the description. The wide-band switch element 70 is a similar configuration to the switch element 50 of the embodiment 1, but is different in that not only the first wide waveguide 77 is provided in the interference arm 75 but also the second wide waveguide 78 is provided in the interference arm 74.

In the configuration of the embodiment 3, the phase difference $\Delta\varphi$ between the two interference arms is as the following expression. When the positions of the first wide waveguide 77 and the second wide waveguide 78 in the light propagation direction are defined as 1, the following expression is established.

[Math. 22]

$$\Delta\phi = 2\pi \frac{\begin{array}{l} n(W_0) \cdot L_A - n(W_0) \cdot L_B + \int_0^{L_1} \\ \{n(W_1(l)) - n(W_0)\} \cdot dl + \\ \int_0^{L_3} \{n(W_2(l)) - n(W_0)\} \cdot dl \end{array}}{\lambda}$$

$$= -2\pi \frac{n(W_0) \cdot L_B - n(W_0) \cdot L_A + n(W_0) \cdot L_1 - n(W_1) \cdot L_1 + n(W_2) \cdot L_2 - n(W_0) \cdot L_2}{\lambda}$$

$$= 2\pi \frac{n(W_0) \cdot \Delta L + \Delta n_1 \cdot L_1 - \Delta n_2 \cdot L_2}{\lambda}$$

(Expression 28)

18

Here, n(W) represents an equivalent refractive index of the waveguide in the waveguide width W. A difference $\Delta n_1$ between equivalent refractive indices of the normal waveguide and the first wide waveguide 77, and a difference $\Delta n_2$ between equivalent refractive indices of the normal waveguide and the second wide waveguide 78 are used.

[Math. 23]

$$\Delta n_1 = n(W_1) - n(W_0) \quad \text{(Expression 29)}$$

$$\Delta n_2 = n(W_2) - n(W_0) \quad \text{(Expression 30)}$$

$$\text{Here, } \Delta n_{diff} \triangleq \frac{L_1 \cdot \Delta n_1 - L_2 \cdot \Delta n_2}{\frac{1}{2}(L_1 + L_2)} \quad \text{(Expression 31)}$$

using Expression 31, $$\Delta\phi = 2\pi \frac{n(W_0) \cdot \Delta L + \Delta n_{diff} \cdot \frac{1}{2}(L_1 + L_2)}{\lambda} \quad \text{(Expression 32)}$$

Expression 28 is written as Expression 32. Further, a differential value $d\Delta n_{diff}/dW$ of $\Delta n_{diff}$ with respect to the waveguide width W is as following expression.

[Math. 24]

$$\frac{d\Delta n_{diff}}{dW} = \frac{L_1 \cdot \frac{d\Delta n_1}{dW} - L_2 \cdot \frac{\Delta n_2}{dW}}{\frac{1}{2}(L_1 + L_2)} \quad \text{(Expression 33)}$$

As can be seen from the description in the embodiments 1 and 2, when $W_1 \neq W_2$, $W_1 > W_0$, and $W_2 > W_0$ are established, in the difference in equivalent refractive index $\Delta n_1$ and $\Delta n_2$, the differential values $d\Delta n_1/dW$ and $d\Delta n_2/dW$ with respect to the waveguide width W become negative, respectively. That is, $d\Delta n_1/dW < 0$, and $d \Delta n_2/dW < 0$ are satisfied. By selecting an appropriate ratio of $L_1$ and $L_2$, $d\Delta n_{diff}/dW=0$ can be obtained, and $\Delta\varphi$ described in Expression 32 can be prevented from varying with respect to width deviation $W_{err}$ of the finished width of the waveguide. Also, as can be seen from the similarity between Expressions 22 and 32, by selecting appropriate $\Delta L$, $L_1$, and $L_2$, $\Delta\varphi=\pi$ is established in a first-order approximation. Of course, $L_1$ and $L2_2$ are the ratio of $d\Delta n_{diff}/dW=0$ in Expression 33.

Figure 15A:
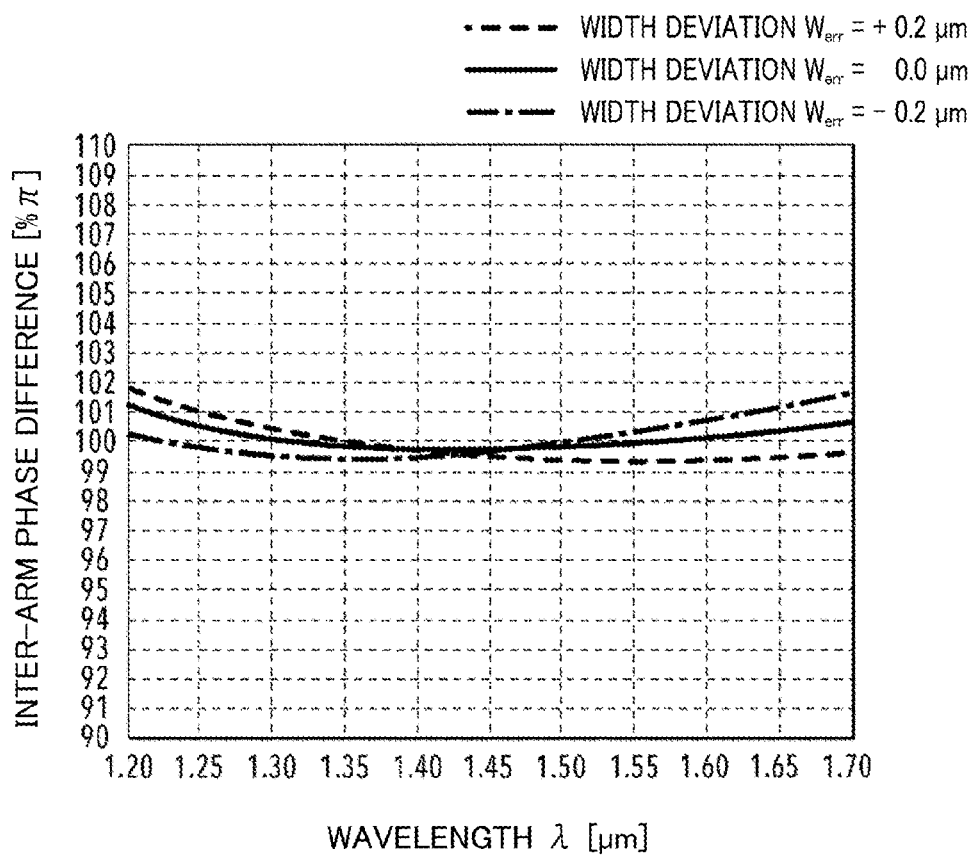
FIG. 15A is a diagram showing the wavelength dependence of the phase characteristics when the wide-band switch element of the embodiment 3 is turned OFF.
Figure 15B:
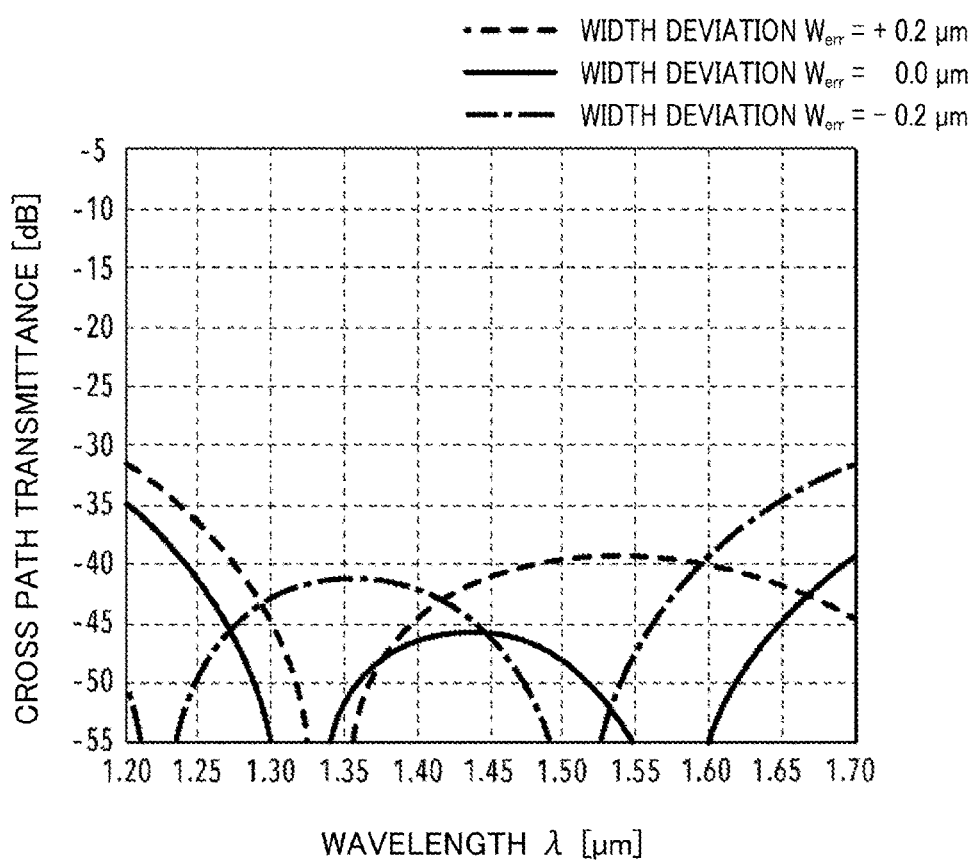
FIG. 15B is a diagram showing the wavelength dependence of the cross path transmittance when the wide-band switch element of the embodiment 3 is turned OFF.

FIG. 15A shows the wavelength dependence of the phase characteristic when the wide-band switch element of the embodiment 3 is turned OFF, and FIG. 15B shows the wavelength dependence of the cross path transmittance. In the case where $W_0=5$ μm, $W_1=9$ μm, and $W_2=6$ μm in the wide-band switch element 70 are satisfied, $L_1=1324$ μm, $L_2=2993$ μm, and $\Delta L=0.2663$ μm are obtained as design parameters satisfying the above. The cross path transmittance is a transmittance of the cross path (input port 71a→output port 72b and input port 72 a→output port 71b) when the wide-band switch element 70 is turned OFF in these parameters. Here, the operation center wavelength $\lambda_0$ of the optical couplers 73a and 73b is 1.545 μm. Both FIGS. 15A and 15B also show the characteristics when the width deviation $W_{err}$ occurs. As can be seen from FIG. 15A, even when the finished width of the waveguide is deviated by ±0.2 μm in the wavelength range of 1.2 to 1.7 μm, $\Delta\varphi$ is within a range of approximately +2 to −1% with respect to r. By reflecting this, the cross path transmittance is suppressed to −30 dB or less in any finished width in the wavelength range of 1.2 to 1.7 μm as shown in FIG. 15B.

As described above, even when the finished width of the waveguide is deviated due to a manufacturing error, the wavelength dependency of the inter-arm phase difference Δφ at the time of OFF can be almost eliminated in the wide-band switch element 70, similarly to the wide-band switch element 60 of the embodiment 2. Therefore, an extremely high extinction ratio can be stably obtained in a wide wavelength range over 500 nm. This is because, in the wide-band switch element 70 the interference arm 75 is provided with the second wide waveguide 78 in the interference arm 74 in addition to the first wide waveguide 77 having the different waveguide width. This is because the dependence of the inter-arm phase difference Δφ on the finished waveguide width can be greatly suppressed, and the manufacturing tolerance becomes large. Also, similarly to the embodiment 1, in addition to the lengths $L_1$ and $L_2$ of the first wide waveguide 77 and the second narrow waveguide 78, the difference ΔL between the waveguide lengths of the interference arm 75 and the interference arm 74 can be set, and there is a sufficient degree of freedom in design. Therefore, the wavelength dependence of the inter-arm phase difference Δφ can be almost eliminated.

In this way, even the wide-band switch element 70 can obtain the same performance as that of the wide-band switch element 60 of the embodiment 2, but when the design parameters are viewed, the longer length of $L_1$ and $L_2$ is close to 3 mm. On the other hand, in the wide-band switch element 60, the sum of the lengths of the wide waveguide 67 and the narrow waveguide 68 ($L_{bold}+L_{narrow}$) is 1 mm or less. Therefore, the wide-band switch element 70 tends to have a larger circuit size than the wide-band switch element 60.

Figure 16A:
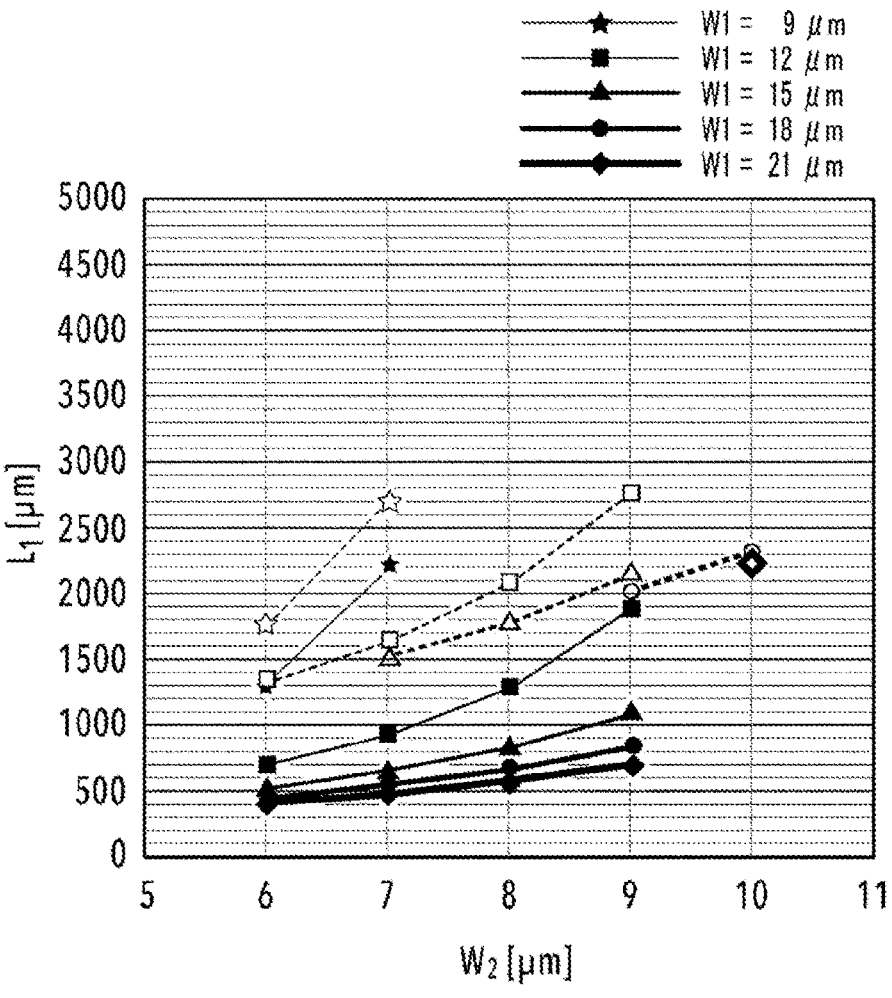
FIG. 16A is a diagram showing the results of a trial calculation of parameters of the wide-band switch element of the embodiment 3.
Figure 16B:
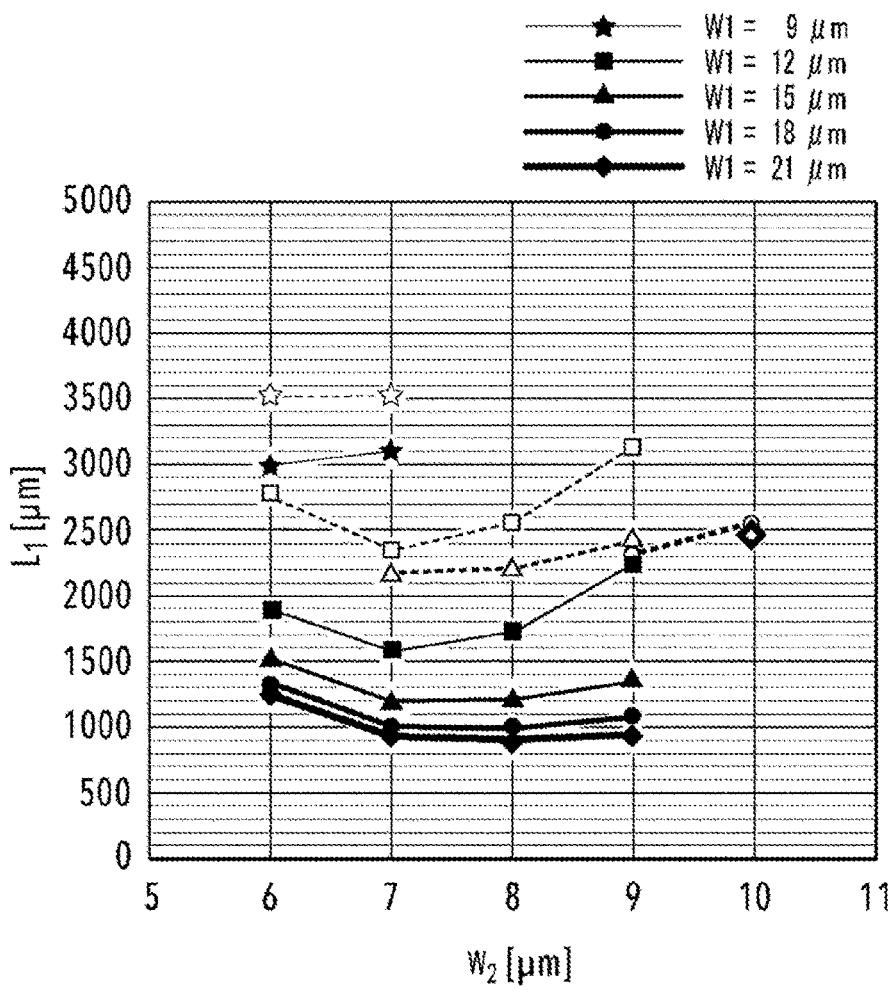
FIG. 16B is a diagram showing the results of a trial calculation of parameters of the wide-band switch element of the embodiment 3.

FIGS. 16A and 16B show, for parameters of the wide-band switch element of the embodiment 3, in various $W_1$ and $W_2$, the result of trial calculation of the optimum value of $L_1$ and $L_2$ is shown. Note that ΔL is 0.25 to 0.27 μm in any combination of $W_1$ and $W_2$. As can be seen from the figure, when $W_1$ is set to about 20 μm and $W_2$ is set to about 8 μm, the longer one of $L_1$ and $L_2$ can be set to 1 mm or less, and the circuit size of the same degree as that of the wide-band switch element 60 can be realized. However, a waveguide having a width of 20 μm has a large waveguide width compared to a normal single mode waveguide having a width of 5 μm, and a high-order mode is very easily excited. Therefore, the characteristics are deteriorated by slight disturbance such as roughness of the side wall of the waveguide, which is not preferable. In addition, a tapered waveguide having a long propagation length is inserted in a portion where the waveguide having the normal width of 5 μm and the waveguide having the width of 20 μm are connected to each other in order to avoid an increase in loss due to mismatch in field distribution. Therefore, since the length of the tapered waveguide also affects the circuit size, even if $W_1$=20 μm and $W_2$=8 μm are selected, the circuit size is substantially larger than that of the wide-band switch element 60.

[Application to Optical Circuits]

Although the above embodiments have been described as an optical switch, this embodiment is an optical phase shifter for obtaining a constant phase difference over a wide wavelength range in an interference arm in a Mach-Zehnder interferometer constituting the optical switch. In particular, the present embodiment relates to a configuration of the optical phase shifter which is resistant to manufacturing errors such as variations in waveguide width, and is not limited to the optical switch, and can be applied to all optical circuits using the optical phase shifter. That is, the embodiment is the optical phase shifter constituting of two waveguides having the basic width $W_0$, and constituted so that the two lights propagated through the respective waveguides have a phase difference ξ.

In the above-described optical phase shifter, since the configuration has been described in consideration of application to the optical switch, the parameters are optimized so that the phase difference Δφ between the interference arms becomes π. However, depending on the optical circuit, there is a case where the phase difference between the two waveguides is other than π. In this case as well, the present embodiment can be applied. In accordance with the required phase difference Δφ, the configuration of the different type waveguide arranged in at least one of the two waveguides and the parameters of the two waveguides and the different type waveguide should be optimized. Specifically, when the required phase difference is ξ, Expression 12 is replaced with following Expression 34, Expression 24 is replaced with following Expression 35, Expression 27 is replaced with following Expression 36, and the optimization of each parameter should be performed.

[Math. 25]

$$a' \cdot \Delta L + a \cdot L_{bold} = \frac{\xi}{2\pi} \qquad \text{(Expression 34)}$$

$$a' \cdot \Delta L + a \cdot (L_{bold} + L_{narrow}) = \frac{\xi}{2\pi} \qquad \text{(Expression 35)}$$

$$\int (\Delta\phi - \xi)^2 d\lambda \qquad \text{(Expression 36)}$$

Also, in the above-described embodiment, the case where a simple directional coupler is used for the optical coupler is described, but the present invention is not limited thereto. For example, a multimode interferometer (MMI) type optical coupler which is an optical coupler using a multimode waveguide, or a wavelength independent optical coupler (Winc) consisting a plurality of directional couplers described in PTL 4 may be used.

Example 1

Since the embodiment 2 is suitable as the configuration applied to the wide-band switch element of the three embodiments described above, the following examples will be described based on the configuration of the embodiment 2. Some examples of the optical switch to which the embodiment 2 is applied in an optical circuit using the quartz-based optical waveguide technique are shown. These optical circuits are manufactured on a silicon substrate by using a known combination of a glass film deposition technique such as flame hydrolysis deposition (FHD) method and a fine processing technique such as reactive ion etching (RIE). A waveguide having a specific refractive index difference Δ of 2% is used, and design is performed with a minimum bending radius of 1 mm of the bent waveguide.

In the example 1, N×N matrix switch in which the above-mentioned wide-band switch element is a base and a large number of wide band switch elements are integrated will be described.

[Wide-Band Switch Element]

Figure 17:
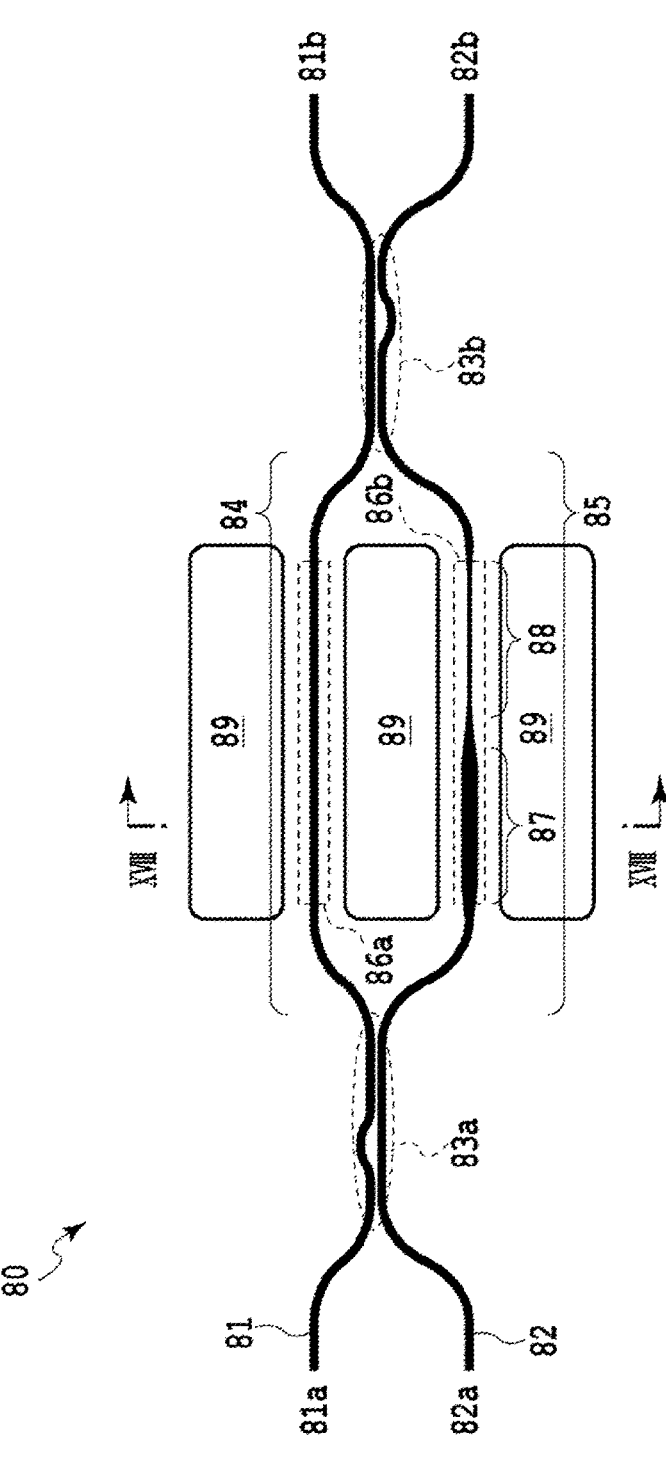
FIG. 17 is a diagram showing a configuration of the wide-band switch element according to an example 1 of the present invention.
Figure 18:
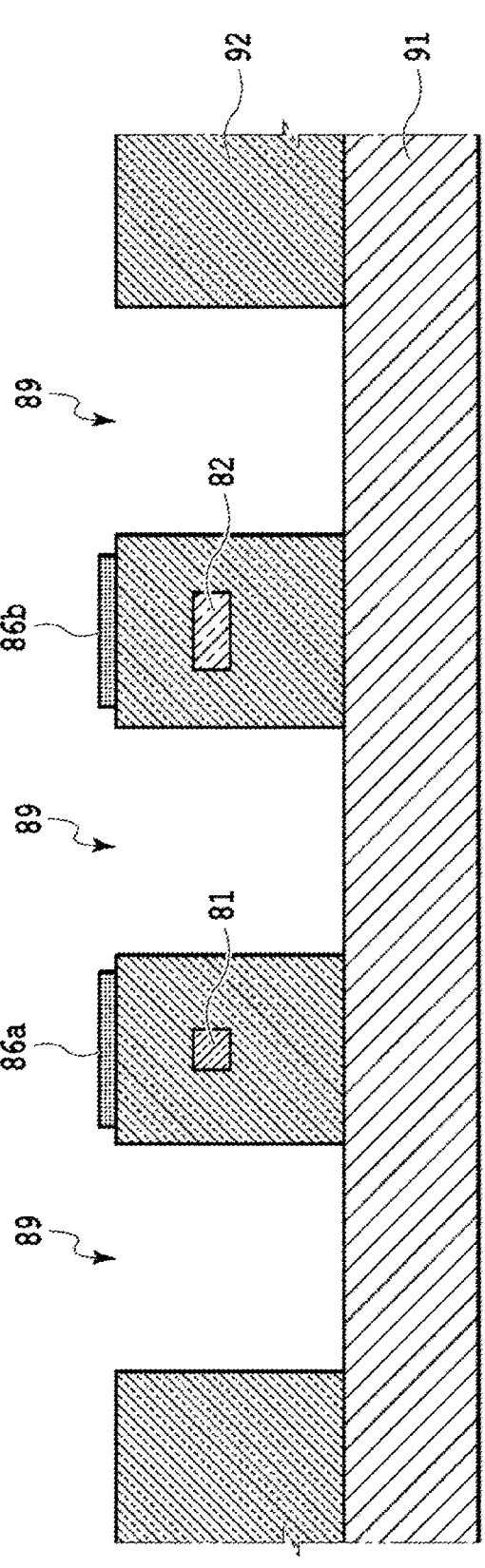
FIG. 18 is a cross-sectional view showing a configuration of the wide-band switch element of the example 1.

FIG. 17 shows a configuration of a wide-band switch element according to the example 1 of the present invention. FIG. 18 is a cross-sectional view taken along XVIIIA-XVIIIB in FIG. 17. The wide-band switch element 80 has basically the same configuration as the wide-band switch element 60 described in the embodiment 2, but has three different points and is embodied. The first point is that an optical coupler 83a and an optical coupler 83b constituting a Mach-Zehnder interferometer are not a simple directional coupler but a wavelength independent optical coupler (Winc).

The second point is that a thermooptic phase shifter is provided not only on the interference arm 84 but also on the interference arm 85. A thin film heater 86a for the thermooptic phase shifter is loaded on the surface of the clad 92 just above the waveguide 81 constituting the interference arm 84. In addition, a thin film heater 86 b for the thermooptic phase shifter is loaded on the surface of the clad 92 just above the waveguide 82 constituting the interference arm 85. Stress is often applied to the waveguide from the thin film heaters 86a and 86b. In order to cancel the influence of this stress on the refractive index of the waveguide, the thin film heater is provided on both the interference arm 84 and the interference arm 85. When the switch is turned ON, the thin film heater 86a is basically driven, but the thin film heater 86b may be driven.

The third point is that the clad on both sides of the waveguide is removed along the optical axis direction of the waveguide on which the thin film heaters 86a and 86b are loaded, and the heat insulating groove 89 is formed. The heat generated by the thin film heater 86a is not diffused to the periphery by the heat insulating groove 89, and the temperature of the waveguide 81 can be effectively raised. In addition, it is possible to suppress the temperature rise of the peripheral waveguide, for example, the waveguide 82. Power consumption of the thermooptic phase shifter can be suppressed, and thermal crosstalk can be suppressed. The same applies to the thin film heater 86b.

A waveguide length $L_A$ of the interference arm 85 differs from a waveguide length $L_B$ of the interference arm 84 by a difference $\Delta L$ ($=L_A-L_B$), which is the same as that of the wide-band switch element 60. The waveguide of the interference arm 84 is constituted of a width $W_0$. The interference arm 85 includes two different type waveguides, which are the same as the wide-band switch element 60. A part of the waveguide of the interference arm 85 becomes a wide waveguide 87 having a waveguide width $W_{bold}$ ($>W_0$) over a length $L_{bold}$, and another part of the waveguide becomes a narrow waveguide 88 having a waveguide width $W_{narrow}$ ($<W_0$) over a length $L_{narrow}$. In addition, at a connecting portion of the normal waveguide portion and the wide waveguide 87 and the narrow waveguide 88, respectively, in order not to cause an increase in loss, a tapered waveguide having a length $TprL_{bold}$ and a length $TprL_{narrow}$ is formed. As specific design values, $W_0=5$ μm, $W_{bold}=9$ μm, $W_{narrow}=3.5$ μm are set, and $L_{bold}=227$ μm, $L_{narrow}=347$ μm, and $\Delta L=0.2854$ μm are optimum values. In addition, $TprL_{bold}=336$ μm and $TprL_{narrow}=148$ μm. Therefore, the length of the wide waveguide 87 including the tapered waveguide is $L_{bold}+2 \cdot TprL_{bold}=899$ μm, and the length of the narrow waveguide 88 is $L_{narrow}+2 \cdot TprL_{narrow}=643$ μm.

The reason why the wavelength independent optical coupler (Winc) is used as the optical coupler will be described in detail. A transmittance $T_{cross}$ of a cross path (input port 81a→output port 82b, and input port 82a→output port 81b) of the wide band switch element 80 and a transmittance $T_{b}$ar of bar paths (input port 81a→output port 81b and input port 82a→output port 82b) of the wide band switch element 80 are expressed, similarly to the conventional switch element 30, by Expressions 2 and 3, when the optical coupling rate of the optical coupler 83a and the optical coupler 83b is defined as K, and the phase difference between the interference arm 84 and the interference arm 85 is defined as $\Delta \varphi$. Therefore, if $\Delta \varphi=\pi$ can be obtained when the switch is turned OFF, $T_{cross}=0$ is always obtained regardless of the value of κ, and a high extinction ratio can be provided in the cross path. On the other hand, when the switch is turned ON, the thermooptic phase shifter is driven to set $\Delta \varphi=0$, and the transmittance $T_{cross}$ of the cross path at this time becomes as following Expression 37 using Expression 2.

[Math. 26]

$$T_{cross} = 4 \cdot \kappa \cdot (1 - \kappa) \qquad \text{(Expression 37)}$$

If the coupling rate κ of the optical couplers 83a and 83b is deviated from 0.5, that is, from 50% coupling, the transmittance $T_{cross}$ is correspondingly reduced and the loss is increased. Since the coupling rate κ of the optical couplers 83a and 83b greatly affects the loss, it is desirable to have a value as close as 0.5 as possible in the wavelength region to be used.

In a normal directional coupler (simple DC), the optical coupling rate has a relatively large wavelength dependence, and in general, the optical coupling rate becomes stronger when the wavelength becomes longer. An increase in loss due to this phenomenon is also conspicuous when the wavelength region exceeds about 120 nm. Therefore, it is desirable to use an optical coupler having a small wavelength dependence in order to obtain not only a high extinction ratio but also a low loss in the wide wavelength range. As described in PTL 4, Winc is constituted by a kind of Mach-Zehnder interferometer in which a first directional coupler and a second directional coupler are connected in cascade. By appropriately selecting a coupling length $DcL_1$ of the first directional coupler, a coupling length $DcL_2$ of the second directional coupler, and an optical path length difference $\Delta L_{Winc}$ between interference arms of the Mach-Zehnder interferometer, a characteristic having a flat optical coupling rate in the wide wavelength range can be obtained.

Figure 19:
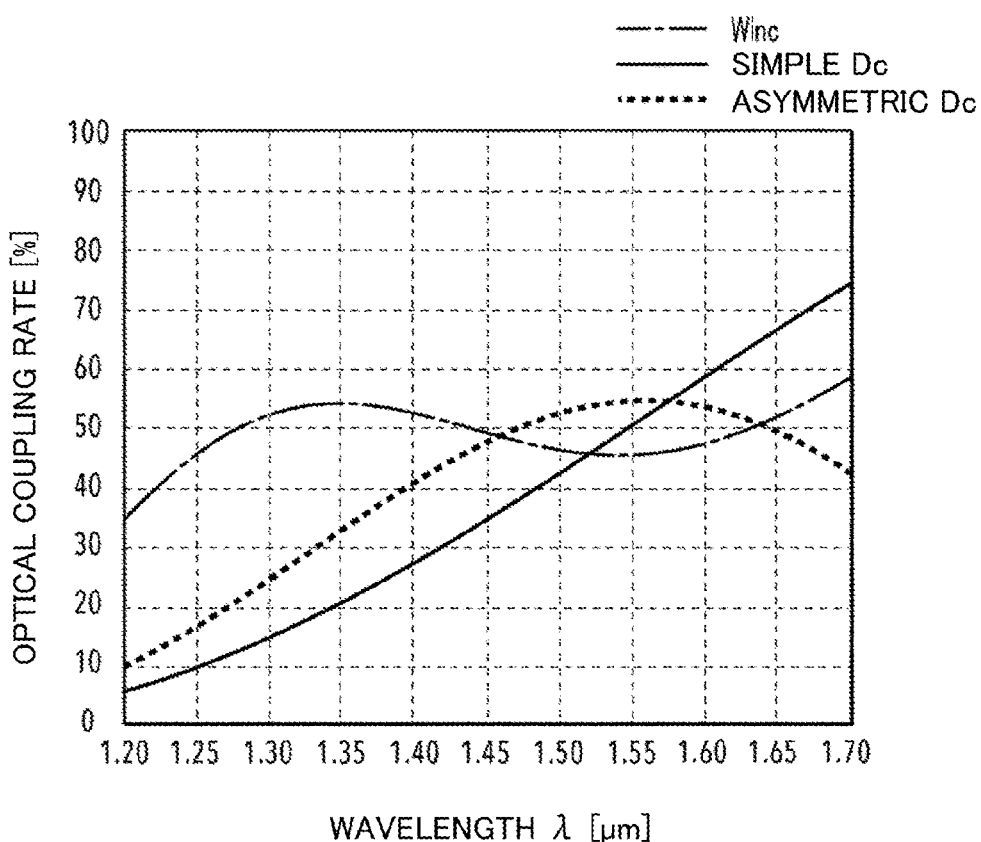
FIG. 19 is a diagram showing characteristics of the wavelength independent optical coupler in the wide-band switch element of the example 1.

FIG. 19 shows the characteristics of the wavelength independent optical coupler of the embodiment 1. The figure shows wavelength dependence of the optical coupling rate of Winc used for the optical couplers 83a and 83b. The design parameters of Winc are $DcL_1=146$ μm, $DcL_2=408$ μm, and $\Delta L_{Winc}=0.6808$ μm. FIG. 19 also shows the characteristics of a simple Dc in which the optical coupling rate becomes 50% at the operation center wavelength $\lambda_0=1.545$ μm, for reference. The coupling length of the simple Dc is 155 μm.

In addition, the characteristics of an optical coupler called an asymmetric directional coupler (asymmetric Dc) are also shown. In the simple Dc, waveguides having the same waveguide width are used in an optical coupling portion where two waveguides are close to each other, but in the asymmetric DC, waveguides having different waveguide widths are used in the optical coupling portion. That is, the waveguide widths of the two waveguides in the optical coupling portion are not the same but different. Of course, the front and rear portions of the waveguide are connected by tapered waveguides so as not to cause an increase in loss when changing the waveguide width. The difference ΔW between the widths of the waveguides at the optical coupling portion of the asymmetric Dc having characteristic shown in FIG. 19 is 0.21 μm, and the coupling length thereof is 465 μm.

As can be seen from FIG. 19, it can be seen that the wavelength range in which the coupling rate of 50%±5% is obtained is about 80 nm for the simple DC, while about 430 nm for the Winc and about 260 nm for the asymmetric DC are obtained.

When this Winc is used as the optical coupler of the wide-band switch element 80, the Winc is arranged in a direction called point symmetry arrangement. Specifically, as shown in FIG. 17, in the optical coupler 83a, Winc is arranged in a direction in which Winc is directed in the order of the first directional coupler and the second directional coupler and the long side of the interference arm in the Winc is directed upward. At this time, in the optical coupler 83b, the Winc is arranged in a direction in which Winc is directed in the order of the second directional coupler and the first directional coupler and the long side of the interference arm in the Winc is directed downward. That is, the two directional couplers are arranged so that the order in the propagation direction of light and the arrangement of the two interference arms are symmetrical, and arranged in a direction 180-rotated with respect to the center of the wide-band switch element 80.

When the structure is vertically asymmetric like Winc, unlike a simple DC whose structure is vertically symmetric, when inputted from one input, the phase difference of light outputted from two ports is deviated from π/2 and outputted. This deviation can be canceled by performing point symmetry arrangement.

Figure 20:
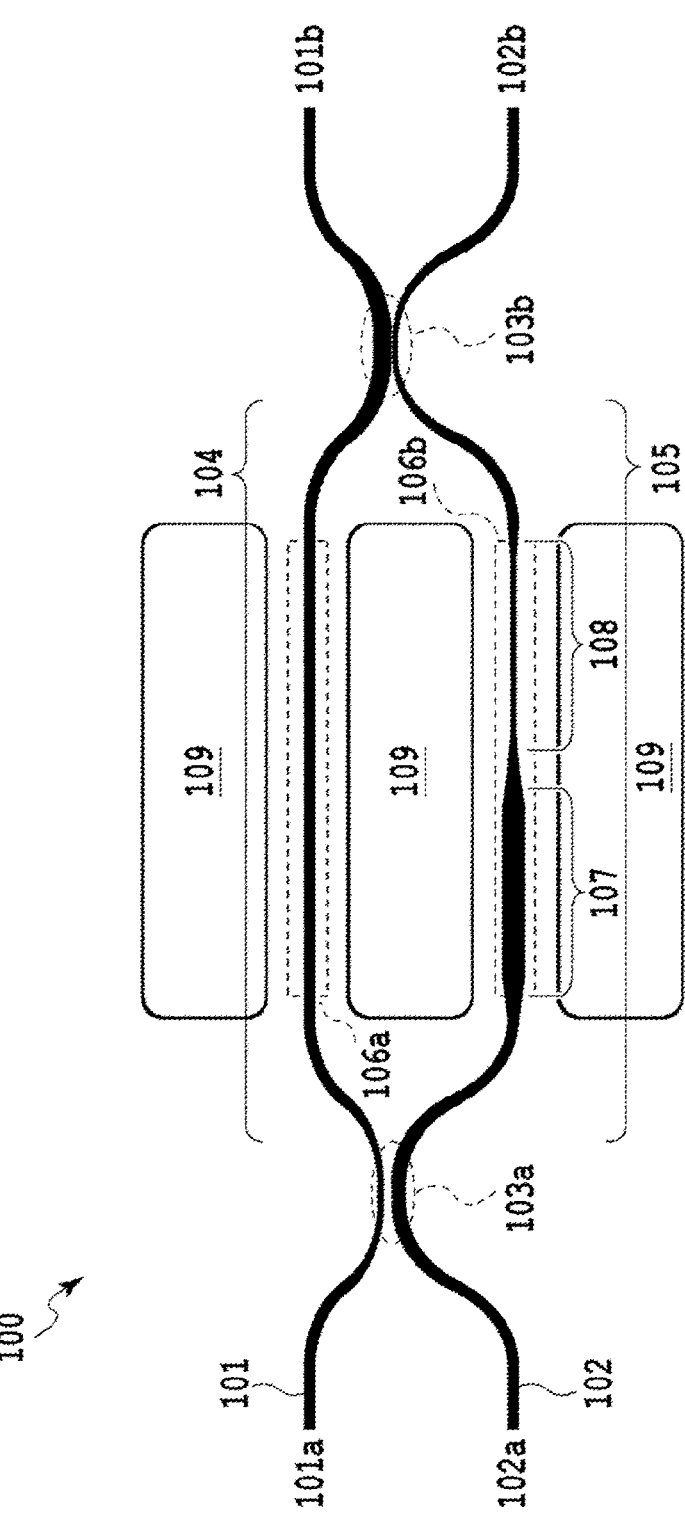
FIG. 20 is a diagram showing a configuration example of another wide-band switch element of the example 1.

FIG. 20 shows another configuration example of the wide-band switch element of the example 1. The wide-band switch element 100 has basically the same configuration as that of the wide-band switch element 80, but optical couplers 103a and 103b are not Winc but asymmetrical Dc constituting of optical coupling portions where two waveguides having different waveguide widths are close to each other. Other points are the same as the wide-band switch element 80. In the case where the asymmetric Dc is used for the optical coupler, the optical coupler is arranged in point symmetry for the same reason. Specifically, as shown in FIG. 20, the optical coupler 103a is arranged in a direction in which the side of the narrow waveguide width is directed upward in the optical coupling portion of the optical coupler 103a. At this time, the optical coupler 103b is arranged in a direction in which the side of the narrow waveguide width is directed downward in the optical coupling portion. That is, the asymmetric Dc of the optical coupler 103b is arranged in a 180-rotated direction with respect to the direction of the asymmetric Dc of the optical coupler 103a.

Figure 21A:
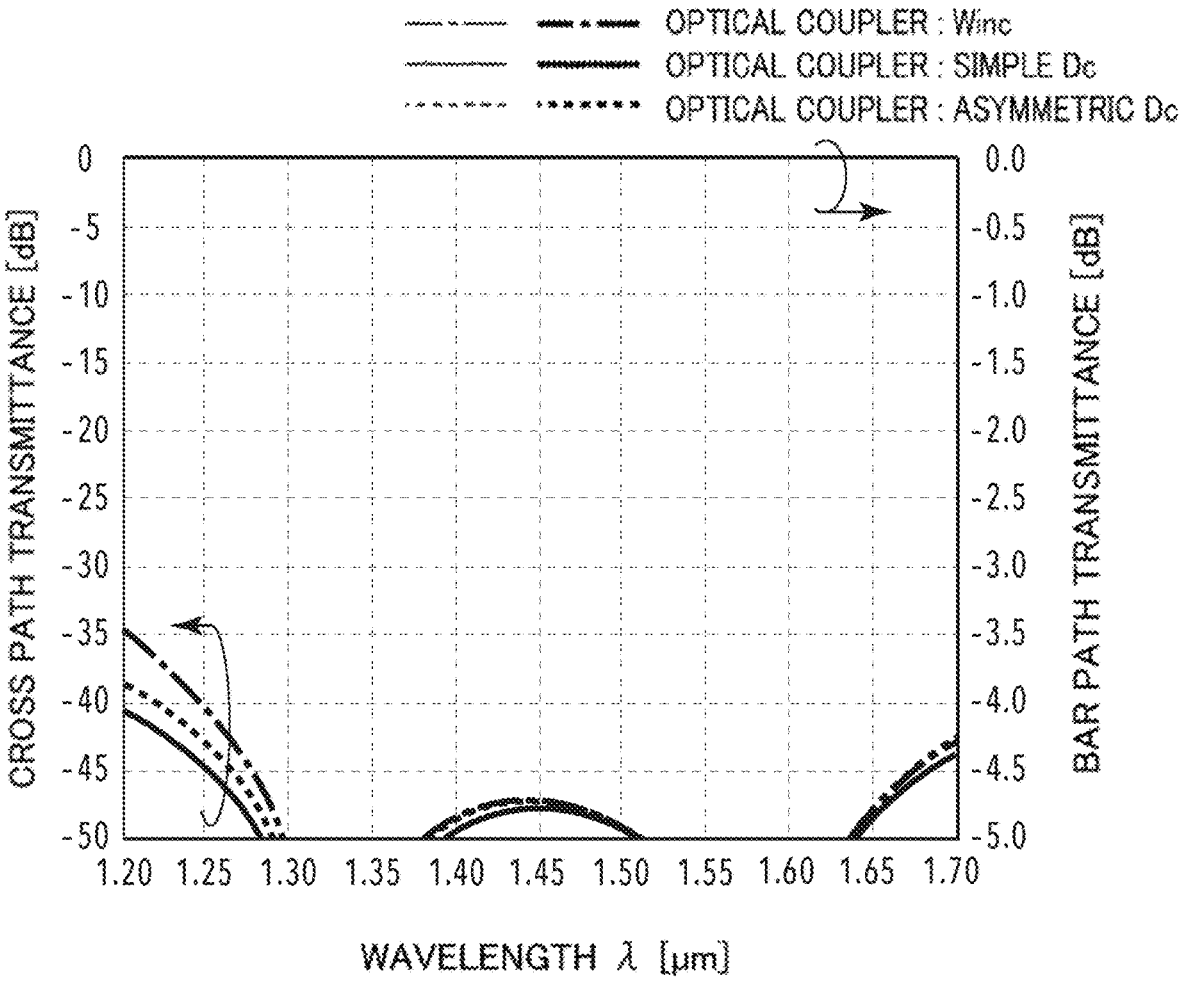
FIG. 21A is a diagram showing the wavelength dependence of the transmittance of the cross path and the bar path when the wide-band switch element of the example 1 is turned OFF.
Figure 21B:
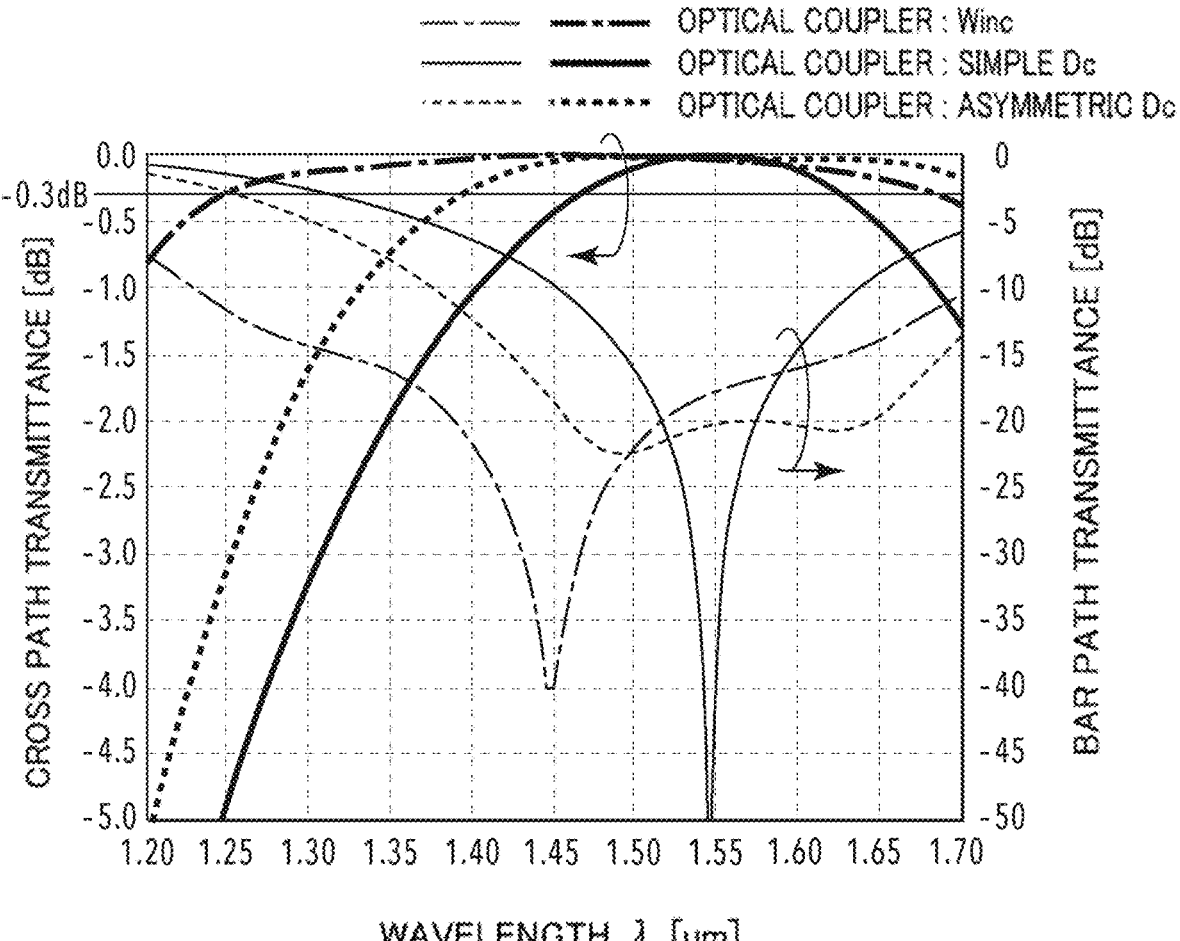

FIG. 21A shows the wavelength dependence of the transmittance of the cross path and the bar path when the wide-band switch element of the example 1 is turned OFF, and FIG. 21B shows the wavelength dependence of the transmittance of the cross path and the bar path when the wide-band switch element is turned ON. The characteristics of the wide-band switch element 80 and the wide-band switch element 100 are shown. Note that the wavelength dependence when the simple DC is used for the optical coupler is also shown. Even when any optical coupler is used, the transmittance of the cross path at the time of OFF is −35 dB or less, and it can be seen that the cross path has the high extinction ratio. Also, the bar path at the time of OFF is kept almost 0 dB.

On the other hand, the transmittance of the cross path at the time of ON greatly varies in wavelength characteristics depending on the type of the optical coupler used. The wavelength range in which the transmittance is −0.3 dB or more is kept at about 160 nm when the simple Dc is used, whereas the wavelength range is 430 nm or more when the Winc is used, and 300 nm or more is obtained even when the asymmetric Dc is used. Thus, by using the optical coupler having small wavelength dependence of the optical coupling rate, not only the high extinction ratio but also the low loss can be obtained in the wide wavelength range.

The size of the optical coupler increases in the order of simple DC, asymmetric DC, and Winc. Therefore, what kind of optical coupler is used for the optical coupler used for the wide-band switch element may be determined by the size of the wavelength range requiring the low loss characteristic. If it is necessary to fully use a wavelength region 1.26 to 1.675 μm which can be used for a communication optical fiber, Winc is used. If only a C band (1.53 to 1.565 μm) or an L band (1.565 to 1.625 μm) used for a long distance communication is sufficient, the simple DC is used. If S band (1.46 to 1.53 μm) are to be added to C band and L band, the asymmetric Dc may be used.

Note that in a large-scale switch in which a large number of these switch elements are integrated, not only the switch elements of the cross path when the switch is turned ON but also the switch elements of the bar path when the switch is turned OFF pass through between the input and the output. However, the switch element which can obtain the high extinction ratio in the cross path is $T_{cross}$=0 when the switch is turned OFF. As can be seen from Expression 3, $T_{bar}$, that is the transmittance of the bar path at the time of switch OFF, ≅1 is satisfied, and as shown in FIG. 21A, the loss in the bar path can be almost ignored.

[Double Gate Type Switch Element]

Figure 22:
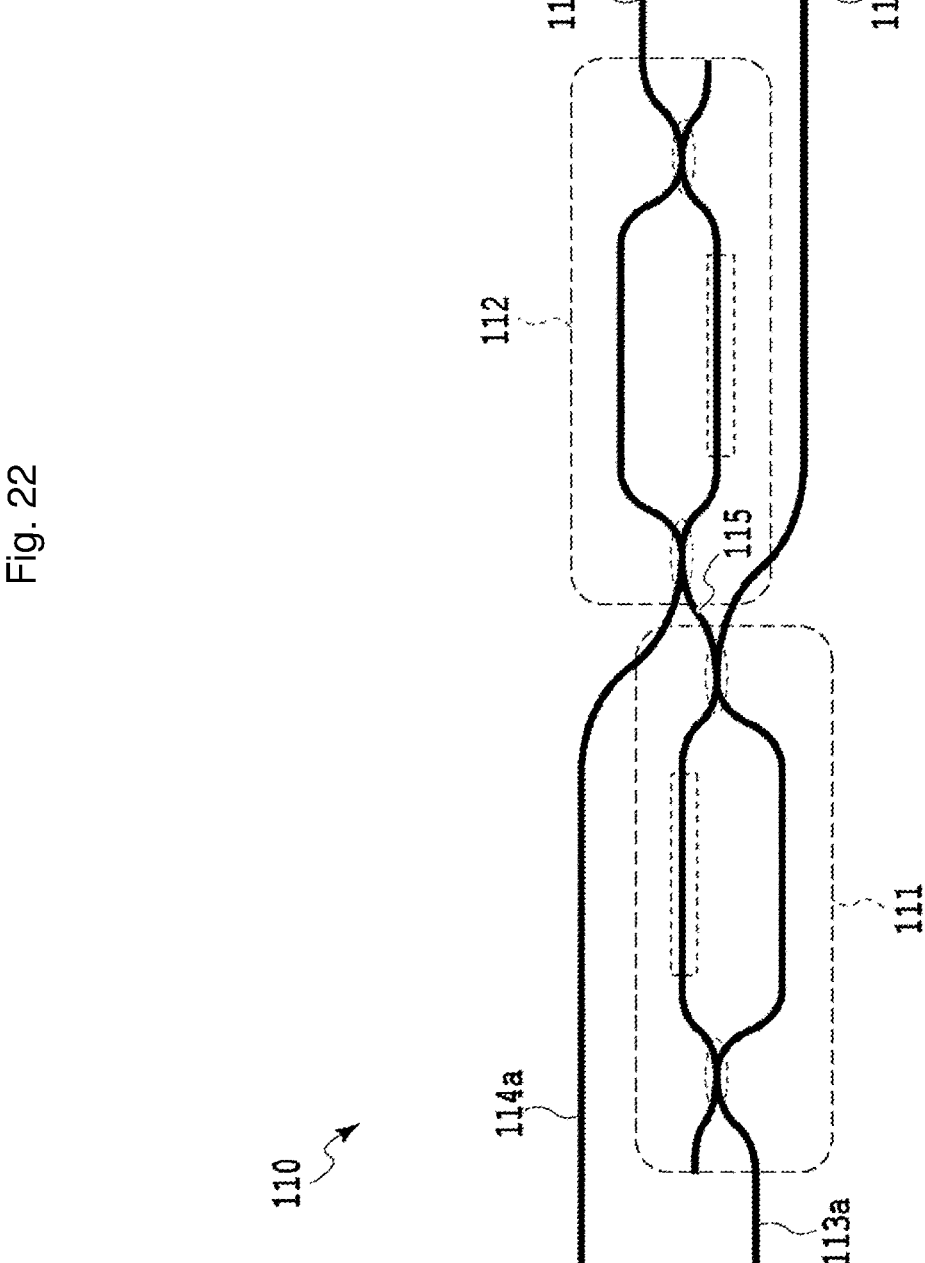
FIG. 22 is a diagram showing a configuration of the double gate type switch element according to the example 1 of the present invention.

FIG. 22 shows a configuration of the double gate type switch element according to the example 1 of the present invention. In the double gate type switch element 110, a first switch element 111 is arranged in the middle of input line waveguides 113a to 113b, and a second switch element 112 is arranged in the middle of output line waveguides 114a to 114b. The first switch element 111 and the second switch element 112 are cascaded by an intermediate connection waveguide 115. The first switch element 111 and the second switch element 112 are two-input and two-output switch elements, and light propagates to a bar path in an OFF state, and light propagates to a cross path in an ON state.

Therefore, the double gate type switch element 110 propagates the light to bar paths (input line waveguide 113a→input line waveguide 113b and output line waveguide 114a→output line waveguide 114b) in the OFF state, and in the ON state, the light is propagated to the cross path (input line waveguide 113a→output line waveguide 114b). In this way, similarly to the wide-band switch element 20, since the double gate type switch element 110 cuts off propagation light from the input line waveguide 113a to the output line waveguide 114b by two switch elements of the first switch element 111 and the second switch element 112 at the time of OFF, a characteristic having extremely small crosstalk, that is, a characteristic having a high extinction ratio which is a ratio of transmittance at the time of ON to transmittance at the time of OFF, is obtained.

In the double gate type switch element 110, an intra-element intersection 26 in the double gate type switch element 20 is exposed to the outside of the switch element. In addition, the second switch element 112 is arranged in an inverted direction with respect to the vertical direction of the first switch element 111. This is because the longer side of the interference arm of the switch element is arranged in the opposite direction by two switch elements, as described in PTL 5, so that the influence of the refractive index distribution in the wafer plane can be reduced.

In this embodiment, a wide-band switch element 80 is used as the first switch element 111 and the second switch element 112 of the double gate type switch element 110. As described above, the wide-band switch element 80 is arranged in the first switch element 111 in the direction as it is, and the wide-band switch element 80 is arranged in the second switch element 112 in the direction inverted upward and downward.

[N×N Matrix Switch]

Figure 23:
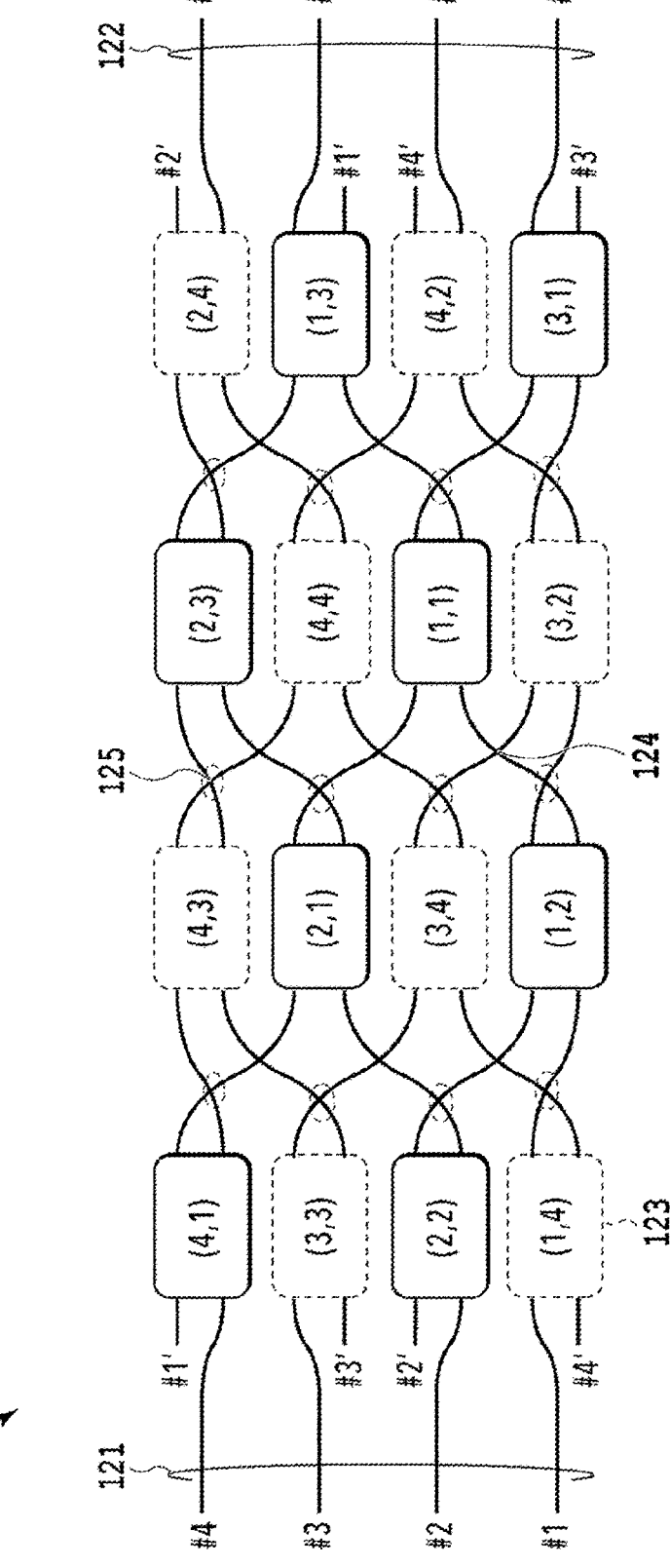
FIG. 23 is a diagram showing a configuration of the N×N matrix switch according to the example 1 of the present invention.

FIG. 23 shows a configuration of an N×N matrix switch according to the example 1 of the present invention. FIG. 23 illustrates a case in which N=4 is set. The 4×4 matrix switch 120 has a configuration in which $N^2$ (N=4) switch elements 123 are connected between four input line waveguides 121 and four output line waveguides 122 via a plurality of inter-stage intersections 124 and intra-element intersections 125. The above-mentioned double gate type switch element 110 is used for the switch element 123. The intra-element intersection 125 corresponds to the fact that the intra-element intersection 26 of the double gate type switch element 20 is exposed to the outside of the switch element. The switch element 123 has a two-input and two-output switch configuration, and light propagates to the bar path when the switch element 123 is in the OFF state where the switch element 123 is not driven, and propagates to the cross path when the switch element 123 is in the ON state where the switch element 123 is driven. When the light inputted to the port number #x (x=1 to 4) of the input line waveguide 121 is outputted to the port number #y (y=1 to 4) of the output line waveguide 122, the switch element 123 of the number (x, y) is driven and turned ON. Note that there are switch elements 123 shown by solid surrounding lines, for example, (4, 1), and switch elements 123 shown by broken surrounding lines, for example, (3, 3). Both of them show only the difference in the arrangement direction of the switch elements described later, and are basically the same in configuration. Specifically, in the switch element 123 indicated by the solid surrounding line, the double gate type switch element 110 shown in FIG. 22 is arranged in the direction shown in FIG. 22, and in the switch element 123 indicated by the broken surrounding line, the double gate type switch element 110 shown in FIG. 22 is arranged in the direction inverted upward and downward.

In the manufactured 4×4 matrix switch 120, a layout folded back at the center of the four switch stages is adopted, and the input/output ports are arranged on the same side of the chip. The chip size of the 4×4 matrix switch 120 was about 44×4 mm. The 4×4 matrix switch 120 were manufactured three times using the same photomask. One circuit was manufactured so as to be finished to a waveguide width generally as designed. The remaining two circuits were manufactured by changing the exposure conditions and finishing the waveguide widths by shifting the waveguide widths from the designed values to +0.2 μm and −0.2 μm.

Figure 24:
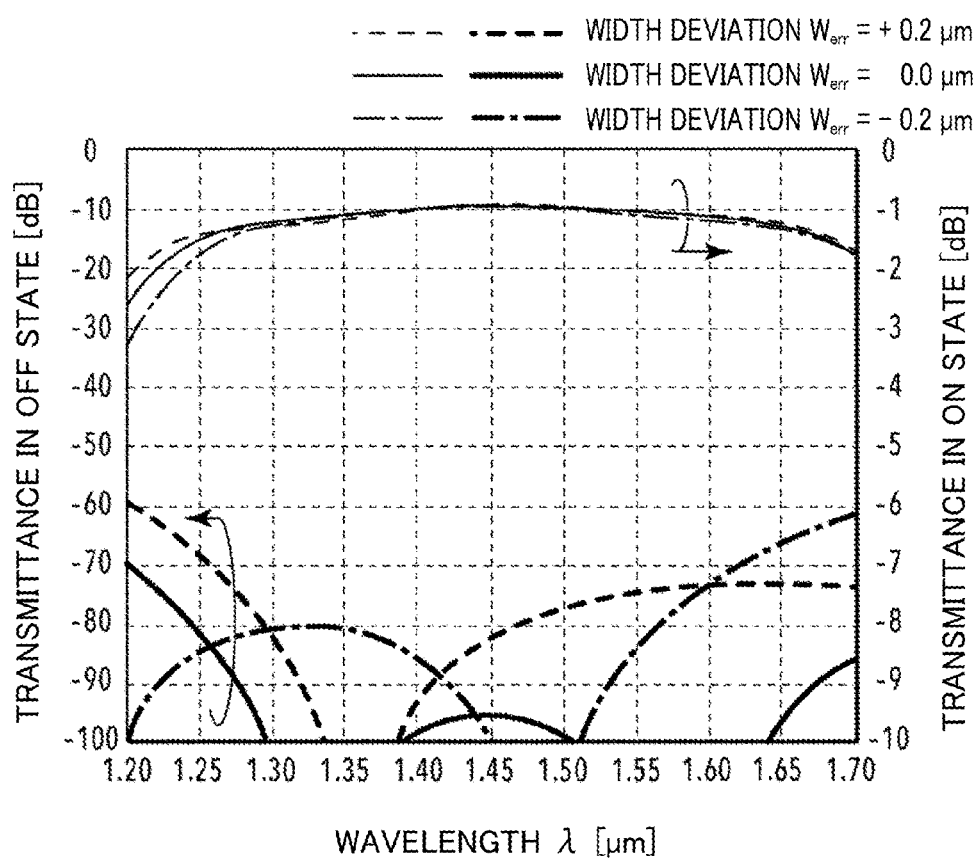
FIG. 24 is a diagram showing the transmittance in the OFF state and the transmittance in the ON state of each path of the N×N matrix switch of the example 1.

FIG. 24 shows the transmittance in the OFF state and the transmittance in the ON state of each path of the N×N matrix switch of the embodiment 1. In the manufactured 4×4 matrix switch 120, the transmittance in the OFF state and the transmittance in the ON state of each path were evaluated by driving the thin film heater.

Even if the finish of the waveguide width is deviated by ±0.2 μm from the design value, the transmittance in the OFF state is suppressed to −62 dB or less over the wavelength region of 1.25 to 1.68 μm, and the transmittance in the ON state is secured to −1.8 dB or more. That is, the high extinction ratio and the low insertion loss can be obtained in the entire wavelength range where the optical fiber for communication can be used. As described above, according to the example 1, it is possible to obtain a matrix switch having the large manufacturing tolerance and the high extinction ratio characteristic and the low insertion loss characteristic in the wide wavelength range.

As a large scale switch having a configuration similar to that of a matrix switch, a multicast switch (MCS) described in NPL 3 is known. The double gate type switch element 110 described in the present example can be applied to the MCS as it is. As in the matrix switch of the present example, it is apparent that the high extinction ratio and the low insertion loss can be obtained over the wide wavelength range with the large manufacturing tolerance even in the MCS.

Example 2

Figure 25:
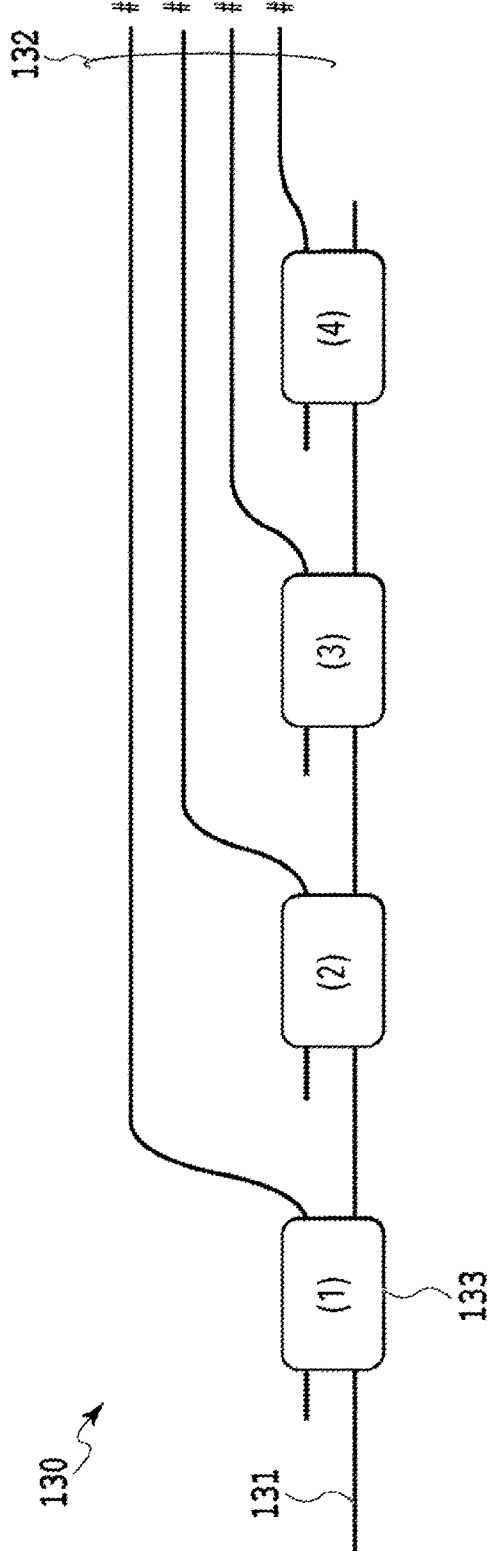
FIG. 25 is a diagram showing a configuration of a 1×N matrix switch according to an example 2 of the present invention.

FIG. 25 shows a configuration of 1×N matrix switch according to an embodiment 2 of the present invention. FIG. 25 shows a case where N=4 is set. The 1×4 switch 130 is called a tap type switch or a tree switch, and N (N=4) switch elements 133 are arranged in series with one input line waveguide 111, and an output line waveguide 112 is connected to each switch element 133. The above-mentioned double gate type switch element 110 is used for the switch element 133. The switch element 133 has a two-input and two-output switch structure, but as described above, light propagates to the bar path when the switch element is in the OFF state where the switch element is not driven, and light propagates to the cross path when the switch element is in the ON state where the switch element is driven. When the light inputted to the input line waveguide 111 is outputted to the port number #y (y=1 to 4) of the output line waveguide 132, the switch element 133 of the number (y) is driven and turned ON.

The 1×4 switch 130 was also manufactured by using the same photomask to manufacture three circuits, and the finished width of the waveguide was shifted in the same manner as in the embodiment 1. In the manufactured 1×4 switch 130, the thin film heater was driven to evaluate the transmittance in the OFF state and the transmittance in the ON state of each path. A typical example of the transmittance characteristic was almost the same as that shown in FIG. 24. Even if the finish of the waveguide width is deviated by ±0.2 μm from the design value, the transmittance in the OFF state is suppressed to −62 dB or less over the wavelength region of 1.25 to 1.68 μm, and the transmittance in the ON state is secured to −1.8 dB or more.

In addition to the construction of a large-scale integrated optical switch, there are a tree type 1× N switch in which a plurality of switch elements are connected in a binary tree shape. Also in such a switch, for example, the double gate type switch element 110 is used as a switch element, so that the high extinction ratio and the low insertion loss can be obtained over the wide wavelength range with the large manufacturing tolerance.

Example 3

Figure 26:
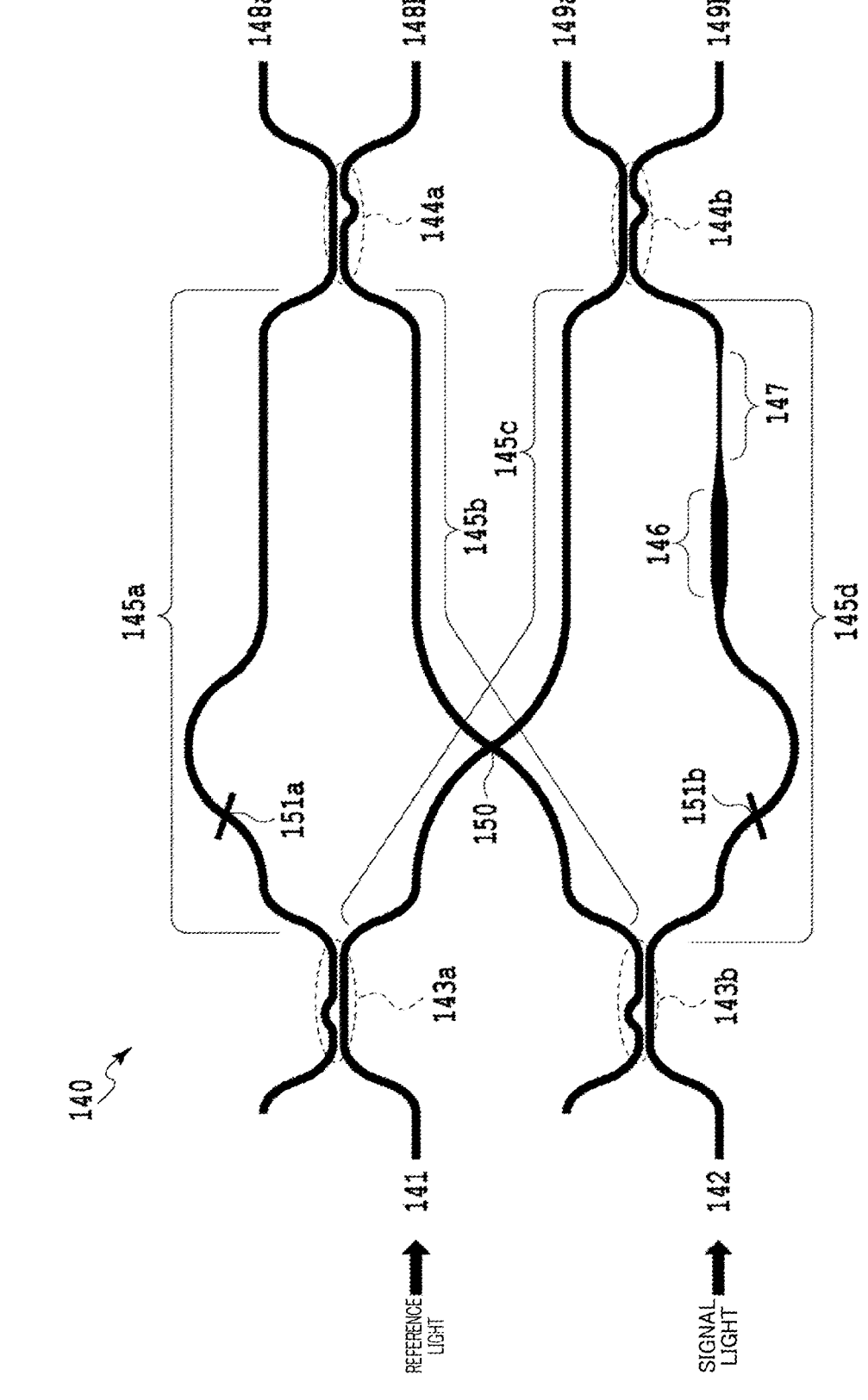
FIG. 26 is a diagram showing a configuration of a 90 degrees optical hybrid according to an example 3 of the present invention.

FIG. 26 shows a configuration of a 90 degrees optical hybrid according to an example 3 of the present invention. The 90 degrees optical hybrid 140 is an interference circuit in which two optical couplers 143a and 143b arranged in the front stage are connected to two optical couplers 144*a* and 144*b* arranged in the rear stage by four interference paths 145*a* to 145*d*. The interference path 145*a* connects the upper output of the optical coupler 143*a* and the upper output of the optical coupler 144*a*, and the interference path 145*b* connects the upper output of the optical coupler 143*b* and the lower output of the optical coupler 144*a*. The interference path 145*c* connects the lower output of the optical coupler 143*a* and the upper output of the optical coupler 144*b*, and the interference path 145*d* connects the lower output of the optical coupler 143*b* and the lower output of the optical coupler 144*b*. The interference path 145*b* and the interference path 145*c* intersect at an intersection 150. Dummy intersections 151*a* and 151*b* are arranged in the interference path 145*a* and the interference path 145*d*, but when the loss and phase shift of the interference paths 145*b* and 145*c* due to the intersection 150 are sufficiently small, they may be omitted. The lower input of the optical coupler 143*a* is used as an input port 141 for reference light, and the lower input of the optical coupler 143*b* is used as an input port 142 for signal light.

The optical phase shifter is constituted of a pair of waveguides of the interference path 145*a* and the interference path 145*b*, and the optical phase shifter is constituted of a pair of waveguides of the interference path 145*c* and the interference path 145*d*. A waveguide length difference between a waveguide length $L_A$ of the interference path 145*a* and a waveguide length $L_B$ of the interference path 145*b* is set to $\Delta L_{AB}$ (=$L_B$-$L_A$), and a waveguide length difference between a waveguide length $L_C$ of the interference path 145*c* and a waveguide length $L_D$ of the interference path 145*d* is set to $\Delta L_{CD}$ (=$L_D$-$L_C$). At this time, the difference between the waveguide length differences is defined as $\Delta L$ (=$\Delta L_{CD}$-$\Delta L_{AB}$). Typically, $L_A$=$L_B$=$L_C$ is established, that is, $\Delta L_{AB}$=0, $\Delta L$=$\Delta L_{CD}$ are satisfied in many cases, but $L_A \neq L_B \neq L_C$ may be used. The waveguides of the interference paths 145*a* to 145*d* are basically constituted of a width $W_0$. In the interference path 145*d*, two different type waveguides are included, and a part of the waveguide is a wide waveguide 146 having a waveguide width $W_{bold}$ (>$W_0$) over a length $L_{bold}$. In addition, another part of the waveguide is a narrow waveguide 147 having a waveguide width $W_{narrow}$ (<$W_0$) over a length $L_{narrow}$. In addition, at a connecting portion of the normal waveguide portion and the wide waveguide 146 and the narrow waveguide 147, a tapered waveguide having a length $TprL_{bold}$ and a length $TprL_{narrow}$ is formed.

The Winc described in the example 1 is used for the optical couplers 143*a*, 143*b*, 144*a*, and 144*b* to obtain characteristics of the coupling rate of 50% over the wide wavelength range. Note that, in the arrangement of the Winc, the optical couplers 143*a* and 143*b* of the front stage are arranged in the same direction in the vertical and horizontal directions each other, and the optical couplers 144*a* and 144*b* of the rear stage are also arranged in the same direction in the vertical and horizontal directions each other. On the other hand, the optical couplers 143*a* and 143*b* of the front stage and the optical couplers 144*a* and 144*b* of the rear stage do not necessarily have to be in the same direction, but they may be arranged in the same direction. In FIG. 26, the optical couplers at the rear stage are arranged point-symmetrically with respect to the optical couplers at the front stage.

When the phase of the signal light with respect to the reference light is $\psi$, for the phase $\psi_A$ of the signal light outputted to the output port 148*a*, the phase $\psi_B$ of the reference light outputted to the output port 148*b*, the phase $\psi_C$ of the signal light outputted to the output port 149*c*, the phase $\psi_D$ of the reference light outputted to the output port 149*d*, each of them is calculated as follows.

[Math. 27]

$$\psi_A = \theta_{cross1} - 2\pi \frac{n(W_0) \cdot L_A}{\lambda} + \theta_{bar2} \qquad \text{(Expression 38)}$$

$$\psi_B = \psi + \theta_{cross1} - 2\pi \frac{n(W_0) \cdot L_B}{\lambda} + \theta_{cross2} \qquad \text{(Expression 39)}$$

$$\psi_C = \theta_{bar1} - 2\pi \frac{n(W_0) \cdot L_C}{\lambda} + \theta_{bar2} \qquad \text{(Expression 40)}$$

$$\text{(Expression 41)}$$

$$\psi_D = \psi + \theta_{bar1} - 2\pi$$

$$\frac{n(W_0) \cdot (L_D - L_{bold} - L_{narrow}) + n(W_{bold}) \cdot L_{bold} + n(W_{narrow}) \cdot L_{narrow}}{\lambda} + \theta_{cross2}$$

Here, $\theta_{bar1}$ is a phase change of propagation light in the bar path of the optical couplers 143*a* and 143*b* of the front stage, and $\theta_{cross1}$ is a phase change of propagation light in the cross path of the optical couplers 143*a* and 143*b* of the front stage. $\theta_{bar2}$ is a phase change of propagation light in the bar path of the optical couplers 144*a* and 144*b* in the rear stage, and $\theta_{cross2}$ is a phase change of propagation light in the cross path of the optical couplers 144*a* and 144*b* in the rear stage. The difference in the phase change between the bar path and the cross path is defined as $\Delta\theta_1$ (=$\theta_{cross1}$-$\theta_{bar1}$) and $\Delta\theta_2$ (=$\theta_{cross2}$-$\theta_{bar2}$), respectively. In addition, the phase change in the intersection 150 is completely canceled at the dummy intersections 151*a* and 151*b*. Further, in this expression, for the sake of simplicity, the tapered waveguide connection is ignored and described.

A phase difference $\Delta\psi_{Ich}$ (=$\psi_B$-$\psi_A$) of the signal light with respect to the reference light outputted to the output port 148*b* is called an Ich phase difference. When a phase difference $\Delta\psi_{Qch}$ (=$\psi_D$-$\psi_C$) of the signal light with respect to the reference light outputted to the output port 149*b* is called a Qch phase difference, the Ich phase difference $\Delta\psi_{Ich}$ and the Qch phase difference $\Delta\psi_{Qch}$ are calculated as follows.

[Math. 28]

$$\text{(Expression 42)}$$

$$\Delta\psi_{Ich} =$$

$$\psi - 2\pi \frac{n(W_0) \cdot (L_B - L_A)}{\lambda} + \theta_{cross2} - \theta_{bar2} = \psi - 2\pi \frac{n(W_0) \cdot \Delta L_{AB}}{\lambda} + \Delta\theta_2$$

$$\text{(Expression 43)}$$

$$\Delta\psi_{Qch} = \psi - 2\pi \frac{n(W_0) \cdot (L_D - L_C - L_{bold} - L_{narrow}) + n(W_{bold}) \cdot L_{bold} + n(W_{narrow}) \cdot L_{narrow}}{\lambda} + \theta_{cross2} - \theta_{bar2} =$$

$$\psi - 2\pi \frac{n(W_0) \cdot (\Delta L_{CD} - L_{bold} - L_{narrow}) + n(W_{bold}) \cdot L_{bold} + n(W_{narrow}) \cdot L_{narrow}}{\lambda} + \Delta\theta_2$$

Further, when a difference of the Qch phase difference $\Delta\psi_{Qch}$ with respect to the Ich phase difference $\Delta\psi_{Ich}$ is defined as an IQ phase difference $\Delta\psi_{IQ}$ (=$\Delta\psi_{Qch}$-$\Delta\psi_{Ich}$), the IQ phase difference is calculated as follows.

[Math. 29]

$$\Delta\psi_{IQ} = -2\pi\frac{n(W_0)\cdot(\Delta L_{CD} - \Delta L_{AB} - L_{bold} - L_{narrow}) +}{\lambda}\frac{n(W_{bold})\cdot L_{bold} + n(W_{narrow})\cdot L_{narrow}}{} = \qquad \text{(Expression 44)}$$

$$-2\pi\frac{n(W_0)\cdot\Delta L + \Delta n_{bold}\cdot L_{bold} + \Delta n_{narrow}\cdot L_{narrow}}{\lambda}$$

Here, Expressions 16 and 17 described in the embodiment 2 are used for $\Delta n_{bold}$ and $\Delta n_{narrow}$. This expression 44 has the same type as that of expression 15 described in the embodiment 2 except for only the reference numerals. Therefore, by obtaining the parameters of $\Delta L$, $L_{bold}$ and $L_{narrow}$, as in the procedure described in the embodiment 2, $\Delta\psi_{IQ}$ can be set to an arbitrary phase difference in the wide wavelength range with a large manufacturing tolerance.

In the 90 degrees optical hybrid, $\Delta\psi_{IQ}=-\pi/2$ is set. That is, the Qch phase difference $\Delta\psi_{Ich}$ is delayed by 90° from the Ich phase difference $\Delta\psi_{Ich}$. This corresponds to advancing the phase of the Qch reference light by 90° from the phase of the Ich reference light, and the input signal light can be detected as a complex signal as described below.

[Optical Complex Signal Detector]

Figure 27:
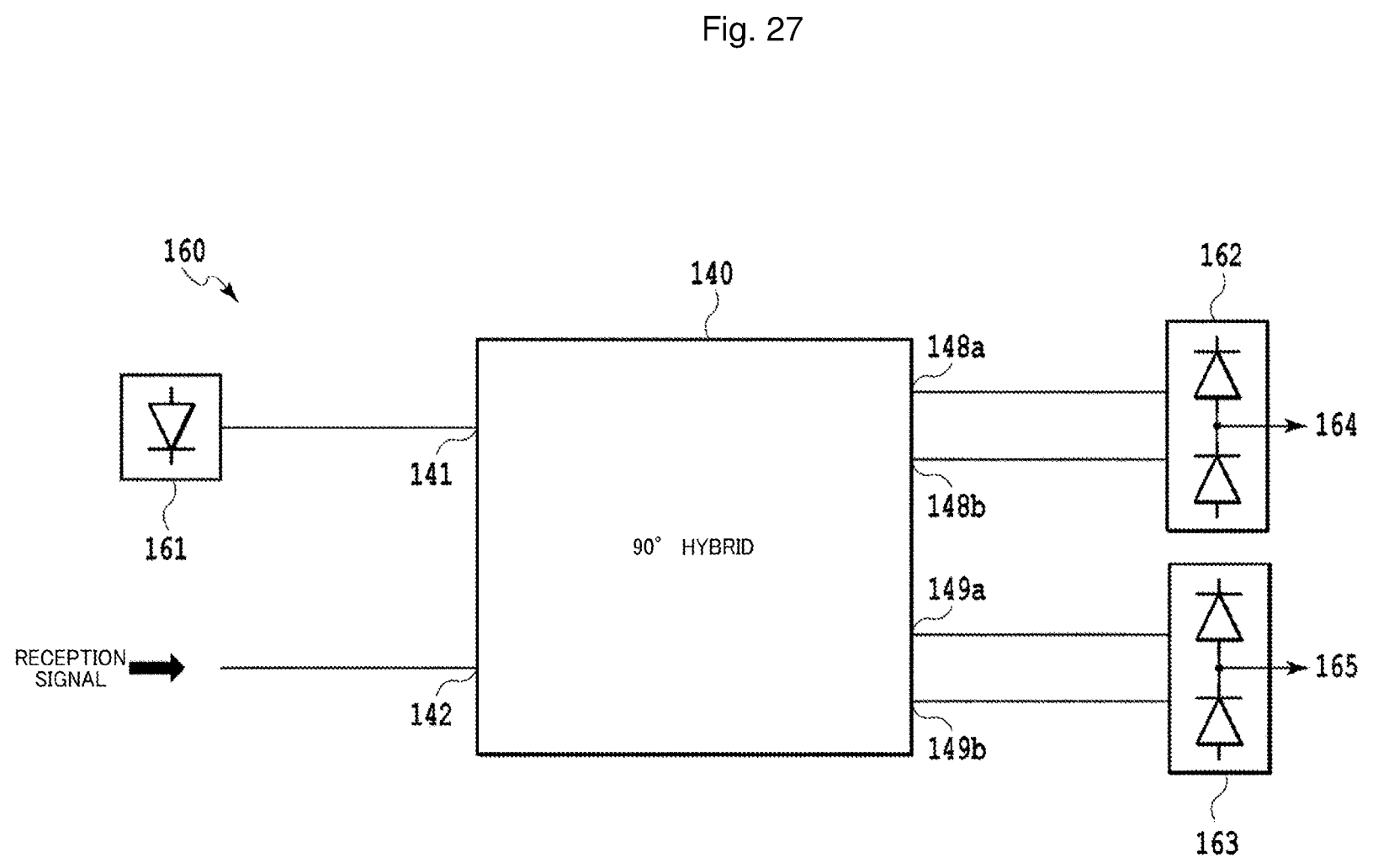

FIG. 27 shows a configuration of an optical complex signal detector according to the embodiment 3 of the present invention. In the optical complex signal detector 160, a local light emission source 161 for generating a reference light is connected to an input port 141 of a 90 degrees optical hybrid 140. A differential photodetector 162 is connected to the output ports 148a and 148b, and a differential photodetector 163 is connected to the output ports 149a and 149b. When the reception signal light is inputted to the input port 142, a differential detection electric signal (Ich output) based on the in-phase phase is obtained from the output port 164 of the differential photodetector 162, and a differential detection electric signal (Qch output) based on the quadrature phase is obtained from the output port 165 of the differential photodetector 163. The Ich output and the Qch output are regarded as X-axis and Y-axis on a complex plane, so that the inputted reception optical signal can be detected as a complex signal.

From the above, in the 90 degrees optical hybrid 140, $\Delta L$, $L_{bold}$, and $L_{narrow}$, which satisfies an expression in which $d\Delta n_{avg}/dW=0$ is set in Expression 20, an expression in which $\xi=\pi/2$ is set in Expression 35, and the three expressions of Expression 25, may be calculated. Or, $\Delta L$, $L_{bold}$, $L_{narrow}$ in which Expression 25 is minimized and an expression in which $\xi=\pi/2$ is set in Expression 36 is minimized may be calculated. As specific design values, $W_0=5$ μm, $W_{bold}=8$ μm, and $W_{narrow}=3.5$ μm are set, $L_{bold}=120$ μm, $L_{narrow}=151$ μm, and $\Delta L=0.1437$ μm were obtained as optimum values. Further, $TprL_{bold}=259$ μm and $TprL_{narrow}=148$ μm are satisfied. In addition, $\Delta L_{AB}=0$ and $\Delta L=\Delta L_{CD}$ were set.

Figure 28:
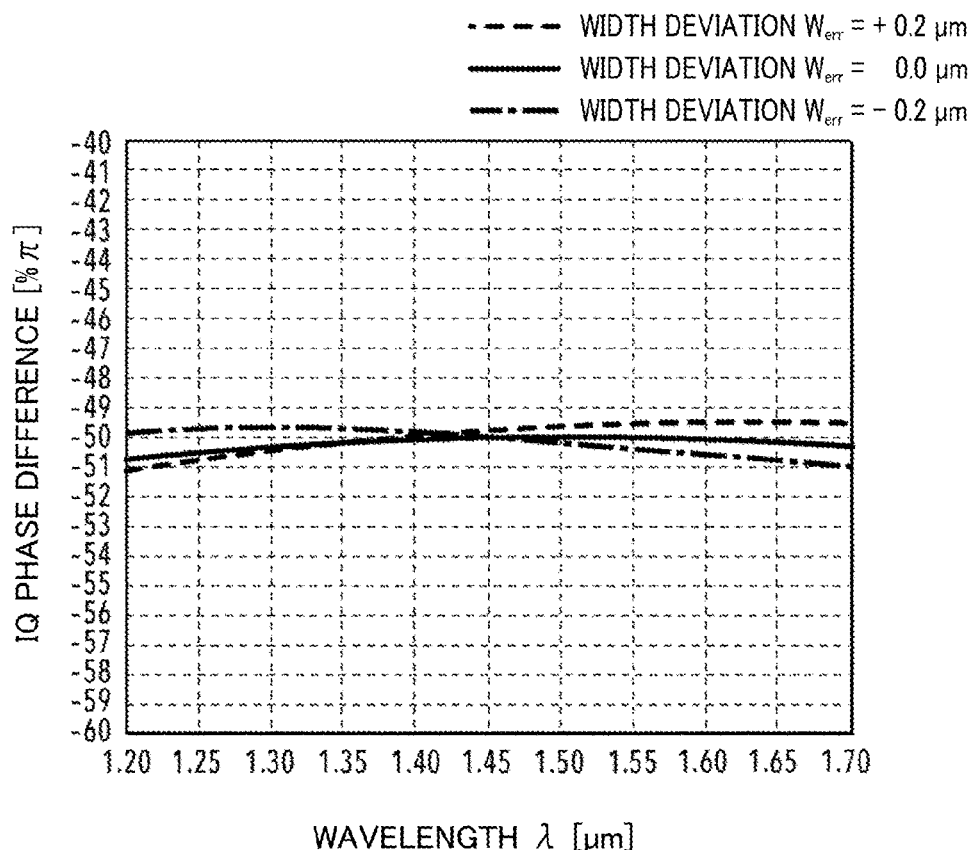
FIG. 28 is a diagram showing the wavelength dependence of the phase characteristics in the optical complex signal detector of the example 3.

FIG. 28 shows the wavelength dependence of the phase characteristic in the optical complex signal detector of the embodiment 3. The characteristics which is the wavelength dependence of the IQ phase difference $\Delta\psi_{IQ}$ are also shown when a width deviation $W_{err}$ occurs. As can be seen from FIG. 28, even when the finished width of the waveguide is deviated by ±0.2 μm in the wavelength range of 1.2 to 1.7 μm, the $\Delta\psi_{IQ}$ is within a range of approximately +1 to −2% with respect to −π/2. In this way, in the 90 degrees optical hybrid 140, the IQ phase difference $\Delta\psi_{IQ}$ can be made to be −π/2 almost without the wavelength dependence by a large manufacturing tolerance, and a flat phase difference can be obtained in the wide wavelength range over 500 nm.

Note that even if $\Delta\psi_{IQ}$ is +π/2, the Ich output and the Qch output can be made to correspond to each other on the complex plane by reversing positive and negative of the Ich output or the Qch output. Therefore, the interference path provided with the wide waveguide 146 and the narrow waveguide 147 is not limited to the interference path 145d, but any of the other interference paths 145a to 145c can be used.

Modification Example 1 of 90 Degrees Optical Hybrid

Figure 29:
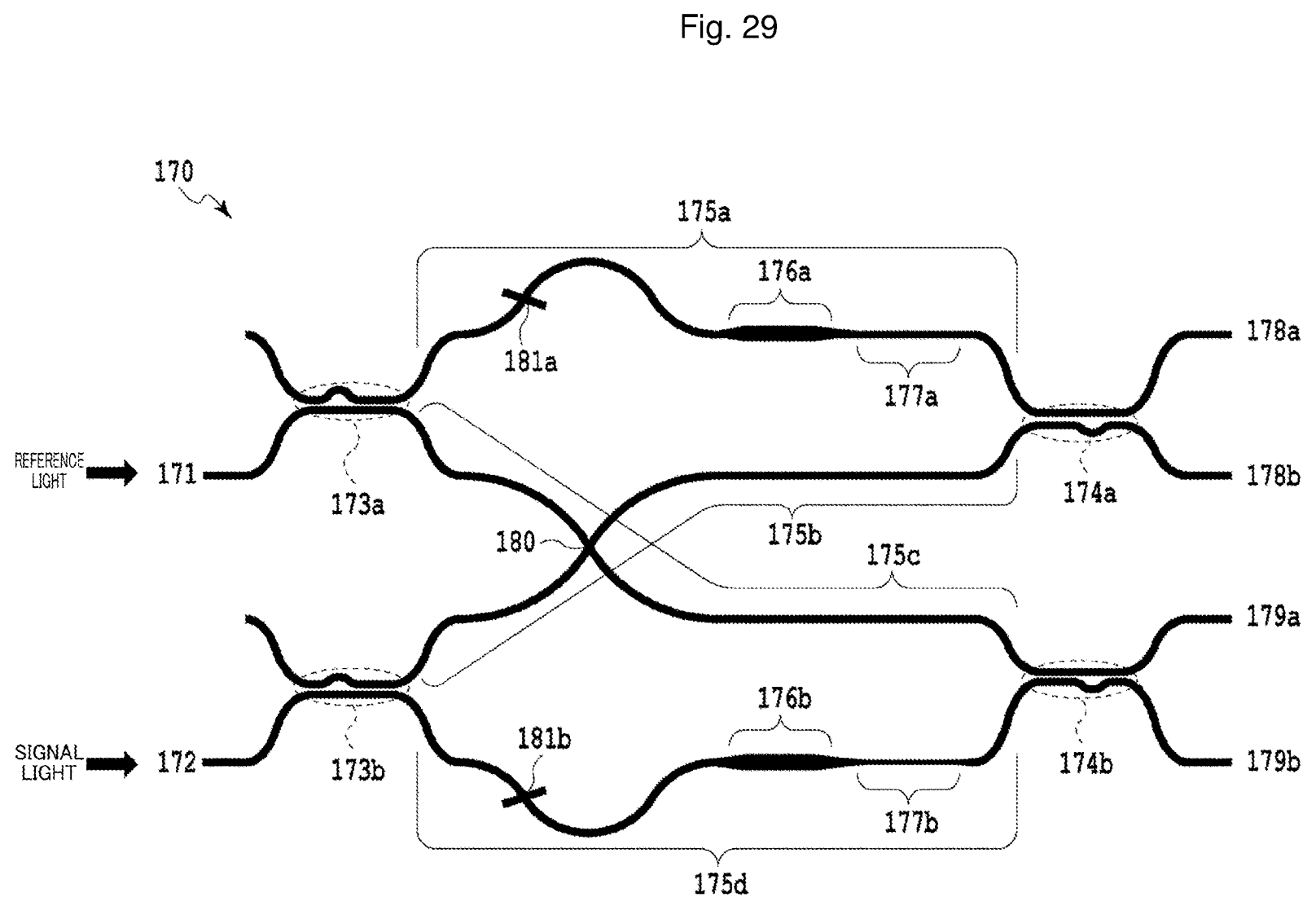

FIG. 29 shows a modification example 1 of the 90 degrees optical hybrid of an example 3. The 90 degrees optical hybrid 170 has basically the same constitution as the 90 degrees optical hybrid 140, but two different type waveguides are provided not only in the interference path 175d but also in the interference path 175a. That is, it is different that the interference path 175d is provided with the wide waveguide 176d and the narrow waveguide 177d, and the interference path 175a is also provided with the wide waveguide 176a and the narrow waveguide 177a. In this case, the wide waveguide 176a and the wide waveguide 176d are set to have the same design parameter, and the narrow waveguide 177a and the narrow waveguide 177d are set to have the same design parameter. Further, $\Delta L_{AB}=-\Delta L/2$, and $\Delta L_{CD}=\Delta L/2$ are set. In this way, the interference path portion of the circuit is vertically symmetrical. Further, since the wide waveguide and the narrow waveguide are deployed into two parts, the parameter may be obtained with $\xi=\pi/4$ in the above-mentioned Expression 35 or Expression 36, the length of the wide waveguide and the narrow waveguide is shortened, and as a result, the circuit size can be reduced. As specific design values, $W_0=5$ μm, $W_{bold}=7.5$ μm, $W_{narrow}=3.5$ vim are set, $L_{bold}=25$ μm, $L_{narrow}=38$ μm, $\Delta L=0.0716$ μm were obtained as optimum values. Further, $TprL_{bold}=219$ μm and $TprL_{narrow}=148$ μm are satisfied.

Figure 30:
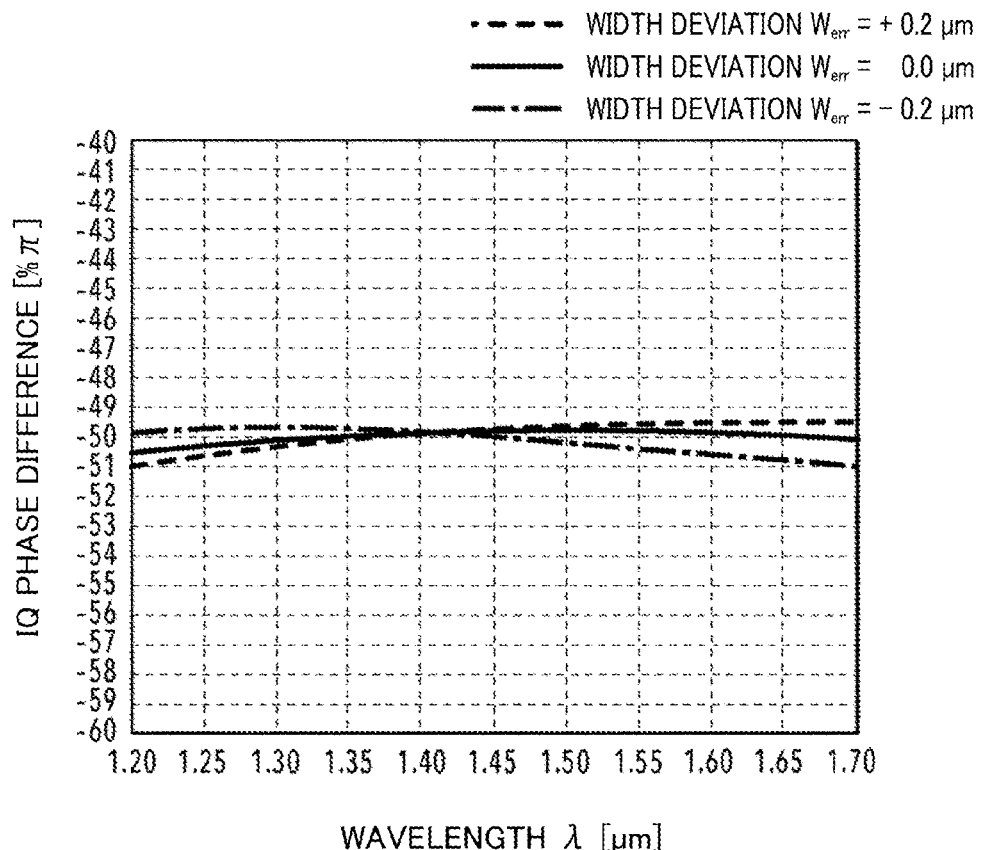
FIG. 30 is a diagram showing the wavelength dependence of the phase characteristics in the modification example 1 of the 90 degrees optical hybrid.

FIG. 30 shows the wavelength dependence of the phase characteristic in the modification example 1 of the 90 degrees optical hybrid. The characteristics which is the wavelength dependence of the IQ phase difference $\Delta\psi_{IQ}$ are also shown when a width deviation $W_{err}$ occurs. As can be seen from FIG. 30, even when the finished width of the waveguide is deviated by ±0.2 μm in the wavelength range of 1.2 to 1.7 μm, the $\Delta\psi_{IQ}$ is within a range of approximately +1 to −2% with respect to −π/2. In this way, even in the 90 degrees optical hybrid 170, the IQ phase difference $\Delta\psi_{IQ}$ can be made to be −π/2 almost without wavelength dependence by the large manufacturing tolerance, and the flat phase difference can be obtained in the wide wavelength range over 500 nm.

Note that even if $\Delta\psi_{IQ}$ is +π/2, the Ich output and the Qch output can be made to correspond to each other on the complex plane by reversing positive and negative of the Ich output or the Qch output. Therefore, the interference path provided with the wide waveguide and the narrow waveguide is not limited to the interference paths 175a and 175d, but may be the interference paths 175b and 175c.

Modification Example 2 of 90 Degrees Optical Hybrid

Figure 31:
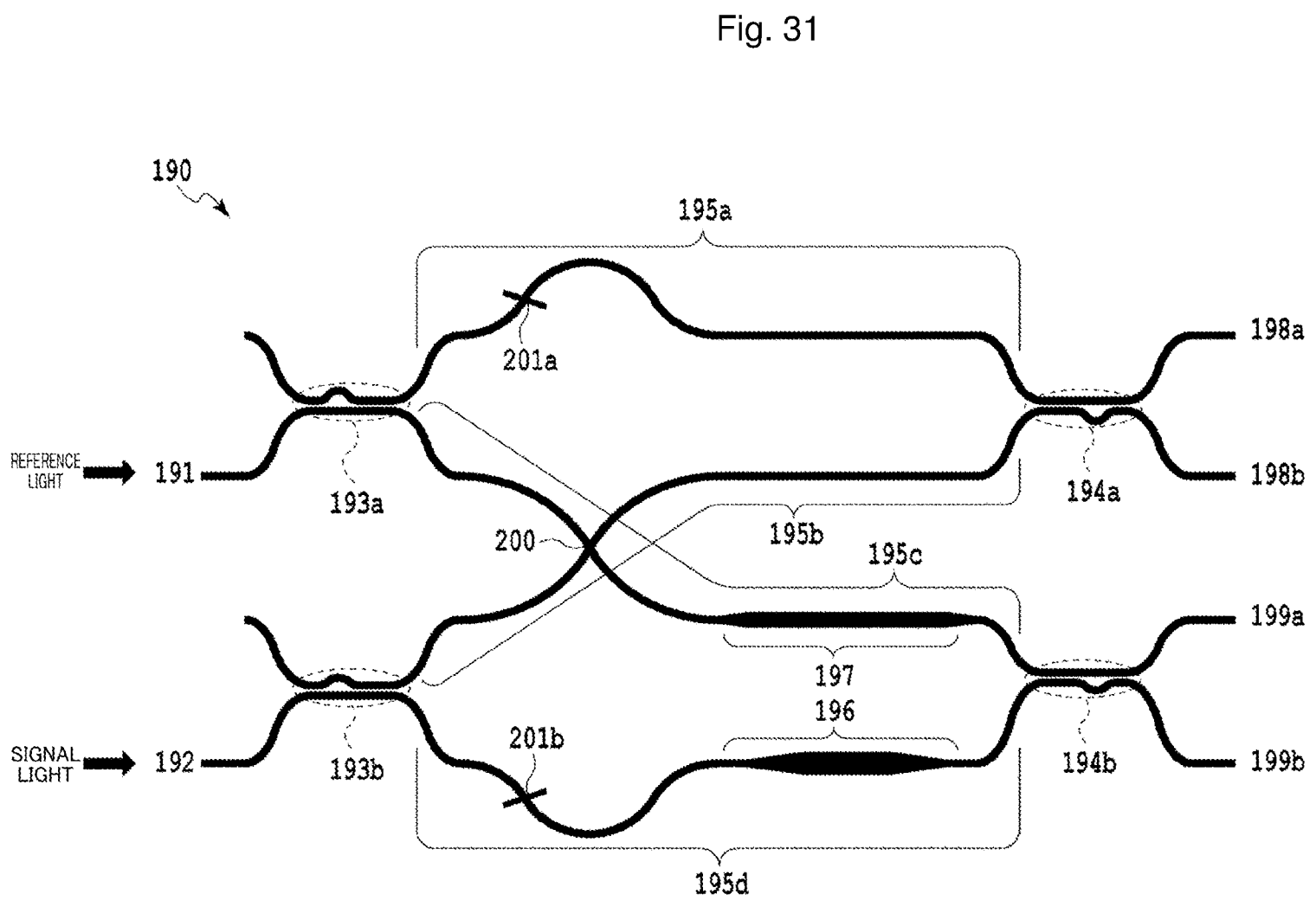

FIG. 31 shows a modification example 2 of the 90 degrees optical hybrid of the example 3. The 90 degrees optical hybrid 190 has basically the same constitution as the 90 degrees optical hybrid 140, but the different type waveguide is provided not only in the interference path 195d but also in the interference path 195*c*, that is, the interference path 195*d* is provided with a first wide waveguide 196, and the interference path 195*c* is also provided with a second wide waveguide 197. That is, it is different that the 90 degrees optical hybrid 140 uses the optical phase shifter described in the wide-band switch of the embodiment 2, while the 90 degrees optical hybrid 190 uses the optical phase shifter described in the wide-band switch of the embodiment 3.

When the length of the first wide waveguide 196 is defined as $L_1$, the width is defined as $W_1$, the length of the second wide waveguide 197 is defined as $L_2$, and the width is defined as $W_2$, the above-mentioned Expressions 40 and 41 are rewritten as follows.

[Math. 30]

$$\psi_C = \theta_{bar1} - 2\pi \frac{n(W_0) \cdot (L_C - L_2) + n(W_2) \cdot L_2}{\lambda} + \theta_{bar2} \quad \text{(Expression 45)}$$

$$\psi_D = \psi + \theta_{bar1} - 2\pi \frac{n(W_0) \cdot (L_D - L_1) + n(W_1) \cdot L_1}{\lambda} + \theta_{cross2} \quad \text{(Expression 46)}$$

The Qch phase difference $\Delta\psi_{Qch}$ of Expression 43 is rewritten as follow.

$$\text{(Expression 47)}$$

$$\Delta\psi_{Qch} = \psi - 2\pi \frac{n(W_0) \cdot (\Delta L_{CD} - L_1 + L_2) + n(W_1) \cdot L_1 - n(W_2) \cdot L_2}{\lambda} + \Delta\theta_2$$

Accordingly, the IQ phase difference $\Delta\psi_{IQ}$ of Expression 44 is defined as follows.

$$\Delta\psi_{IQ} = -2\pi \frac{n(W_0) \cdot \Delta L + \Delta n_1 - \Delta n_2 \cdot L_2}{\lambda} \quad \text{(Expression 48)}$$

Here, for $\Delta n_1$ and $\Delta n_2$, Expressions 29 and 30 described in the embodiment 3 are used. This Expression 48 has the same type as that of Expression 22 described in the embodiment 3 except for only the reference numerals. Therefore, by obtaining the parameters of $\Delta L$, $L_1$ and $L_2$, as in the procedure described in the embodiment 3, $\Delta\psi_{IQ}$ can be set to an arbitrary phase difference in the wide wavelength range with a large manufacturing tolerance.

In the 90 degrees optical hybrid, a configuration in which the configuration of the 90 degrees optical hybrid 170 is applied to the configuration of the 90 degrees optical hybrid 190 may be considered. Further, a configuration in which the configuration of the 90 degrees optical hybrid 170 is applied by combining the configuration of the 90 degrees optical hybrid 140 and the configuration of the 90 degrees optical hybrid 190 may be considered.

As described above, it is possible to realize the optical phase shifter in which the phase shift amount is kept constant over the wide wavelength range. Further, it is possible to realize the wide-band operation optical phase shifter in which the phase shift amount does not vary even if the waveguide width varies due to the manufacturing error, that is, the optical phase shifter having the large manufacturing tolerance. By using these optical phase shifters, an optical circuit operating over the wide-band, especially the optical switch having high extinction ratio characteristics in the wide wavelength region can be provided. Furthermore, the optical switch having the low loss characteristic in the wide wavelength region can be provided.

Furthermore, the 90 degrees optical hybrid operating in the wide wavelength range can be provided.

The invention claimed is:

1. An optical phase shifter including two waveguides having a basic width $W_0$ and configured such that two light beams propagating through the respective two waveguides have a phase difference $\xi$, the two waveguides comprising:

a first waveguide; and a second waveguide, wherein the first waveguide comprises:

a waveguide having a basic width $W_0$; and a first different type waveguide having a width $W_1$ different from the basic width $W_0$ and a length $L_1$, and the second waveguide comprises a waveguide having the basic width $W_0$, wherein the first waveguide and the second waveguide are different in length by a difference $\Delta L$, and when an equivalent refractive index of a waveguide having a width w is defined as n(w), a propagation distance along a light propagation path in the first different type waveguide from a starting point of the first different type waveguide is defined as $z_1$, and a width of the first different type waveguide at the propagation distance $z_1$ is set to $W(z_1)$, in a phase difference $\Delta\phi$, $$\Delta\phi = 2\pi \frac{n(W_0) \cdot \Delta L + \int_0^{L_1} \{n(W(z_1)) - n(W_0)\} \cdot dz_1}{\lambda} \quad \text{[Math. 1]}$$

for a wavelength $\lambda$ of a predetermined wavelength range, the length $L_1$ and the difference $\Delta L$ are set so that $$\int (\Delta\phi - \xi)^2 d\lambda \quad \text{[Math. 2]}$$

becomes minimum.

2. The optical phase shifter according to claim 1, the first waveguide further comprising:

a second different type waveguide having a width $W_2$ different from the basic width $W_0$ and satisfying a relation of the width $W_2$ < the basic width $W_0$ < the width $W_1$ and having a length $L_2$, wherein when a propagation distance along a light propagation path in the second different type waveguide from a starting point of the second different type waveguide is defined as $z_2$ and a width of the second different type waveguide at the propagation distance $z_2$ is set to $W(z_2)$, in a phase difference $\Delta\phi$, $$\Delta\phi = 2\pi \frac{n(W_0) \cdot \Delta L + \int_0^{L_1} \{n(W(z_1)) - n(W_0)\} \cdot dz_1 + \int_0^{L_2} \{n(W(z_2)) - n(W_0)\} \cdot dz_2}{\lambda} \quad \text{[Math. 3]}$$

for a wavelength $\lambda$ of a predetermined wavelength range, the length $L_1$, the length $L_2$, and the difference $\Delta L$ are set so that $$\int \left(\frac{d\Delta\phi}{dW}\right)^2 d\lambda \qquad \text{[Math. 4]}$$

becomes minimum and $$\int (\Delta\phi - \xi)^2 d\lambda \qquad \text{[Math. 5]}$$

becomes minimum.

3. The optical phase shifter according to claim 1, the second waveguide further comprising:

a third different type waveguide having a width $W_3$ different from the basic width $W_0$ and satisfying a relation of the width $W_3$<the width $W_1$ and having a length $L_3$, wherein when a propagation distance along a light propagation path in the third different type waveguide from a starting point of the third different type waveguide is defined as $z_3$, and a width of the third different type waveguide at the propagation distance $z_3$ is set to $W(z_3)$, in a phase difference $\Delta\phi$, $$\Delta\phi = 2\pi \frac{n(W_0)\cdot\Delta L + \int_0^{l_1} \{n(W(z_1)) - n(W_0)\}\cdot dz_1 - \int_0^{L_3} \{n(W(z_3)) - n(W_0)\}\cdot dz_3}{\lambda} \qquad \text{[Math. 6]}$$

for a wavelength $\lambda$ of a predetermined wavelength range, the length $L_1$, the length $L_3$, and the difference $\Delta L$ are set so that $$\int \left(\frac{d\Delta\phi}{dW}\right)^2 d\lambda \qquad \text{[Math. 7]}$$

becomes minimum and $$\int (\Delta\phi - \xi)^2 d\lambda \qquad \text{[Math. 8]}$$

becomes minimum.

4. An optical switch comprising:

two two-input two-output optical couplers connected by the first waveguide and the second waveguide of the optical phase shifter according to claim 1, wherein the optical switch is a Mach-Zehnder interferometer constituting of the two waveguides.

5. The optical switch according to claim 4, wherein the two-input two-output optical coupler is a wavelength independent optical coupler (Winc) constituted by a Mach-Zehnder interferometer including two interference arms connecting two directional couplers, and the two directional couplers are connected so that an order in a propagation direction of light of the two directional couplers and an arrangement of the two interference arms are symmetrical.

6. The optical switch according to claim 4, wherein the two-input two-output optical coupler is a directional coupler including an optical coupling portion in which two waveguides having different waveguide widths are close to each other, and the waveguides of the optical coupling portion are connected so as to be symmetrical in an arrangement.

7. The optical switch, wherein the optical switch is constituted by a double gate type switch element in which two optical switches according to claim 4, are connected in cascade.

8. The optical switch, wherein the optical switch is constituted by a matrix switch including $N^2$ optical switches according to claim 4 between N input line waveguides and N output line waveguides.

9. The optical switch, wherein the optical switch is constituted by a tree switch including N optical switches according to claim 4 between one input line waveguide and N output line waveguides.

10. A 90 degrees optical hybrid, wherein a first optical coupler and a second optical coupler arranged in a front stage, a third optical coupler and a fourth optical coupler arranged in a rear stage, and one output of the first optical coupler and one output of the second optical coupler are connected to an input of the third optical coupler by a pair of waveguides, an other output of the first optical coupler and an other output of the second optical coupler are connected to an input of the fourth optical coupler by a pair of waveguides, and at least one of the pair of waveguides is constituted by the first waveguide and the second waveguide of the optical phase shifter according to claim 1.

11. The optical phase shifter according to claim 1, wherein the first different type waveguide is replaced at the starting portion by a tapered waveguide having a width gradually changed from the basic width $W_0$ to the width $W_1$ and is replaced at the terminating portion by a tapered waveguide having a width that gradually changed from the width $W_1$ to the basic width $W_0$.

12. The optical phase shifter according to claim 2, wherein the first different type waveguide is replaced at the starting portion by a tapered waveguide having a width gradually changed from the basic width $W_0$ to the width $W_1$ and is replaced at the terminating portion by a tapered waveguide having a width that gradually changed from the width $W_1$ to the basic width $W_0$ and the second different type waveguide is replaced at the starting portion by a tapered waveguide having a width gradually changed from the basic width $W_0$ to the width $W_2$ and is replaced at the terminating portion by a tapered waveguide having a width that gradually changed from the width $W_2$ to the basic width $W_0$.

13. The optical phase shifter according to claim 3, wherein the first different type waveguide is replaced at the starting portion by a tapered waveguide having a width gradually changed from the basic width $W_0$ to the width $W_1$ and is replaced at the terminating portion by a tapered waveguide having a width that gradually changed from the width $W_1$ to the basic width $W_1$ and the third different type waveguide is replaced at the starting portion by a tapered waveguide having a width gradually changed from the basic width $W_0$ to the width $W_3$ and is replaced at the terminating portion by a tapered waveguide having a width that gradually changed from the width $W_3$ to the basic width $W_0$.

* * * * *